(12) United States Patent
Kimura et al.

(10) Patent No.: US 12,058,116 B2
(45) Date of Patent: Aug. 6, 2024

(54) COMMUNICATION DEVICE, COMMUNICATION METHOD, AND DATA STRUCTURE

(71) Applicant: SONY CORPORATION, Tokyo (JP)

(72) Inventors: Ryota Kimura, Tokyo (JP); Hiroaki Takano, Tokyo (JP); Hirofumi Kasai, Tokyo (JP); Ryo Sawai, Tokyo (JP); Fumio Teraoka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 513 days.

(21) Appl. No.: 17/285,779

(22) PCT Filed: Oct. 1, 2019

(86) PCT No.: PCT/JP2019/038811
§ 371 (c)(1),
(2) Date: Apr. 15, 2021

(87) PCT Pub. No.: WO2020/085014
PCT Pub. Date: Apr. 30, 2020

(65) Prior Publication Data
US 2021/0392123 A1 Dec. 16, 2021

(30) Foreign Application Priority Data
Oct. 25, 2018 (JP) .................. 2018-201037

(51) Int. Cl.
*H04L 29/00* (2006.01)
*H04L 9/40* (2022.01)
(Continued)

(52) U.S. Cl.
CPC ............ *H04L 63/062* (2013.01); *H04L 45/34* (2013.01); *H04L 45/74* (2013.01); *H04L 47/125* (2013.01); *H04L 63/0823* (2013.01)

(58) Field of Classification Search
CPC ....... H04L 63/062; H04L 45/34; H04L 45/74; H04L 47/125; H04L 63/0823
(Continued)

(56) References Cited

U.S. PATENT DOCUMENTS

2002/0112060 A1* 8/2002 Kato ................... H04L 47/2425
709/227
2011/0004753 A1 1/2011 Gomi et al.
(Continued)

FOREIGN PATENT DOCUMENTS

CN 101569137 A 10/2009
CN 101809584 A 8/2010
(Continued)

OTHER PUBLICATIONS

Office Action for CN Patent Application No. 201980068302.3, issued on Jul. 26, 2022, 10 pages of English Translation and 10 pages of Office Action.
(Continued)

*Primary Examiner* — Jeffrey C Pwu
*Assistant Examiner* — Michael D Anderson
(74) *Attorney, Agent, or Firm* — CHIP LAW GROUP

(57) ABSTRACT

There is provided a communication device including: a communication section that executes communication with another node; and a control section that controls the communication by the communication section, the control section adding, to a packet directed toward a transmission destination node by a transmission source node, header information containing at least path information between the communication device located in a stage subsequent to the transmission source node and a target node located in a stage preceding the transmission destination node, and causing the communication section to send the packet toward another node residing in a path.

17 Claims, 60 Drawing Sheets

(51) Int. Cl.
*H04L 45/00* (2022.01)
*H04L 45/74* (2022.01)
*H04L 47/125* (2022.01)

(58) Field of Classification Search
USPC .......................................................... 726/2
See application file for complete search history.

(56) References Cited

U.S. PATENT DOCUMENTS

2011/0055845 A1    3/2011  Nandagopal et al.
2017/0149632 A1*   5/2017  Saltsidis ............... H04L 45/306

FOREIGN PATENT DOCUMENTS

| CN | 102498694 A | 6/2012 |
| CN | 105765946 A | 7/2016 |
| EP | 2194481 A1 | 6/2010 |
| JP | 2016-046736 A | 4/2016 |
| JP | 2016-225877 A | 12/2016 |
| WO | 2009/041319 A1 | 4/2009 |
| WO | 2015/080634 A1 | 6/2015 |
| WO | 2016/033729 A1 | 3/2016 |

OTHER PUBLICATIONS

International Search Report and Written Opinion of PCT Application No. PCT/JP2019/038811, issued on Dec. 24, 2019, 10 pages of ISRWO.
Halpern, et al., "Service Function Chaining (SFC) Architecture", Internet Engineering Task Force (IETF), Oct. 2015, pp. 32.

* cited by examiner

FIG. 10

| Type = AF Setup Request |
| --- |
| User ID = USRID-1 |
| User Credential = USRCred-usr1 |
| AF Node IP Address = IP-afn1 |
| AF File Name = FName-af1 |
| AF Parameters = Param-af1 |

FIG. 11

| Type = AF Setup Response |
| --- |
| Status = OK |
| User ID = USRID-1 |
| AF ID = AFID-1 |
| AF Session Key = AFSKey-af1 |

FIG. 12

| Type = AA Request |
| --- |
| User ID = USRID-1 |
| User Credential = USRCred-usr1 |
| AF Node IP Address = IP-afn1 |
| AF File Name = FName-af1 |

FIG. 13

| Type = AA Response |
| --- |
| Status = OK |
| User ID = USRID-1 |

FIG. 14

| Type = AF Invoke Request |
| --- |
| User ID = USRID-1 |
| AF ID = AFID-1 |
| AF Session Key = AFSKey-af1 |
| AF File Name = FName-af1 |
| AF Parameters = Param-af1 |

FIG. 15

| Type = AF Invoke Response |
| --- |
| Status = OK |
| User ID = USRID-1 |
| AF ID = AFID-1 |
| Daemon Data Port = DPt-afcd1 |
| Daemon Control Port = CPt-afcd1 |

FIG. 16

Daemon AF Table

| ptr to next AF Table = [null] |
| --- |
| AF ID = AFID-1 |
| AF In Port = InPt-af1 |
| AF Out Port = OutPt-af1 |
| User ID = USRID-1 |
| AF Session Key = AFSKey-af1 |

FIG. 19

| Daemon AF Table |
|---|
| ptr to next AF Table = [null] |
| AF ID = AFID-3 |
| AF In Port = InPt-af3 |
| AF Out Port = OutPt-af3 |
| User ID = USRID-1 |
| AF Session Key = AFSKey-af3 |

FIG. 23

| Type = AFC Setup Request |
| --- |
| User ID = USRID-1 |
| Source IP Address = [any] |
| Destination IP Address = IP-srv |
| Protocol = UDP |
| Source Port = [any] |
| Destination Port = Pt-srv |
| Ingress IP Address = IP-ingress |
| Egress IP Address = IP-egress |
| No of AFs = 2 |
| AF ID = AFID-1 |
| AF Certificate = AFCert-af1 |
| Next Index Length = CondLen-1 |
| Next Index = ([any]:1) |
| AF ID = AFID-3 |
| AF Certificate = AFCert-af3 |
| Next Index Length = CondLen-3 |
| Next Index = ([any]:2) | match fields {Source IP Address ... Destination Port}

AF-1 (index: 0) {AF ID ... Next Index}

AF-3 (index: 1) {AF ID ... Next Index}

FIG. 24

| Type = AFC Setup Response |
| --- |
| Status = OK |
| User ID = USRID-1 |
| AFC ID = AFCID-1 |
| AFC Session Key = AFCSKey-afc1 |

FIG. 32

| Daemon AFC Table |
|---|
| ptr to next AFC Table = [null] |
| AFC ID = AFCID-1 |
| Sequence Number = Seq-afc1 |

FIG. 36

| Type = AFC Setup Request |
|---|
| User ID = USRID-1 |
| Source IP Address = [any] |
| Destination IP Address = IP-svr2 |
| Protocol = UDP |
| Source Port = [any] |
| Destination Port = Pt-svr2 |
| Ingress IP Address = IP-ingress |
| Egress IP Address = IP-egress |
| No of AFs = 3 |
| AF ID = AFID-1 |
| AF Certificate = AFCert-af1 |
| Next Index Length = CondLen-1 |
| Next Index = {[Cond-1:1], [any]:2} |
| AF ID = AFID-2 |
| AF Certificate = AFCert-af2 |
| Next Index Length = CondLen-2 |
| Next Index = {[any]:2} |
| AF ID = AFID-3 |
| AF Certificate = AFCert-af3 |
| Next Index Length = CondLen-3 |
| Next Index = {[any]:3} | match fields (rows 3–8)

AF-1 (index: 0) (rows 10–13)
AF-2 (index: 1) (rows 14–17)
AF-3 (index: 2) (rows 18–21)

FIG. 37

| Type = AFC Setup Response |
|---|
| Status = OK |
| User ID = USRID-1 |
| AFC ID = AFCID-2 |
| AFC Session Key = AFCSKey-afc2 |

FIG. 39

| Type = AFC Install Response |
| Status = OK |
| User ID = USRID-1 |
| AFC ID = AFCID-2 |

| Type = AFC Delete Request |
| --- |
| User ID = USRID-1 |
| AFC ID = AFCID-2 |
| AFC Certificate = AFCCert-afc2 |

| Type = AFC Delete Response |
| --- |
| Status = OK |
| User ID = USRID-1 |
| AFC ID = AFCID-2 |

FIG. 49

| Type = AF Delete Request |
|---|
| User ID = USRID-1 |
| AF ID = AFID-2 |
| AF Certificate = AFCert-af2 |

FIG. 50

| Type = AF Delete Response |
|---|
| Status = OK |
| User ID = USRID-1 |
| AF ID = AFID-2 |

FIG. 53

Daemon AF Table
| ptr to next AF Table = [null] |
| AF ID = AFID-4 |
| AF In Port = InPt-af4-1 |
| AF Out Port = OutPt-af4-1 |
| User ID = USRID-1 |
| AF Session Key = AFSKey-af4 |

FIG. 54

Daemon AF Table
| ptr to next AF Table = [null] |
| AF ID = AFID-4 |
| AF In Port = InPt-af4-2 |
| AF Out Port = OutPt-af4-2 |
| User ID = USRID-1 |
| AF Session Key = AFSKey-af4 |

FIG. 55

Daemon AF Table
| ptr to next AF Table = [null] |
| AF ID = AFID-5 |
| AF In Port = InPt-af5-1 |
| AF Out Port = OutPt-af5-1 |
| User ID = USRID-1 |
| AF Session Key = AFSKey-af5 |

FIG. 56

| Daemon AF Table |
|---|
| ptr to next AF Table = [null] |
| AF ID = AFID-5 |
| AF In Port = InPt-af5-2 |
| AF Out Port = OutPt-af5-2 |
| User ID = USRID-1 |
| AF Session Key = AFSKey-af5 |

FIG. 58

| Type = AFC Setup Request |
|---|
| User ID = USRID-1 |
| Source IP Address = [any] |
| Destination IP Address = IP-svr3 |
| Protocol = UDP |
| Source Port = [any] |
| Destination Port = Pt-svr3 |
| Ingress IP Address = IP-ingress |
| Egress IP Address = IP-egress |
| No of AFs = 2 |
| AF ID = AFID-4 |
| AF Certificate = AFCert-af4 |
| Next Index Length = CondLen-4 |
| Next Index = [[any]:1] |
| AF ID = AFID-5 |
| AF Certificate = AFCert-af5 |
| Next Index Length = CondLen-5 |
| Next Index = [[any]:2] |

- match fields (rows 2–8)
- AF-4 (index: 0) (rows 10–13)
- AF-5 (index: 1) (rows 14–17)

FIG. 59

| Type = AFC Setup Response |
|---|
| Status = OK |
| User ID = USRID-1 |
| AFC ID = AFCID-3 |
| AFC Session Key = AFCSKey-afc3 |

FIG. 61

| Type = AFC Install Response |
|---|
| Status = OK |
| User ID = USRID-1 |
| AFC ID = AFCID-3 |

FIG. 65

| Type = Load Monitoring Request |
|---|

FIG. 66

| Type = Load Monitoring Response |
|---|
| Status = OK |
| Load = LD-4-1 |

FIG. 73

| Type = AFC Feedback |
|---|
| AFC ID = AFCID-3 |
| No of AFs = 2 |
| AF ID = AFID-4 |
| AF Node IP Address = IP-afn4-1 |
| In Timestamp = TSin-afn4-1 |
| Out Timestamp = TSout-afn4-1 |
| AF ID = AFID-5 |
| AF Node IP Address = IP-afn5-1 |
| In Timestamp = TSin-afn5-1 |
| Out Timestamp = TSout-afn5-1 |
| Ingress Out Timestamp = TSout-ingress |
| Egress In Timestamp = TSin-egress |

AF Node-4-1 (rows 4-6)
AF Node-5-1 (rows 7-9)

COMMUNICATION DEVICE, COMMUNICATION METHOD, AND DATA STRUCTURE

TECHNICAL FIELD

The present disclosure relates to a communication device, a communication method, and a data structure.

In terms of network operators and service providers, forwarding a packet to be forwarded in a network to a server device that is not included in an original packet forwarding path as necessary, and causing a service function (SF) running on the server device to operate on the packet is referred to as Service Function Chaining (SFC). SFs include a Network Address Translation (NAT), a Load Balancer, a Web Application Firewall (WAF), and the like.

NPL 1 describes an architecture of SFC. In addition, PTL 1 describes a method of performing detection of failures of a device and a link and failure recovery are performed in an autonomous distributed manner to improve availability of a virtualized network service function.

CITATION LIST

Patent Literature

PTL 1: Japanese Unexamined Patent Application Publication No. 2016-46736

Non-Patent Literature

NPL 1: J. Halpern and C. Pignataro. Service Function Chaining (SFC) Architecture, October 2015. RFC 7665.

SUMMARY OF THE INVENTION

Problems to be Solved by the Invention

In SFC, in terms of network operators and service providers, SFs such as a WAF and a Load Balancer are available. That is, a kind of packet to be subjected to SFC is determined in accordance with an intention of a network operator or a service provider.

Accordingly, the present disclosure proposes a novel and improved communication device, communication method, and data structure that allow one or a plurality of functions desired by a service user to operate on a packet desired by the service user in a service of forwarding packets in a network.

Means for Solving the Problems

According to the present disclosure, there is provided a communication device including: a communication section that executes communication with another node; and a control section that controls the communication by the communication section, the control section adding, to a packet directed toward a transmission destination node by a transmission source node, header information containing at least path information between the communication device located in a stage subsequent to the transmission source node and a target node located in a stage preceding the transmission destination node, and causing the communication section to send the packet toward another node residing in a path.

In addition, according to the present disclosure, there is provided a communication device including: a communication section that executes communication with another node; and a control section that control communication by the communication section, the control section deleting header information added to a packet directed toward a transmission destination node by a transmission source node, and causing the communication section to send the packet, the header information containing at least path information from a start node located in a stage subsequent to the transmission source node to the communication device located in a stage preceding the transmission destination node.

In addition, according to the present disclosure, there is provided a communication device including: a communication section that executes communication with another node; and a control section that controls the communication by the communication section, the control section determining a next node with reference to data in which header information is added to a packet directed toward a transmission destination node by a transmission source node, and causing the communication section to send the data toward the determined next node, the header information containing at least path information between a start node located in a stage subsequent to the transmission source node and a target node located in a stage preceding the transmission destination node.

In addition, according to the present disclosure, there is provided a communication device including: a communication section that executes communication with another node; and a control section that controls the communication by the communication section, the control section generating path information between a start node and a target node, the start node including a node that adds header information containing at least path information between the start node and the target node, the target node including a node that deletes the header information, and the path information between the start node and the target node containing at least information about communication with at least one relay node residing between the start node and the target node, information of a function to be executed by the relay node, and contents of processing corresponding to a result of execution of the function oat the relay node.

In addition, according to the present disclosure, there is provided a communication method including: executing communication with another node; and controlling the communication with the other node, the controlling including adding header information to a packet directed toward a transmission destination node by a transmission source node and sending the packet to another node residing in a path, the header information containing at least path information between a start node located in a stage subsequent to the transmission source node and a target node located in a stage preceding the transmission destination node.

In addition, according to the present disclosure, there is provided a communication method including: executing communication with another node; and controlling the communication with the other node, the controlling including deleting header information contained in a packet directed toward a transmission destination node by a transmission source node and sending the packet toward the other node, the header information containing at least path information between a start node located in a stage subsequent to the transmission source node and a target node located in a stage preceding the transmission destination node.

In addition, according to the present disclosure, there is provided a communication method including: executing communication with another node; and controlling the communication with the other node, the controlling including determining a next node with reference to data in which header information is added to a packet directed toward a transmission destination node by a transmission source node, and sending the data toward the determined next node, the header information containing path information between a start node located in a stage subsequent to the transmission source node and a target node located in a stage preceding the transmission destination node.

In addition, according to the present disclosure, there is provided a data structure used in a communication device, the communication device including a communication section that executes communication with another node, and a control section that controls the communication by the communication section, the control section adding header information to a packet directed toward a transmission destination node by a transmission source node and causing the communication section to send the packet, and the header information containing at least path information a start node located in a stage subsequent to the transmission source node and a target node located in a stage preceding the transmission destination node, the transmission source node being between the start node and the target node.

BRIEF DESCRIPTION OF DRAWINGS

FIG. 10 is an explanatory diagram illustrating a structure example of an AF Setup Request packet.

FIG. 11 is an explanatory diagram illustrating a structure example of an AF Setup Response packet.

FIG. 12 is an explanatory diagram illustrating a structure example of an AA Request packet.

FIG. 13 is an explanatory diagram illustrating a structure example of an AA Response packet.

FIG. 14 is an explanatory diagram illustrating a structure example of an AF Invoke Request packet.

FIG. 15 is an explanatory diagram illustrating a structure example of an AF Invoke Response packet.

FIG. 16 is an explanatory diagram illustrating a structure example of a Daemon AF Table.

FIG. 19 is an explanatory diagram illustrating a structure example of a Daemon AF Table.

FIG. 23 is an explanatory diagram illustrating of a structure example of an AFC Setup Request packet.

FIG. 24 is an explanatory diagram illustrating a structure example of an AFC Setup Response packet.

FIG. 32 is an explanatory diagram illustrating a structure example of a Daemon AFC Table.

FIG. 36 is an explanatory diagram illustrating a structure example of an AFC Setup Request packet.

FIG. 37 is an explanatory diagram illustrating a structure example of an AFC Setup Response packet.

FIG. 39 is an explanatory diagram illustrating a structure example of an AFC Install Response packet.

FIG. 49 is an explanatory diagram illustrating a structure example of an AF Delete Request packet.

FIG. 50 is an explanatory diagram illustrating a structure example of an AF Delete Response packet.

FIG. 53 is an explanatory diagram illustrating a structure example of a table held by an AF Node.

FIG. 54 is an explanatory diagram illustrating a structure example of a table held by an AF Node.

FIG. 55 is an explanatory diagram illustrating a structure example of a table held by an AF Node.

FIG. 56 is an explanatory diagram illustrating a structure example of a table held by an AF Node.

FIG. 58 is an explanatory diagram illustrating a structure example of an AFC Setup Request packet.

FIG. 59 is an explanatory diagram illustrating a structure example of an AFC Setup Response packet.

FIG. 61 is an explanatory diagram illustrating a structure example of an AFC Install Response packet.

FIG. 65 is an explanatory diagram illustrating a structure example of a Load Monitoring Request packet.

FIG. 66 is an explanatory diagram illustrating a structure example of a Load Monitoring Response packet.

FIG. 73 is an explanatory diagram illustrating a structure example of an AFC Feedback packet.

MODES FOR CARRYING OUT THE INVENTION

Figure 1:
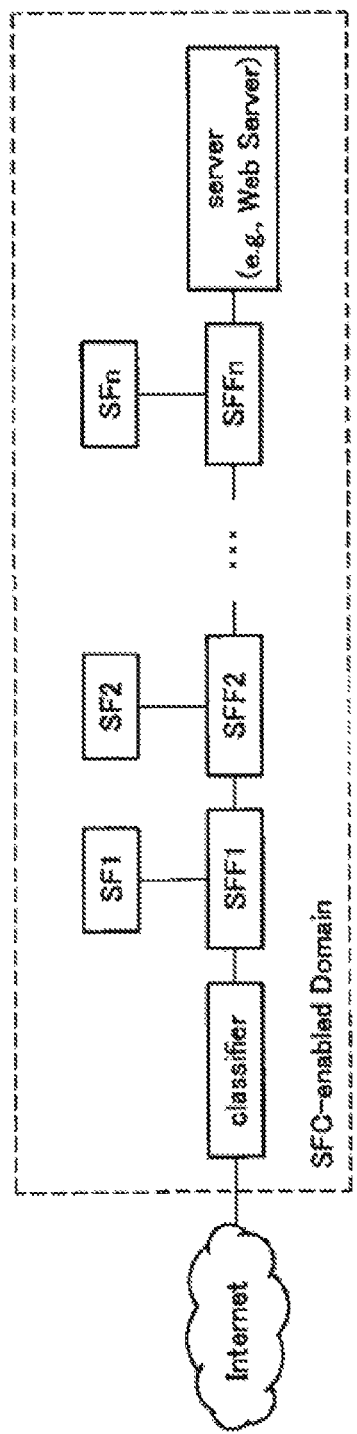
FIG. 1 is an explanatory diagram illustrating an architecture example of SFC.

A preferred embodiment of the present disclosure is described below in detail with reference to the accompanying drawings. It is to be noted that, in this description and the accompanying drawings, components that have substantially the same functional configuration are denoted by the same reference numerals, and thus redundant description thereof is omitted.

It is to be noted that the description is given in the following order.

1. Embodiment of Present Disclosure
1.1. Architecture Example of SFC
1.2. Specific Description of AFC
1.3. Functional Configuration Example of Communication Device
2. Conclusion 1. Embodiment of Present Disclosure

[1.1. Architecture Example of SFC]

First, an architecture example of SFC is described before describing an embodiment of the present disclosure in details. FIG. 1 is an architecture example of SFC disclosed in NTL 1.

In an SFC architecture as illustrated in FIG. 1, a range where SFC is applied is referred to as a SFC-enabled Domain. A classifier, a service function forwarder (SFF), a service function (SF), a server, and the like reside in the SFC-enabled Domain.

A case of accessing a web server from the Internet in FIG. 1 is considered. A packet entering the SFC-enabled Domain from the Internet first reaches the classifier. The classifier determines, from a header of the packet, which SF is to be applied to this packet, inserts such information as a Network Service Header (NSH) into the packet, and thereafter relays the packet. For example, a case where only an SF1 is applied to this packet is assumed.

In a case where an SFF1 receives this packet, the SFF1 knows, from contents of the NSH, that the SF1 is to be applied to this packet, and forwards this packet to the SF1. The SF1 processes this packet, and sends back this packet to the SFF1. The SFF1 forwards this packet to an SFF2. In this example, only the SF1 is applied to this packet; therefore, SFFs from the SFF2 to an SFFn simply relay this packet, and this packet eventually reaches a Web server.

In the SFC having such an architecture, in terms of network operators and service providers, SFs such as a WAF and a Load Balancer are available. That is, a kind of packet to be subjected to the SFC is determined in accordance with an intention of a network operator or a service provider.

In contrast, an architecture described below is for causing one or a plurality of functions desired by a service user to operate on a packet desired by the service user in a service of forwarding packets in a network. In the present embodiment, such an architecture is referred to as Application Function Chaining (AFC), and a function operating in such an AFC architecture is referred to as an Application Function (AF).

[1.2. Specific Description of AFC]

Figure 2:
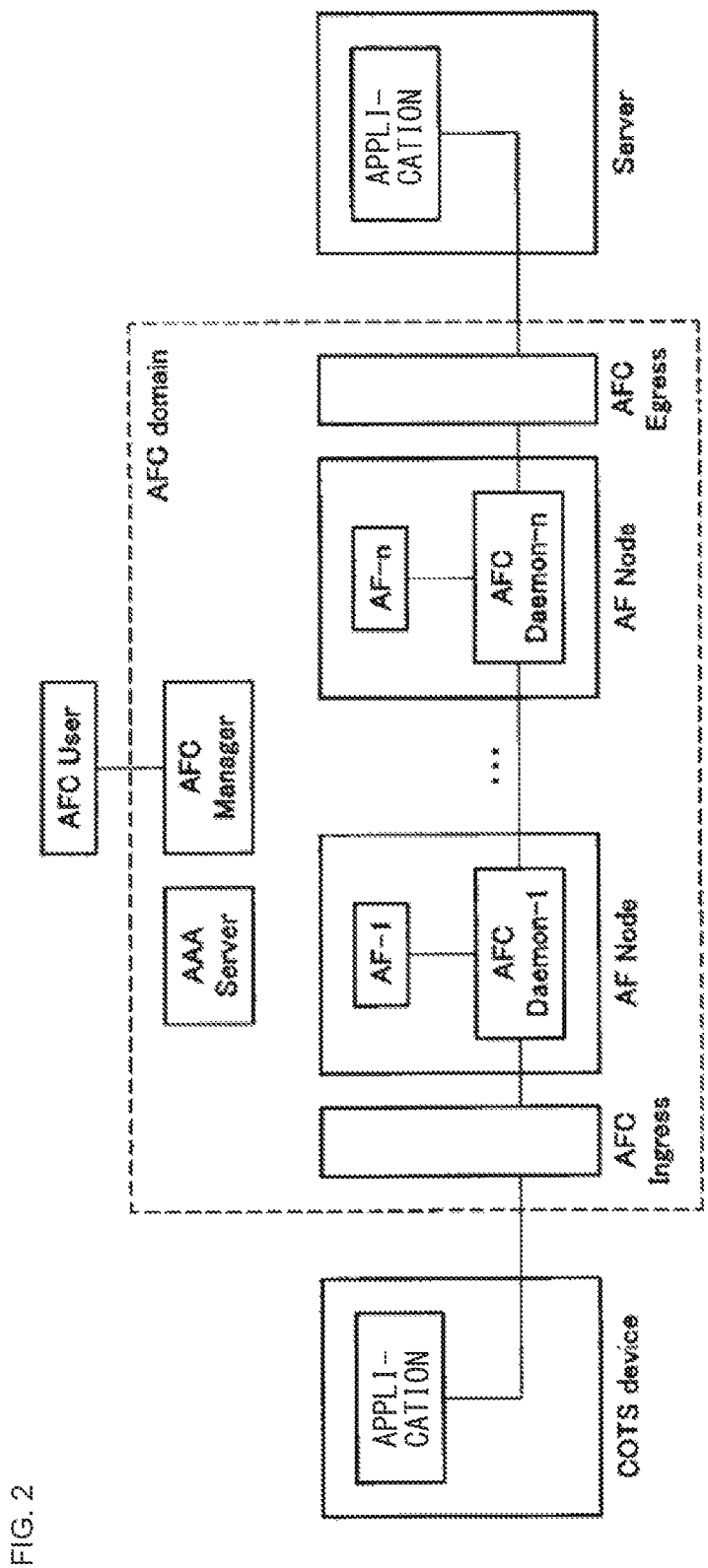
FIG. 2 is an explanatory diagram illustrating an architecture of AFC proposed in an embodiment of the present disclosure.

FIG. 2 is an explanatory diagram illustrating an architecture of AFC proposed in an embodiment of the present disclosure. A network domain allowing for setting of the AFC is referred to as an AFC domain. Nodes called an AFC Ingress and an AFC Egress are located at a boundary of the AFC domain. The AFC Ingress is a node serving as an entrance of a data packet to which the AFC is applied into the AFC domain, and the AFC Egress is a node serving as an exit of the AFC domain. The same node may operate as the AFC Ingress or as the AFC Egress. Taking a core network of a mobile phone network as an example, a case is also conceivable where an eNB, an S-GW, or a P-GW plays a role of the AFC Ingress. In FIG. 2, only one AFC Ingress and only one AFC Egress reside; however, a plurality of AFC Ingresses and a plurality of AFC Egresses may reside.

Each of the AFC Ingress and the AFC Egress has a well-known port as a port used for transmission and reception of a data packet and a port for transmitting and receiving a control packet. An AFC Manager is a node that manages the AFC in the AFC domain. An AFC User is a user who sets up the AFC in the AFC domain. An AAA Server is a node that performs authentication and authorization of the AFC User. One or more AF Nodes reside in the AFC domain. The AF Node is a node where the AF is executable.

A daemon process called AFC Daemon-p always runs on the AF Node. The AFC Daemon-p has a well-known port as a port for transmitting and receiving the control packet. In FIG. 2, the AFC Daemon-p is not illustrated. In a case where the AFC User makes a request to invoke the AF, the AFC Daemon-p invokes an AFC Daemon as a child process, and thereafter the AFC Daemon performs processing. A COTS (Commercial off-the-shelf) device is a ready-made communication device, and it is assumed that the COTS device is able to change setting of a parameter and the like, but is not able to change software. A Server is a communications partner of the COTS device. An application on the COTS device communicates with an application on the Server.

In a case where data is transmitted from the COTS device to the Server, the AFC Ingress is an example of a start node of the present disclosure, and the AFC Egress is an example of a target node of the present disclosure. In addition, the COTS device is an example of a transmission source node of the present disclosure, and the Server is an example of a transmission destination node of the present disclosure.

In AFC having a branch and a junction along a way or AFC in which the same AF is located on a plurality of AF Nodes, a path where a data packet is forwarded may be different for each data packet. A path where a data packet is actually forwarded on the AFC is referred to as an AFC path.

(Overview of Operation of AFC for COTS Device)

An overview of a procedure for applying the AFC to communication between the application on the COTS device and the application on the Server is as described in the following (1) to (8).

(1) The AFC User sets up one or more AFs to be used in the AFC on a desired AF Node. This work is referred to as AF Setup.

(2) The AFC User concatenates the set-up AFs into a straight line or a shape having a branch and a junction to set up the AFC. Structure information of the AFC is held by the AFC Ingress. This work is referred to as AFC Setup. To select a data packet to which the AFC is to be applied from data packets transmitted by the application on the COTS device, so-called 5-tuple (a source IP address, a destination IP address, a protocol, a source port number, and a destination port number) is used.

Figure 3:
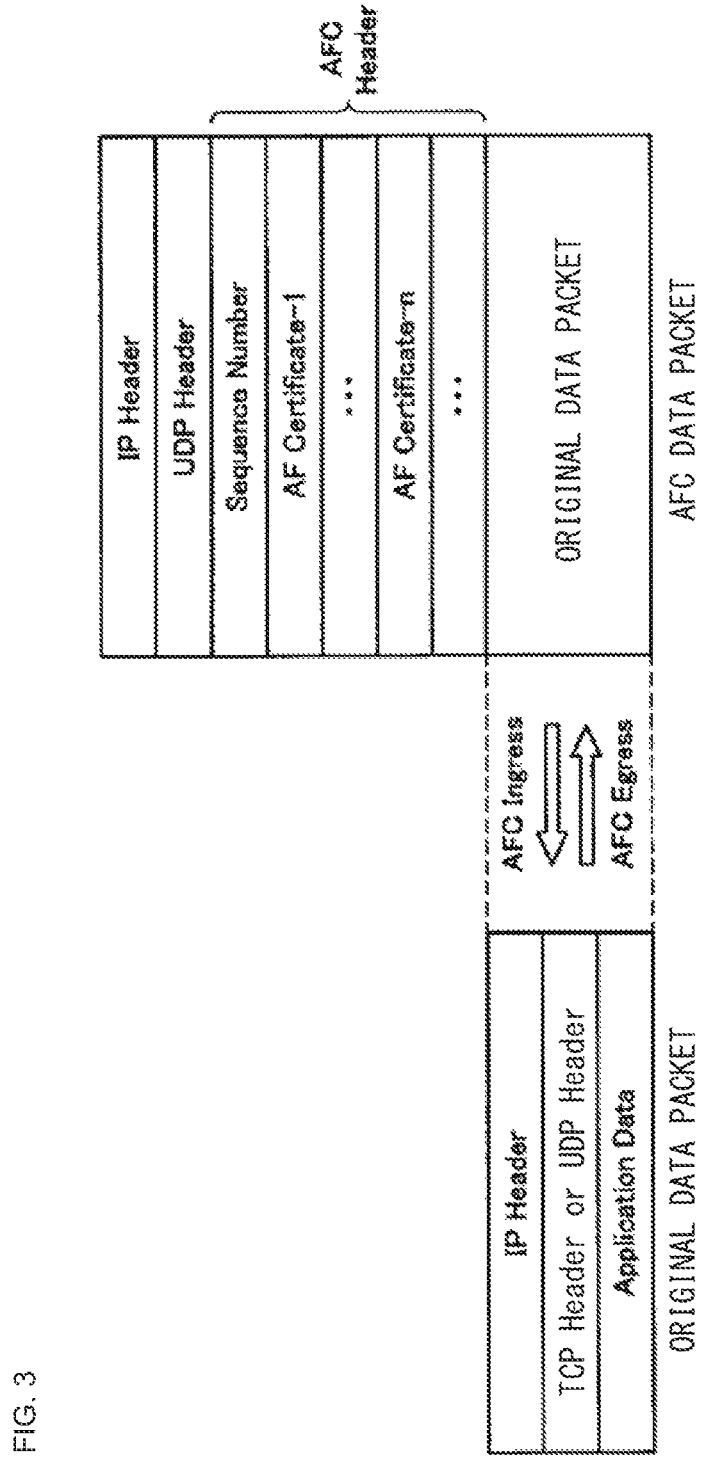
FIG. 3 is an explanatory diagram illustrating a structure of an AFC data packet.

(3) The application on the COTS device transmits a data packet by TCP/IP or UDP/IP. This packet is referred to as an original data packet. The original data packet reaches the AFC Ingress. The AFC Ingress selects AFC to be applied by the 5-tuple, and adds, to the received data packet, an IP header, a UDP header, and an AFC header for implementing the AFC. This packet is referred to as an AFC data packet. FIG. 3 is an explanatory diagram illustrating a structure of the AFC data packet. Hereinafter, the "IP header" and the "UDP header" indicate an IP header and a UDP header added to the original data packet.

(4) The AFC Ingress transmits the AFC data packet. The AFC data packet passes through AF Nodes included in the AFC, and the AF is applied to the original data packet on each of the AF Nodes. The AFC data packet then eventually reaches the AFC Egress.

(5) The AFC Egress deletes the IP header, the UDP header, and the AFC header from the AFC data packet to take out the original data packet, and transmits the taken packet.

(6) The original data packet eventually reaches the application on the Server.

(7) The AFC User deletes the AFC that is no longer necessary. This operation is referred to as AFC Delete.

(8) The AFC User deletes the AF that is no longer necessary. This operation is referred to as AF Delete.

(Role of Fields of Control Packet)

There are the following 17 kinds of control packets used in the present embodiment. The control packets include an AF Setup Request packet, an AF Setup Response packet, an AA Request packet, an AA Response packet, an AF Invoke Request packet, an AF Invoke Response packet, an AFC Setup Request packet, an AFC Setup Response packet, an AFC Install Request packet, an AFC Install Response packet, an AFC Delete Request packet, an AFC Delete Response packet, an AF Delete Request packet, an AF Delete Response packet, a Load Monitoring Request packet, a Load Monitoring Response packet, and a Feedback packet.

Each of fields of the control packets has the following role. A Type field indicates a packet type. The packet type broadly classified into a Request packet that requests an operation and a Response packet that is a response packet to the Request packet. An User ID field indicates an identifier of an AFC User. A User Credential indicates information for authentication and authorization of the AFC User. Examples of the information for authentication and authorization include a user name and a password. An AF Node IP Address field indicates an IP address of an AF Node. In the present embodiment, it is assumed that an AF is stored as an executable file in the AF Node. An AF File Name field indicates an AF executable file name. An AF Parameters field indicates a parameter in invoking an AF. A Status field indicates a result of processing for a processing request indicated by a Request packet. An AF ID field indicates an identifier of an AF. An AFC Daemon Data Port field indicates a port number for the AFC Daemon to transmit and receive an AFC data packet. An AFC Daemon Control Port field indicates a port number for the AFC Daemon to transmit and receive a control packet.

The following five fields are match fields for selecting an original data packet to which AFC is to be applied. A Source IP Address field indicates a source IP address. A Destination IP Address field indicates a destination IP address. A Protocol field indicates a kind of transport layer protocol. A Source Port field indicates a source port number. A Destination Port field indicates a destination port number.

An Ingress IP Address field indicates an IP address of the AFC Ingress. An Egress IP Address field indicates an IP address of the AFC Egress. A No of AFs field indicates the number of AFs included in AFC.

An AF Session Key field indicates key information about an AF set up by the AFC User that is shared by the AFC User, the AFC Manager, the AFC Ingress, and the AFC daemon. An AF Certificate field indicates certificate information generated from an AF Session Key. A Next Index Length field indicates a length of a Next Index field. The Next Index field indicates an index (a number representing the order in the AFC, starting from 0) of the next AF to be applied of AFs included in AFC.

An AFC Session Key field indicates key information about AFC set up by the AFC User that is shared by the AFC User, the AFC Manager, and the AFC Ingress. An AFC Certificate field indicates certificate information generated from an AFC Session Key. A Load field indicates a load of an AF Node. An In Timestamp field indicates a time when an AF Node receives an AFC data packet. An Out Timestamp field indicates a time when an AF Node transmits an AFC data packet. An Ingress Out Timestamp field indicates a time when the AFC Ingress transmits an AFC data packet. An Egress In Timestamp field indicates a time when the AFC Egress receives an AFC data packet.

(Roles of Fields of AFC Header)

A header of a data packet in AFC includes an IP header, a UDP header, and an AFC header. In the present embodiment, for the IP header, attention is focused only on a source IP address (Src IP) field and a destination IP address (Dst IP) field. For the UDP header, attention is focused only on a source port (Src Port) field and a destination port (Dst Port) field.

The AFC header includes the following fields. An AFC ID field indicates an identifier of AFC. A Sequence Number field indicates a sequence number of an AFC data packet. The sequence number is assigned to each AFC. An Ingress Out Timestamp field indicates a time when the AFC Ingress transmits an AFC data packet. It is possible to set various flags in a Flags field. In the present embodiment, only a Feedback flag is defined. In a case where the AFC Egress receives an AFC data packet to which the Feedback flag is set, the AFC Egress transmits an AFC Feedback packet to the AFC Ingress. A No of AFs field indicates the number of AFs included in AFC. An AF Index field indicates an index (starting from 0) of the next AF to be applied. An AF Node IP Address field indicates an IP address of an AF Node. A Daemon Data Port field indicates a port number used by the AFC Daemon for transmission and reception of an AFC data packet. An AF ID field indicates an identifier of an AF. An AF Certificate field indicates certificate information generated from key information about an AF set up by the AFC User that is shared by the AFC User and the AFC Daemon. A Next Index Length field indicates a length of a Next Index field. The Next Index field indicates an index of the next AF to be applied. This field includes a pair of "a conditional expression: an index of an AF". An In Timestamp field indicates a time when an AF Node receives an AFC data packet. An Out Timestamp field indicates a time when an AF Node transmits an AFC data packet. An Egress IP Address indicates the IP address of the AFC Egress. An Egress Data Port field indicates a port number for the AFC Egress to receive an AFC data packet.

(Roles of Fields of Management Table)

The AFC Daemon holds a Daemon AF Table and a Daemon AFC Table as management tables. The AFC Manager holds a Manager User Table, a Manager AFC Table, a Manager AF Table, a Manager AF List, and a Manager AF Node Table as management tables. The AFC Ingress holds an Ingress AFC Table, an Ingress AF Table, an Ingress AF Node Table, an Ingress AFC Path List Table, an Ingress AFC Path List Entry, and an Ingress AF Node TS Table as management tables.

Each of fields of the management tables has the following role. A ptr to next User Table field indicates a pointer pointing another User Table. A ptr to AF Table field indicates a pointer pointing another AF Table. A ptr to next AF Table field indicates a pointer pointing another AF Table. A User ID field indicates an identifier of the AFC User. A Time to Live field indicates a time until setting information related to the AFC User times out. An AF ID field indicates an identifier of an AF. An AF In Port field indicates a port number used in a case where an original data packet is inputted into an AF. An AF Out Port field indicates a port number used in a case where the processed original data packet is received from an AF. An AFC Session Key indicates key information about AFC set up by the AFC User that is shared by the AFC User and the AFC Manager. An AF Session Key field indicates key information about an AF set up by the AFC User that is shared by the AFC User, the AFC Manager, the AFC Ingress, and the AFC daemon. An AF Node IP Address field indicates an IP address of an AF Node. A Daemon Data Port field indicates a port number used by the AFC Daemon for transmission and reception of an AFC data packet. A Daemon Control Port field indicates a port number used by the AFC Daemon for transmission and reception of a control packet. An Ingress IP Address field indicates the IP address of the AFC Ingress. An Egress IP Address field indicates the IP address of the AFC Egress. A Sequence Number field indicates a sequence number of a most recently received AFC data packet. A Next Index Length field indicates a length of a Next Index field. The Next Index field indicates an index of the next AF to be applied. This field includes a pair of "a conditional expression: an index of an AF". A Load field indicates a load of an AF Node. A ptr to Next AFC Path List Table field indicates a pointer pointing another AFC Path List Table. A ptr to AFC Path List Entry field indicates a pointer pointing an AFC Path List Entry. An AFC Path ID field indicates an identifier of a AFC path. A ptr to next AFC Path List Entry field indicates a pointer pointing another AFC Path List Entry. A ptr to AF Node TS Table field indicates a pointer pointing an AF Node TS Table. An Ingress Out Timestamp field indicates a time when the AFC Ingress transmits an AFC data packet. An Egress In Timestamp field indicates a time when the AFC Egress receives an AFC data packet. A ptr to next AF Node TS Table field indicates a pointer to another AF Node TS Table. An In Timestamp field indicates a time when an AF Node receives an AFC data packet. An Out Timestamp field indicates a time when the AF Node transmits an AFC data packet.

(Security Measures)

In the present embodiment, the following is assumed to maintain security. It is assumed that a safe communication path such as a TLS (Transport Layer Security) is set between the AFC Manager and the AAA server in advance. It is assumed that it is possible to establish TLS connection between the AFC User and the AFC Manager, between the AFC Manager and the AFC Ingress, between the AFC Ingress and the AFC Egress, and between the AFC Manager and an AF Node as necessary. In addition, it is assumed that parameter setting in the COTS device makes it possible to establish a safe communication path between the COTS device and the AFC Ingress by an authentication system such as WPA2 (Wi-Fi Protected Access 2) in Wi-Fi.

Figure 4:
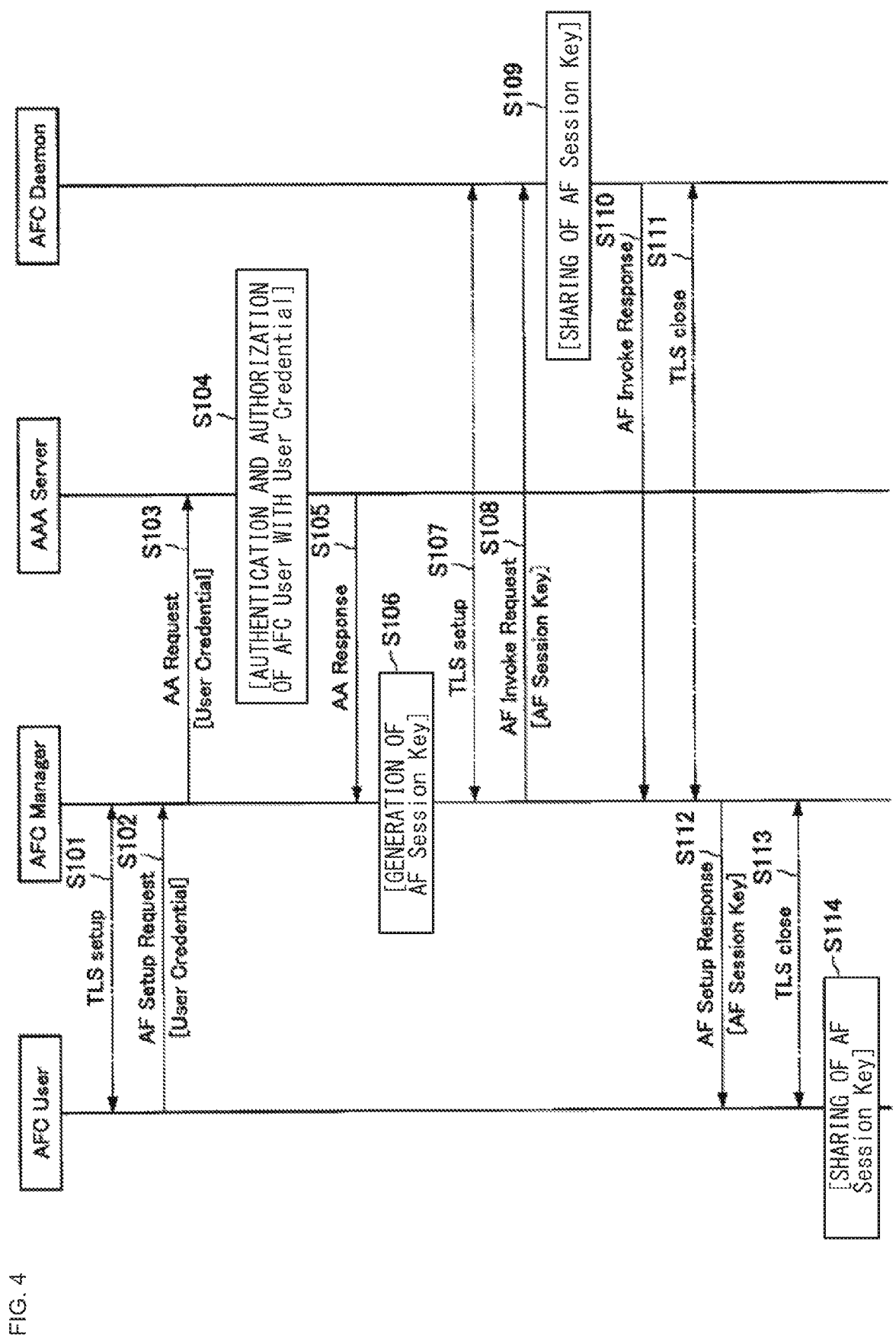
FIG. 4 is an explanatory diagram illustrating security measures in setup of an AF.

FIG. 4 is an explanatory diagram illustrating security measures in setup of an AF. The AFC User establishes TSL connection with the AFC Manager (step S101). In a case where the AFC User sets up an AF on an AF Node, the AF User transmits an AF setup request packet (AF Setup Request Packet) including authentication/authorization information (User Credential) to the AFC Manager (step S102).

The AFC Manager transmits an authentication/authorization request packet (AA Request packet) including the User Credential to the AAA server (step S103). The AAA Server verifies the User Credential, and performs authentication and authorization of the AFC User (step S104). The authentication and authorization of the AFC User include verification of authenticity of the AFC User and verification of whether or not the AFC User has the authority to set up and use a specific AF on a specific AF Node.

The AAA Server returns a result of the authentication and the authorization to the AFC Manager (step S105). In a case where the authentication and the authorization have succeeded, the AFC Manager generate an AF Session Key (step S106). The AF Session Key may be generated by any method. The AF Session Key may include random numbers having any length, for example.

Subsequently, the AFC Manager establishes TLS connection with the AFC Daemon (step S107). The AFC Manager transmits an AF invoke request packet (AF Invoke Request packet) including the AF Session Key to the AFC Daemon (step S108).

The AFC Daemon invokes a specified AF (not illustrated in FIG. 4). The AFC Daemon then stores the AF Session Key to share the AF Session Key (step S109).

The AFC Daemon returns a result of invoking of the AF to the AFC Manager (step S110). Subsequently, the AFC Manager disconnects the TLS connection with the AFC Daemon (step S111).

Subsequently, the AFC Manager returns a packet (AF Setup Response Packet) including the AF Session Key and a result of setup of the AF to the AFC User (step S112). The AFC User disconnects the TLS connection with the AFC Manager (step S113). The AFC User then stores the AF Session Key to share the AF Session Key (step S114).

Only the AFC User having the authority as described above is allowed to set and use the AF. Information about the AFC User having the authority to set up and use the AF is shared as the AF Session Key by the AFC User, the AFC Manager, and the AFC Daemon. The AF Session Key is generated for each set-up AF.

(Security Measures in Setup of AFC)

Figure 5:
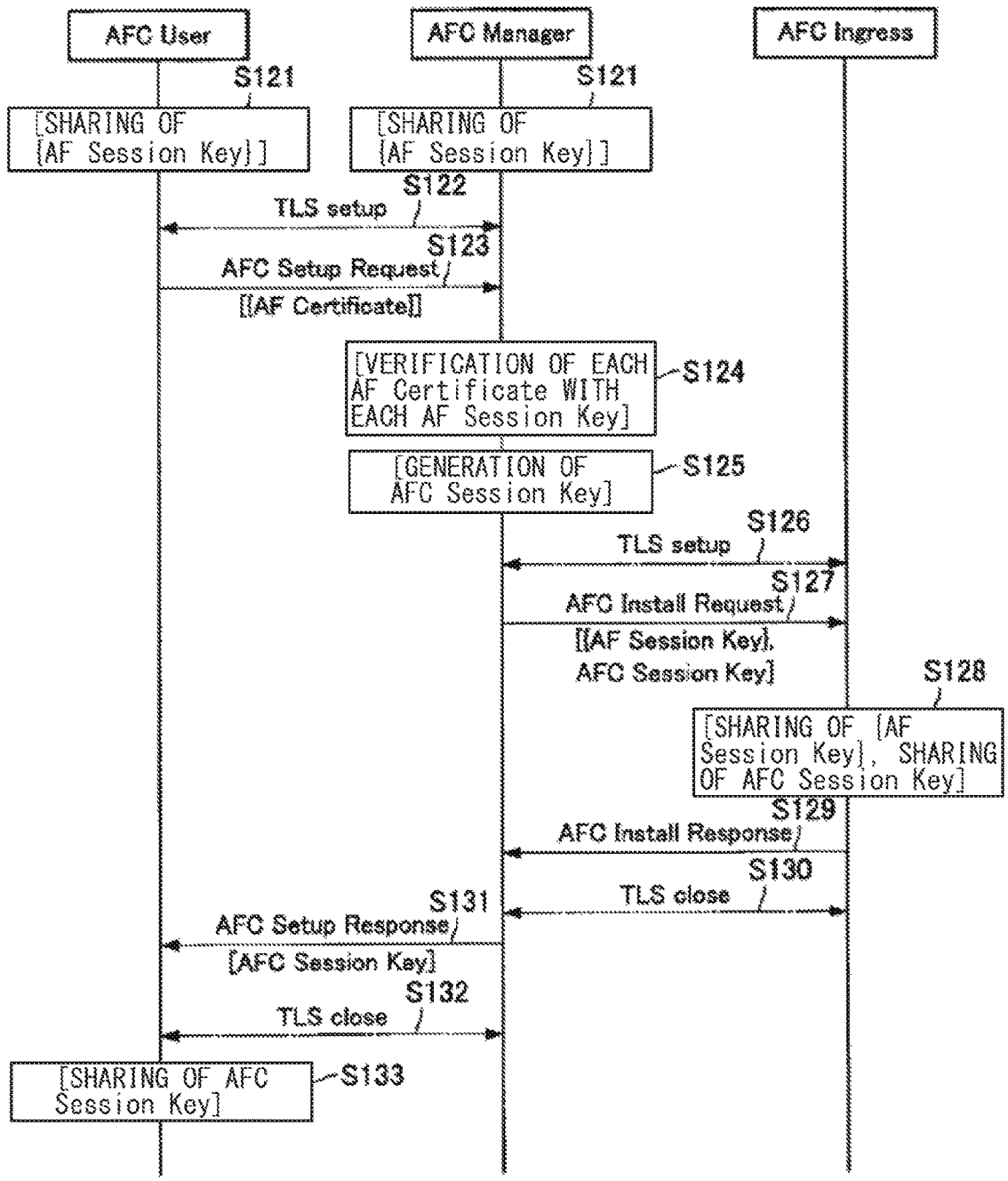
FIG. 5 is an explanatory diagram illustrating security measures in setup of AFC.

Next, description is given of security measures in setup of AFC. FIG. 5 is an explanatory diagram illustrating security measures in setup of AFC.

For all AFs included in AFC to be set up, the AF Session Key is shared by the AFC User and the AFC Manager by processing illustrated in FIG. 4 (step S121).

The AFC User establishes TLS connection with the AFC Manager (step S122). Subsequently, the AFC User transmits an AFC setup request packet (AFC Setup Request packet) including an AF Certificate related to all the AFs included to the AFC to the AFC Manager (step S123). The AF Certificate is certificate information generated from the AF Session Key. Conceivable examples of a method of generating the AF Certificate include a method in which the AF certificate is a bit string resulting from causing a hash function to operate on a bit string in which an identifiers of an AF and the AF Session Key are linked, and the like.

The AFC Manager verifies the AF Certificate for all the AFs included in the AFC Setup Request with use of the AF Session Key held by the AFC Manager (step S124). In a case where verification of the AF Certificate for all the AFs included in the AFC Setup Request has succeeded, the AFC Manager generates an AFC Session Key (step S125). The AFC Session Key may be generated by any method. The AFC Session Key may include random numbers having any length, for example.

Subsequently, the AFC Manager establishes TLS connection with the AFC Ingress (step S126). The AFC Manager then transmits an AFC setup request packet (AFC Install Request packet) including the AF Session Key and the AFC Session Key related to all the AFs included in the AFC Setup Request to the AFC Ingress (step S127).

The AFC Ingress stores the AFC setup information (not illustrated in FIG. 5), and stores the AF Session Key and the AFC Session Key related to all the AFs included in the AFC to share the AF Session Key (step S128).

Subsequently, the AFC Ingress returns a result of AFC setup processing to the AFC Manager (step S129). The AFC Manager disconnects the TLS connection with the AFC Ingress (step S130).

The AFC Manager returns a packet (AFC Setup Response packet) including the result of the AFC setup processing and the AFC Session Key to the AFC User (step S131). The AFC User disconnects the TLS connection with the AFC Manager (step S132). The AFC User then stores the AFC Session Key to share the AF Session Key (step S133).

In a case where the AFC User sets up the AFC as described above, the authority of the AFC User is confirmed. The AFC Session Key is generated for each AFC, and is shared by the AFC User, the AFC Manager, and the AFC Ingress. In addition, the AF Session Key is also shared by the AFC Ingress in addition to the AFC User, the AFC Manager, and the AFC Daemon.

(Security Measures in Data Packet Forwarding)

Figure 6:
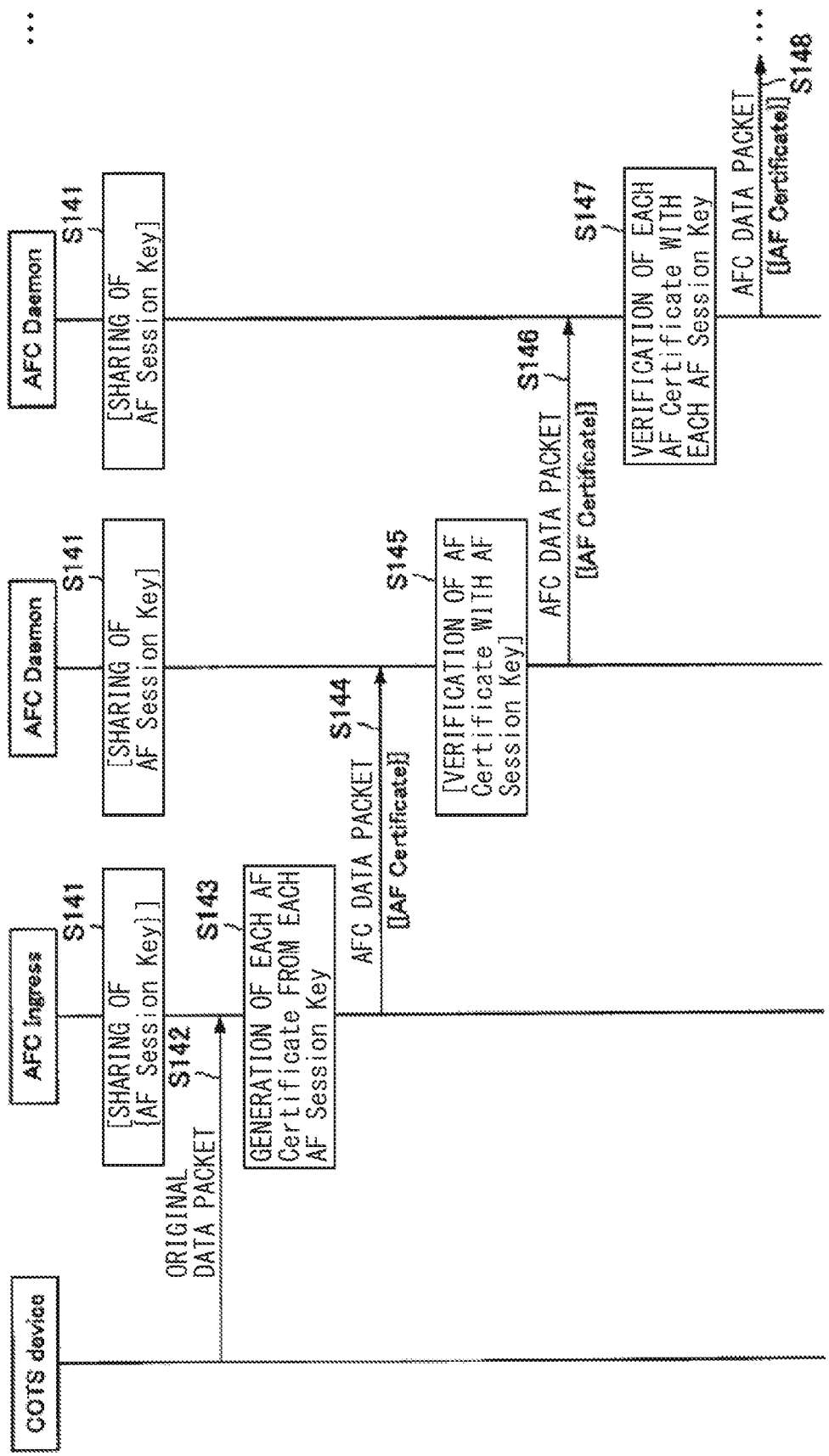
FIG. 6 is an explanatory diagram illustrating security measures in data packet forwarding.

Next, description is given of security measures in data packet forwarding. FIG. 6 is an explanatory diagram illustrating security measures in data packet forwarding.

The AF Session Key related to each of the AFs included in AFC is shared by the AFC User, the AFC Daemon, and the AFC Ingress by processing illustrated in FIG. 4 and FIG. 5 (step S141).

The COTS device transmits an original data packet (step S142). In a case where the AFC Ingress receives the original data packet and transmits an AFC data packet, the AFC Ingress generates an AF Certificate from the AF Session Key related to each of the AFs included in the AFC, and includes the AF Certificate in the AFC header (step S143). Conceivable examples of a method of generating the AF Certificate include a method in which the AF Certificate is a bit string resulting from causing a hash function to operate on a bit string in which a sequence number, an identifiers of an AF, and the AF Session Key are linked, and the like.

Subsequently, the AFC Ingress transmits the AFC data packet to the AFC Daemon (step S144). The AFC Daemon verifies the AF Certificate related to an AF that is to operate on the AFC Daemon (step S145). In a case where verification has succeeded, the AFC Daemon applies the AF to the AFC data packet (not illustrated in FIG. 6). The AFC Daemon forwards the AFC data packet to the next AFC Daemon (step S146).

From then on, similar processing is performed in an AFC path. Even if an invalid node forges an invalid AFC data packet and transmits the invalid AFC data packet to an AF node, the above-described processing makes it possible for the AFC Daemon to detect that the transmitted AFC data packet is an invalid AFC data packet. In a case where the AFC Ingress receives the original data packet and transmits the AFC data packet, the AFC Ingress increments the sequence number for each packet, and includes the sequence number in the AFC header. The sequence number is assigned to each AFC. Meanwhile, the AFC Daemon records the sequence number of the received AFC data packet. Accordingly, even if the invalid node intercepts and stores a valid AFC data packet, and thereafter transmits the intercepted packet (a replay attack), the AFC Daemon is able to detect the replay attack. Using the sequence number in generating the AF Certificate as described above makes it possible to also detect a forged sequence number.

(Security Measures in Deletion of AFC)

Figure 7:
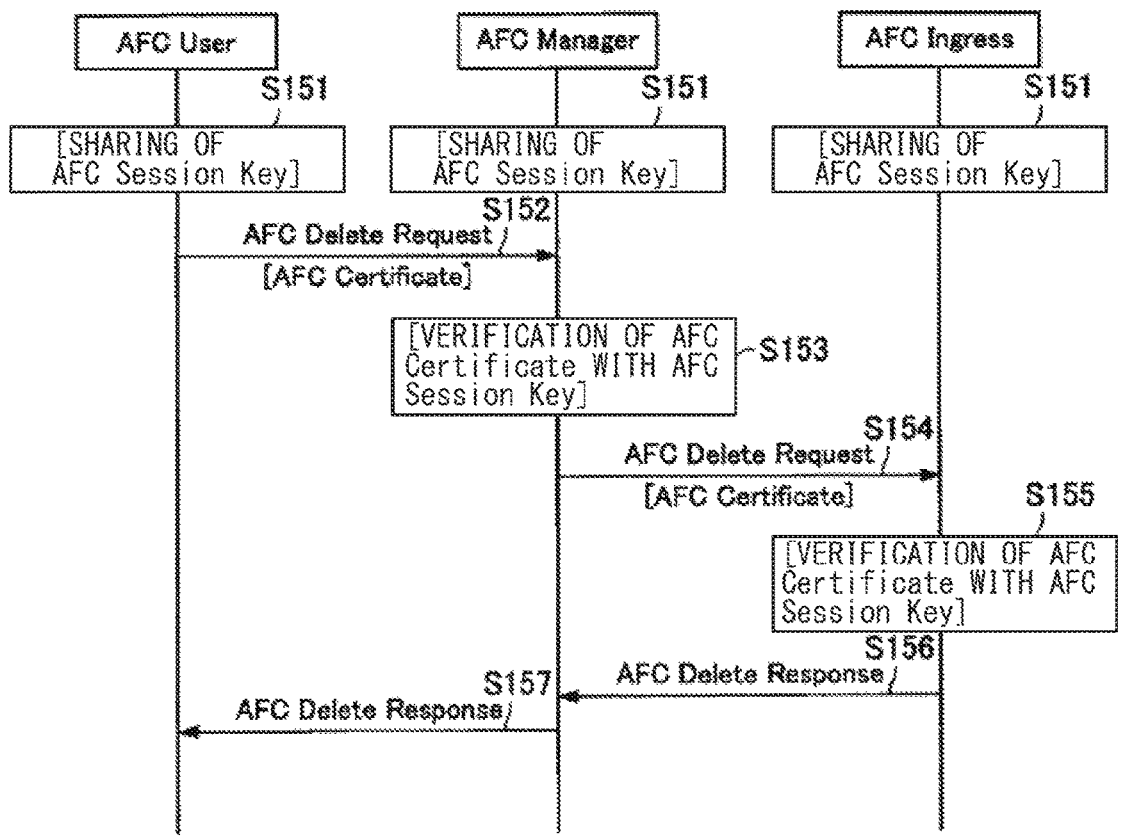
FIG. 7 is an explanatory diagram illustrating security measures in deletion of AFC.

Next, description is given of security measures in deletion of AFC. FIG. 7 is an explanatory diagram illustrating security measures in deletion of AFC.

The AFC User, the AFC Manager, and the AFC Ingress share the AFC Session Key related to AFC to be deleted, by processing illustrated in FIG. 5 (step S151).

The AFC User transmits an AFC delete request packet (AFC Delete Request packet) including an AFC Certificate to the AFC Manager (step S152). Conceivable examples of a method of generating the AFC Certificate include a method in which the AFC Certificate is a bit string resulting from causing a hash function to operate on a bit string in which an identifier of AFC and the AFC Session Key are linked, and the like.

The AFC Manager verifies the AFC Certificate and confirms that the AFC User has the authority related to target AFC (step S153). Next, the AFC Manager forwards the AFC Delete Request packet to the AFC Ingress (step S154).

The AFC Ingress verifies the AFC Certificate (step S155), and confirms that the AFC User has the authority related to the target AFC, and deletes setting of the AFC (not illustrated in FIG. 7). Subsequently, the AFC Ingress sends back a response packet to the AFC Manager (step S156). The AFC Manager forwards the response packet to the AFC User (step S157). As described above, only the AFC User having the authority is allowed to delete the AFC.

(Security Measures in Deletion of AF)

Figure 8:
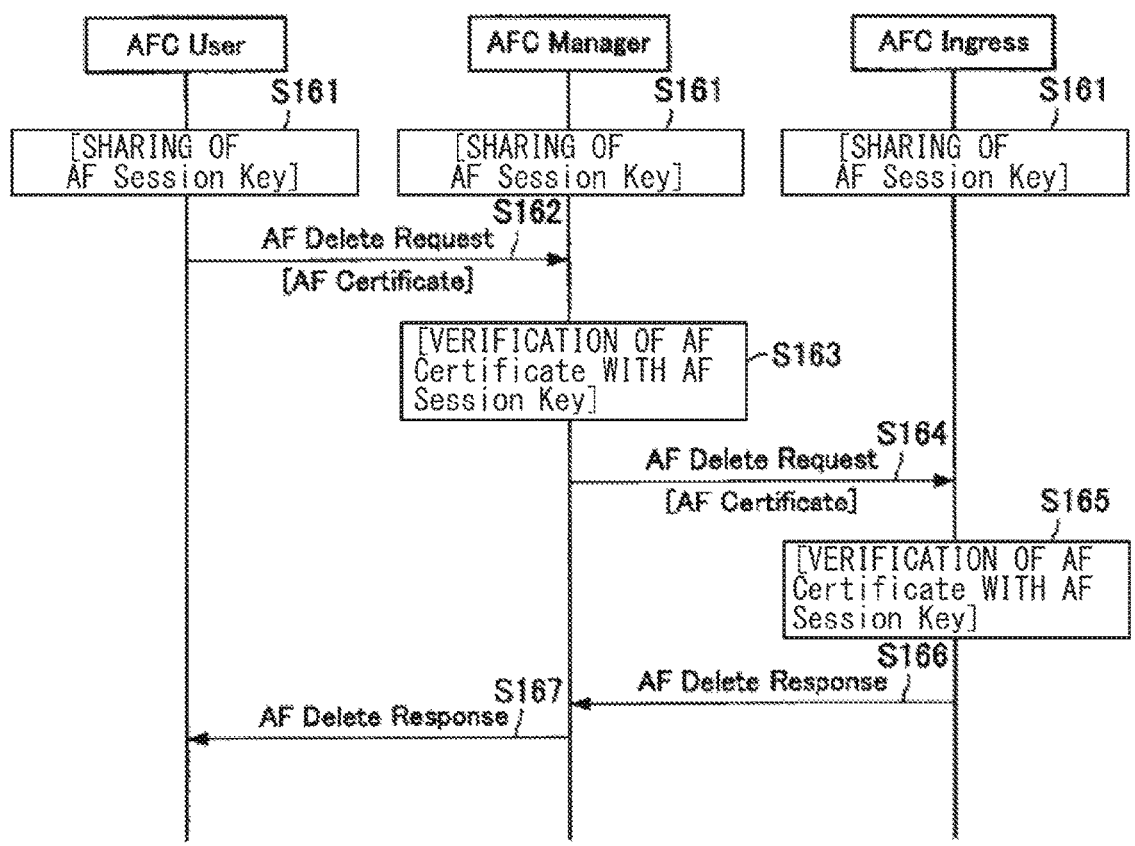
FIG. 8 is an explanatory diagram illustrating security measures in deletion of an AF.

Next, description is given of security measures in deletion of an AF. FIG. 8 is an explanatory diagram illustrating security measures in deletion of the AF.

The AFC User, the AFC Manager, and the AFC Daemon share the AF Session Key related to an AF to be deleted, by the processing illustrated in FIG. 4 (step S161).

The AFC User transmits an AF delete request packet (AF Delete Request packet) including an AF Certificate related to the AF to be deleted to the AFC Manager (step S162). Conceivable examples of a method of generating the AF Certificate include a method in which the AF Certificate is a bit string resulting from causing a hash function to operate on a bit string in which an identifier of an AF and the AF Session Key are linked, and the like.

The AFC Manager verifies the AF Certificate with use of the AF Session Key (step S163), and in case where verification has succeeded, related information is deleted (not illustrated in FIG. 8). Subsequently, the AFC Manager forwards the AF Delete Request packet to the AFC Daemon (step S164).

The AFC Daemon verifies the AF Certificate with use of the AF Session Key (step S165), and in a case where verification has succeeded, the AF is deleted, and related information is deleted (not illustrated in FIG. 8). The AFC Ingress returns a response packet to the AFC Manager (step S166). The AFC Manager forwards the response packet to the AFC User (step S167). As described above, only the AFC User having the authority is allowed to delete the AF.

(Setup of AF-1 on AF Node-1)

Figure 9:
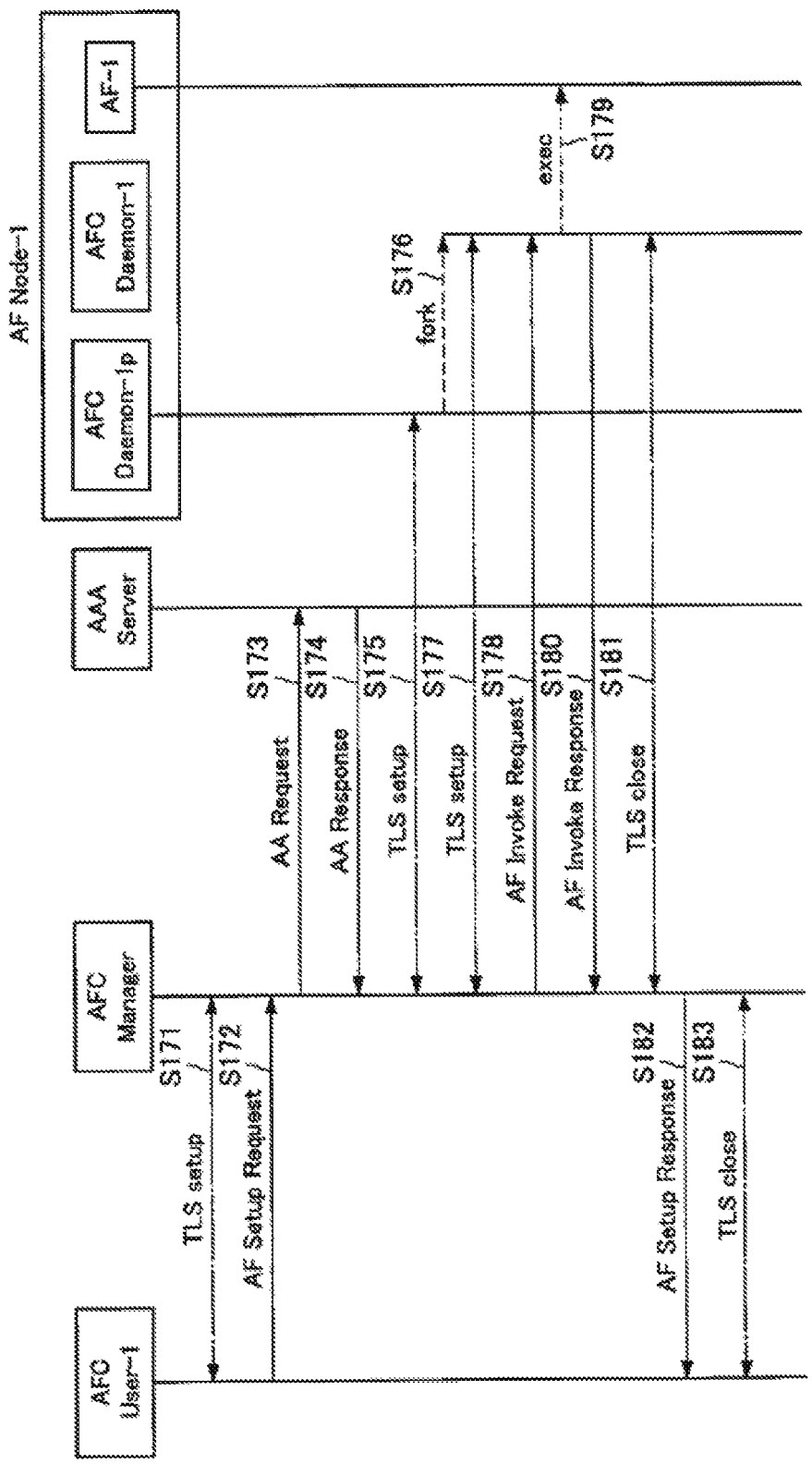
FIG. 9 is an explanatory diagram illustrating a procedure for setting up an AF on an AF Node.

Next, description is given of setup of an AF (AF-1) on a certain AF Node (referred to as an AF Node-1). FIG. 9 is an explanatory diagram illustrating a procedure for setting up the AF-1 on the AF Node-1 by an AFC User-1. An identifier of the AFC User-1 is USRID-1. A credential of the AFC User-1 is USRCred-usr1. An executable file name of the AF-1 is FName-af1. A parameter in executing the AF-1 is Param-af1. An IP address of the AF Node-1 is IP-afn1.

First, the AFC User-1 establishes TLS connection with the AFC Manager (step S171).

Subsequently, the AFC User-1 transmits an AF Setup Request packet illustrated in FIG. 10 to the AFC Manager (step S172). A value of each field of the AF Setup Request packet is as follows. "AF Setup Request" is set to the Type field. USRID-1 is set to the User ID field. USRCred-usr1 is set to the User Credential field. IP-afn1 is set to the AF Node IP Address field. FName-af1 is set to the AF File Name field. Param-af1 is set to the AF Parameters field.

In a case where the AFC Manager receives the AF Setup Request packet, the AFC manager transmits an AA Request packet illustrated in FIG. 12 to the AAA Server (step S173). A value of each field of the AA Request packet is as follows. "AA Request" is set to the Type field. USRID-1 that is the value of the User ID field of the AF Setup Request packet is set to the User ID field. USRCred-usr1 that is the value of the User Credential field of the AF Setup Request packet is set to the User Credential field. IP-afn1 that is the value of the AF Node IP Address field of the AF Setup Request packet is set to the AF Node IP Address field. FName-af1 that is the value of the AF File Name field of the AF Setup Request packet is set to the AF File Name field.

In a case where the AAA Server receives the AA Request packet, the AAA Server confirms whether or not the User-1 has the authority to invoke the AF-1 on the AF Node-1 with use of the value of the User Credential field. In a case where confirmation has succeeded, the AA Server transmits an AA Response packet illustrated in FIG. 13 to the AFC Manager (step S174). A value of each field of the AA Response packet is as follows. "AA response" is set to the Type field. "OK" indicating success of authentication and authorization is set to the Status field. USRID-1 that is the value of the User ID field of the AA Request packet is set to the User ID field.

In a case where the AFC Manager receives the AA Response packet, the AFC Manager knows the IP address of the AF Node-1 from the AF Node IP address field of the AF Setup Request packet, and starts processing of establishing TLS connection with an AFC Daemon-1-*p* on the AF Node-1 (step S175). In a case where the AFC Daemon-1-*p* receives an TLS connection establishment request, the AFC Daemon-1-*p* generates an AFC Daemon-1 that is a child process (step S176). The AFC Daemon-1 performs subsequent processing. As a result, TLS connection is established between the AFC Manager and the AFC Daemon-1 (step S177).

Subsequently, the AFC Manager assigns AFID-1 as an identifier to the AF-1, and generates AFSKey-af1 as a session key related to the AF-1. Next, the AFC Manager transmits an AF Invoke Request packet illustrated in FIG. 14 to the AFC Daemon-1 (step S178). A value of each field of the AF Invoke Request packet is as follows. "AF Invoke Request" is set to the Type field. USRID-1 that is the value of the User ID field of the AF Setup Request packet is set to the User ID field. AFID-1 is set to the AF ID field. AFSKey-af1 is set to the AF Session Key field. FName-af1 that is the value of the AF File Name field of the AF Setup Request packet is set to the AF File Name field. Param-af1 that is the value of the AF Parameters field of the AF Setup Request packet is set to the AF Parameters field.

In a case where the AFC Daemon-1 receives the AF Invoke Request packet, the AFC Daemon-1 invokes an executable file specified by the AF File Name field, and regards the executable file as the AF-1 (step S179). At this time, the AFC Daemon-1 couples a standard input and a standard output of the AF-1 to InPt-af1 and OutPt-af1 that are ports of the AFC Daemon-1, respectively. Next, the AFC Daemon-1 generates DPt-afcd1 as a port for transmitting and receiving an AFC data packet, and generates CPt-afcd1 as a port for transmitting and receiving a control packet.

Next, the AFC Daemon-1 creates a Daemon AF Table illustrated in FIG. 16. A value of each field of the Daemon AF Table is as follows. [null] is set to the ptr to next AF Table field. AFID-1 that is the value of the AF ID field of the AF Invoke Request packet is set to the AF ID field. InPt-af1 is set to the AF In Port field. OutPt-af1 is set to the AF Out Port field. USRID-1 that is the value of the USER ID field of the AF Invoke Request packet is set to the User ID field. AFSKey-af1 that is the value of the AF Session Key field of the AF Invoke Request packet is set to the AF Session Key field.

Next, the AFC Daemon-1 transmits an AF Invoke Response packet illustrated in FIG. 15 to the AFC Manager (step S180). A value of each field of the AF Invoke Response packet is as follows. "AF Invoke Response" is set to the Type field. "OK" indicating success of processing is set to the Status field. USRID-1 that is the value of the User ID field of the AF Invoke Request packet is set to the User ID field. AFID-1 that is the value of the AF ID field of the AF Invoke Request packet is set to the AF ID field. DPt-afcd1 is set to the AFC Daemon Data Port field. CPt-afcd1 is set to the AFC Daemon Data Port field.

Figure 17:
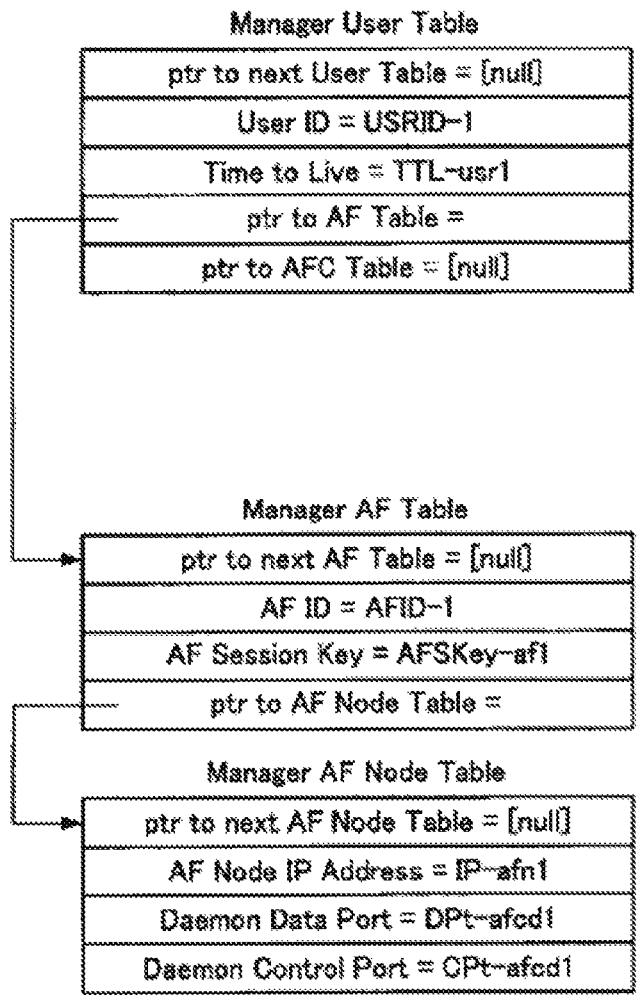
FIG. 17 is an explanatory diagram illustrating structure examples of a Manager User Table, a Manager AF Table, and a Manager AF Node Table.

In a case where the AFC Manager receives the AF Invoke Response packet, the AFC Manager creates a Manager User Table, a Manager AF Table, and a Manager AF Node Table illustrated in FIG. 17.

A value of each field of the Manager User Table is as follows. [null] is set to the ptr to next User Table. USRID-1 that is the value of the User ID field of the AF Setup Request packet is set to the User ID field. TTL-usr1 that is a time until setting information of the AFC User-1 times out is set to the Time to Live field. A pointer pointing an AF Table is set to the ptr to AF Table field. [null] is set to the ptr to AFC Table field.

A value of each field of the Manager AF Table is as follows. [null] is set to the ptr to next AF Table. AFID-1 is set to the AF ID field. AFSKey-af1 is set to the AF Session Key field. A pointer pointing the Manager AF Node Table is set to the ptr to AF Node Table field.

A value of each field of the Manager AF Node Table is as follows. [null] is set to the ptr to next AF Node Table. IP-afn1 that is the value of the AF Node IP Address field of the AF Setup Request packet is set to the AF Node IP Address field. DPt-afcd1 that is the value of the Daemon Data Port field of the AF Invoke Response packet is set to the Daemon Data Port field. CPt-afcd1 that is the value of the Daemon Control Port field of the AF Invoke Response packet is set to the Daemon Control Port field.

In a case where the AFC Manager receives the AF Invoke Response packet, the AFC Manager disconnects the TLS connection with the AFC Daemon-1 (step S181).

Subsequently, the AFC Manager transmits an AF Setup Response packet illustrated in FIG. 11 to the AFC User-1 (step S182). A value of each field of the AF Setup Response packet is as follows. "AF Setup Response" is set to the Type field. "OK" indicating success of processing is set to the Status field. USRID-1 that is the value of the User ID field of the AF Setup Request packet is set to the User ID field. AFID-1 that is the value of the AF ID field of the AF Invoke Response packet is set to the AF ID field. AFSKey-af1 is set to the AF Session Key field.

In a case where the AFC User-1 receives the AF Setup Response packet, the AFC User-1 disconnects the TLS connection with the AFC Manager (step S183).

(Setup of AF-2 on AF Node-2 and Setup of AF-3 on AF Node-3)

Next, it is assumed that the AFC User-1 sets up the AF-2 on an AF Node-2 and sets up an AF-3 on an AF Node-3 by a procedure similar to the above-described procedure. An executable file name of the AF-2 is FName-af2. A parameter in executing the AF-2 is Param-af2. It is assumed that AFID-2 is assigned as an identifier of the AF-2. An IP address of the AF Node-2 is IP-afn2. An AFD Daemon operating on the AF Node-2 is AFC Daemon-2. It is assumed that InPt-af2 and OutPt-af2 are assigned as ports where the AFC Daemon-2 exchanges data with the AF-2. It is assumed that AFSKey-af2 is generated as an AF session Key for the AF-2. An executable file name of the AF-3 is FName-af3. A parameter in executing the AF-3 is Param-af3. It is assumed that AFID-3 is assigned as an identifier of the AF-3. An IP address of the AF Node-3 is IP-afn3. An AFC Daemon operating on the AF Node-3 is AFC Daemon-3. It is assumed that InPt-af3 and OutPt-af3 are assigned as ports where the AFC Daemon-3 exchanges data with the AF-3. It is assumed that AFSKey-af3 is generated as an AF Session key for the AF-3.

Figure 18:
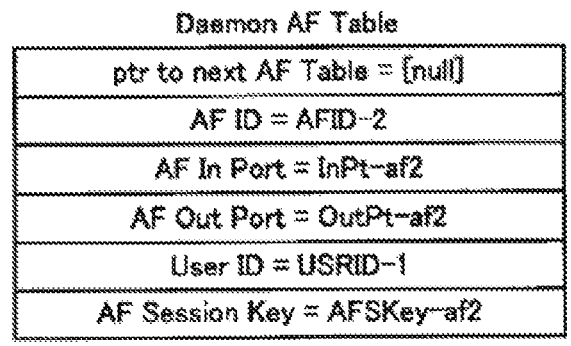
FIG. 18 is an explanatory diagram illustrating a structure example of a Daemon AF Table.
Figure 20:
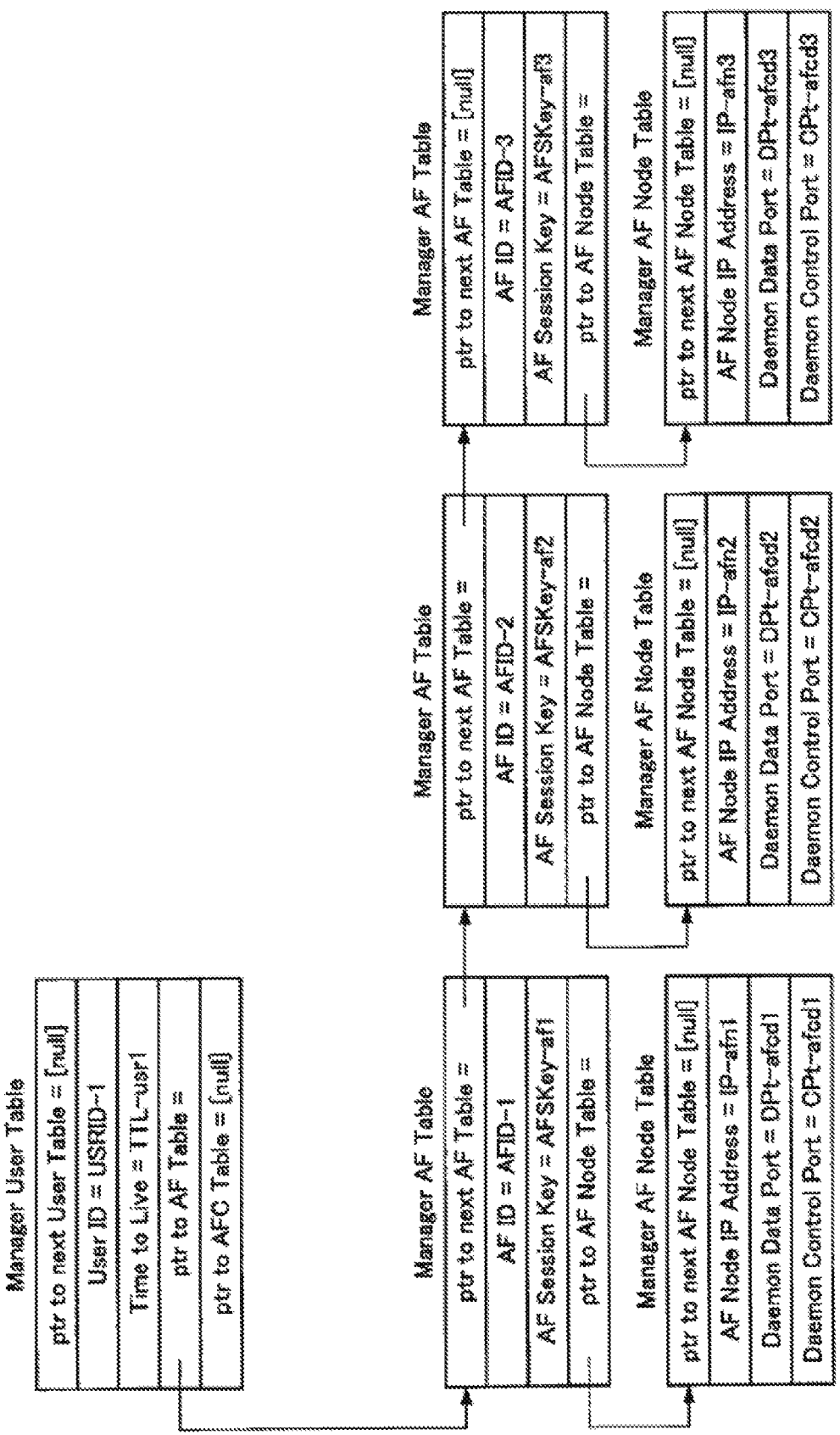
FIG. 20 is an explanatory diagram illustrating a structure example of a table held by an AFC Manager.

Then, the AFC Daemon-2 on the AFC Node-2 and the AFC Daemon-3 on the AFC Node-3 respectively hold Daemon AF Tables illustrated in FIG. 18 and FIG. 19. In addition, the AFC Manager holds a table illustrated in FIG. 20. FIG. 20 illustrates a Manager AF Table for the AF-2, a Manager AF Table for the AF-3, a Manager AF Node Table for the AF Node-2, and a Manager AF Node Table for the AF Node-3 in addition to the table illustrated in FIG. 17.

(Setup of Linear AFC: AFC-1)

Figure 21:
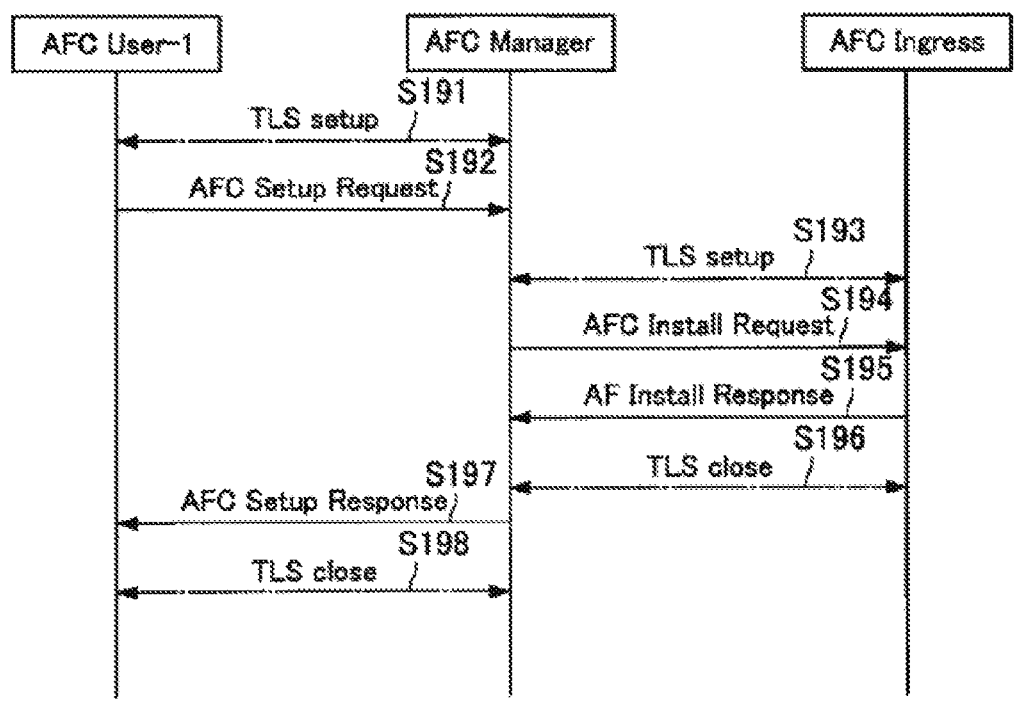
FIG. 21 is an explanatory diagram illustrating a procedure for setting up AFC-1.
Figure 22:
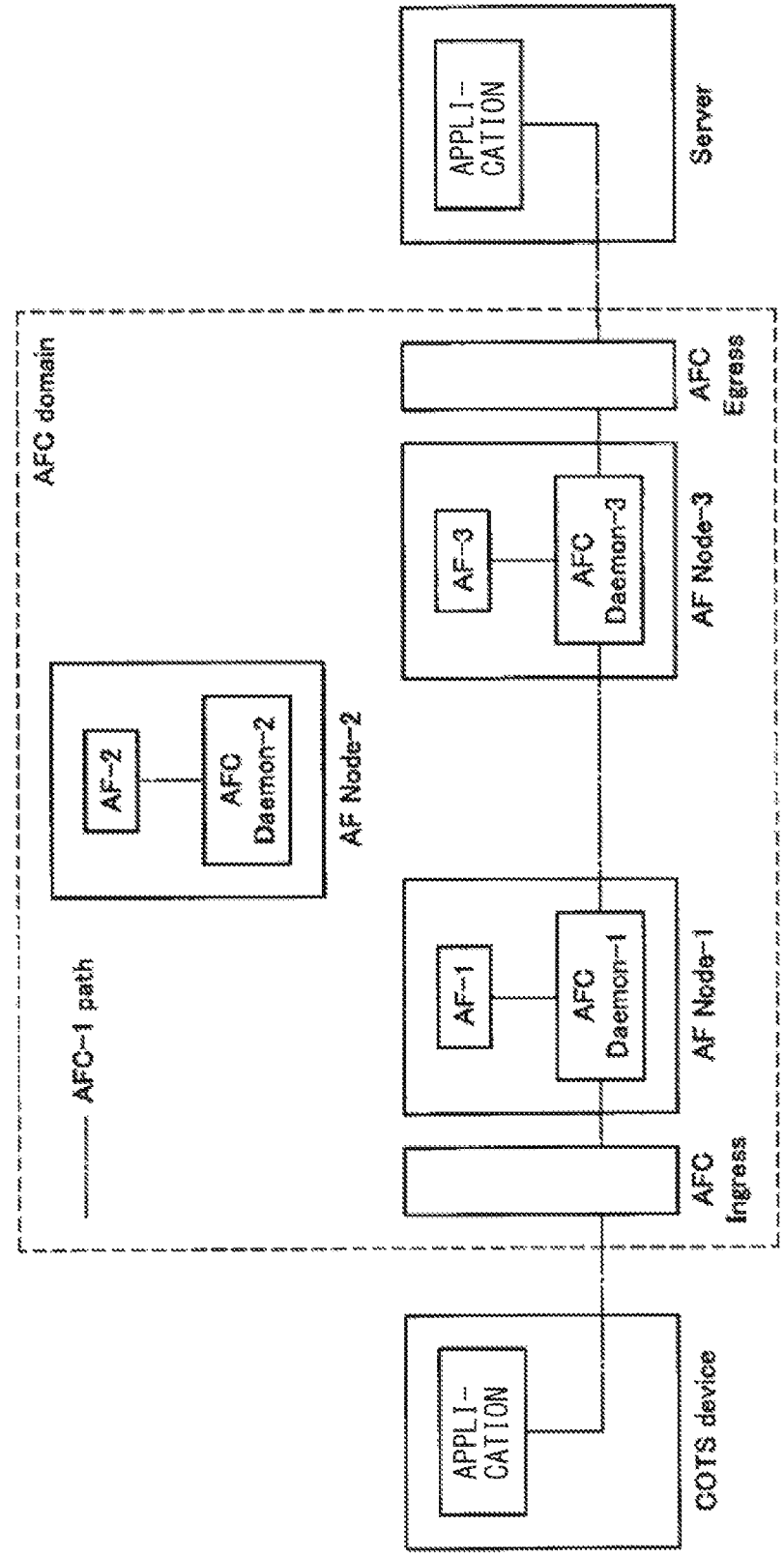
FIG. 22 is an explanatory diagram illustrating a path of the AFC-1.

At this time, the AFC User-1 has already set up the AF-1, the AF-2, and the AF-3. An IP address of the Server with which the COTS device communicates is IP-svr, and a port number used by the application on the Server is Pt-svr. An IP address of the AFC Ingress is IP-ingress. An IP address of the AFC Egress is IP-egress. It is assumed that The AFC User-1 is desired to apply linear AFC of AF1→AF3 (referred to as AFC-1) to a data packet in which a destination IP address is IP-svr and a destination port number is Pt-svr. FIG. 21 is an explanatory diagram illustrating a procedure for setting up the AFC-1. FIG. 22 is an explanatory diagram illustrating a path of the AFC-1.

The AFC User-1 establishes TLS connection with the AFC Manager (step S191).

The AFC User-1 transmits an AFC Setup Request packet illustrated in FIG. 23 to the AFC Manager (step S192). A value of each field of the AFC Setup Request packet is as follows. "AFC Setup Request" is set to the Type field. USERID-1 is set to the User ID field. Five fields subsequent to this are match fields for identifying an original data packet to which the AFC is to be applied. In a case where values of corresponding fields of the original data packet coincide with all the values of the match fields, the AFC is applied to the original data packet. An value of the Source IP Address field is [any]; therefore, any value of the source IP address of the original data packet satisfies a condition. A value of the Destination IP Address field is IP-svr; therefore, a condition is satisfied only in a case where the value of the destination IP address of the original data packet is IP-svr. A value of the Source Port field is [any]; therefore, any source port number of the original data packet satisfies a condition. A value of the Destination Port field is Pt-svr; therefore, a condition is satisfied only in a case where the destination port number of the original data packet is Pt-svr. A value of the Protocol field is UDP; therefore, a condition is satisfied only in a case where the transport layer protocol of the data packet is UDP. Next, IP-ingress that is the IP address of the AFC Ingress is set to the Ingress IP Address field. IP-egress that is the IP address of the AFC Egress is set to the Egress IP Address field. Two that is the number of AFs included in the AFC is set to the No of AFs field. Four fields subsequent to this include information about the AF-1. AFID-1 is set to the AF ID field. AFCert-af1 that is certificate information generated with use of AFSkey-af1 is set to the AF Certificate field. CondLen-1 indicating the length of the Next Index field is set to the Next Index Length field. In the Next Index field, it is indicated that the next is an AF (the AF-3) of which the Index is 1 regardless of a result of execution of the AF-1. Four fields subsequent to this below include information about the AF-3. AFID-3 is set to the AF ID field. AFCert-af3 that is certificate information generated with use of AFSKey-af3 is set to the AF Certificate field. CondLen-3 indicating the length of the Next Index field is set to the Next Index Length field. Regardless of a result of execution of the AF-3, the value of the Next Index field indicates that the next is an AF of which the Index is 2. This value is equal to the value of the No of AFs field; therefore, the Index being 2 indicates the AFC Egress.

In a case where the AFC Manager receives the AFC Setup Request packet from the AFC User-1, the AFC Manager confirms from the value of the AF Certificate field related to the AF-1 and the value of the AF Certificate field related to the AF-3 that the AFC User-1 has the authority to use the AF-1 and the AF-3. Next, the AFC Manager assigns AFCID-1 as an identifier to AFC (AFC-1) that is to be set up from this time on. In addition, the AFC Manager generates AFCSKey-afc1 that is key information about the AFC-1 that is shared with the AFC User-1.

Figure 25:
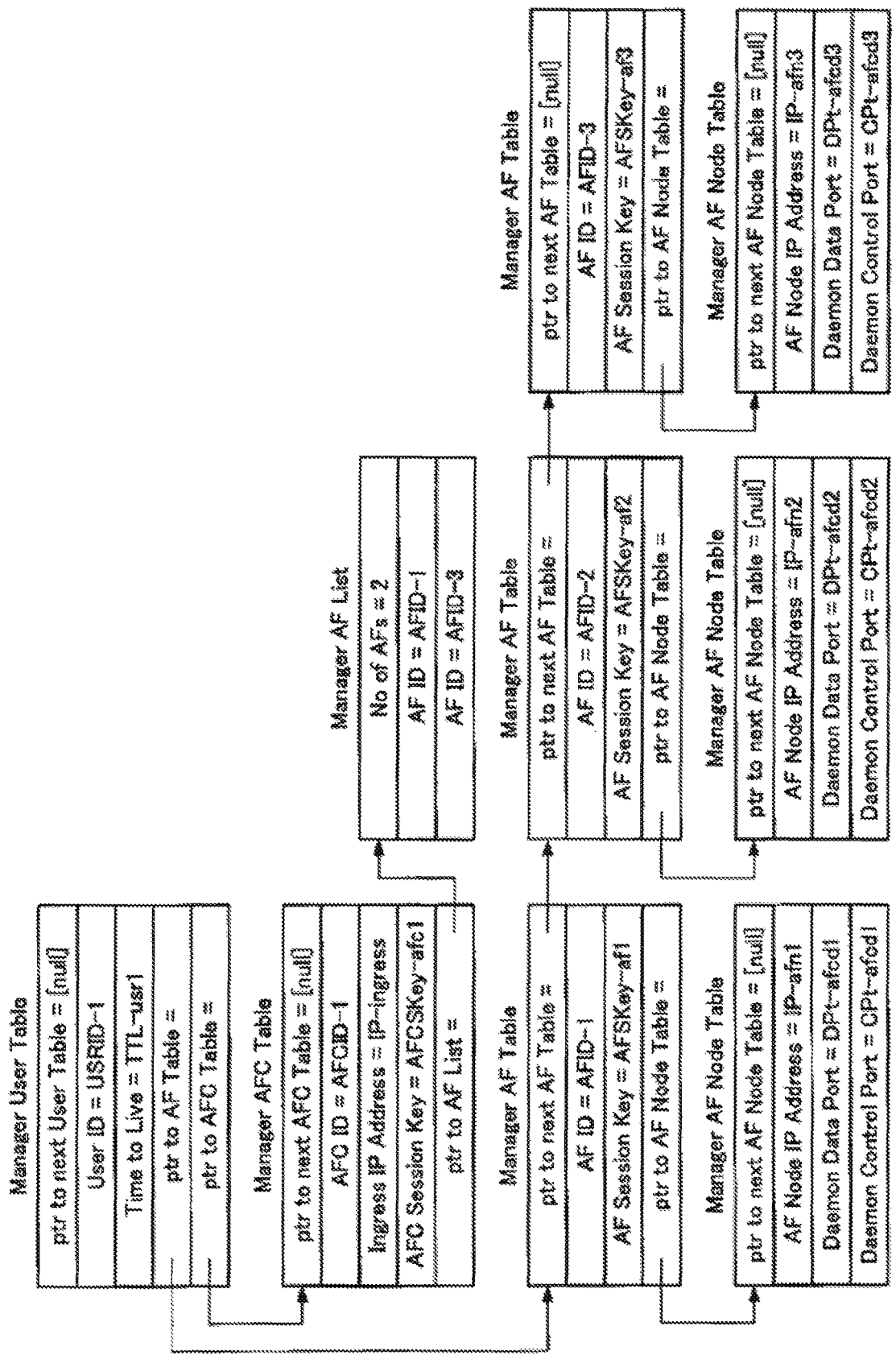
FIG. 25 is an explanatory diagram illustrating a structure example of a table held by the AFC Manager.

Next, the AFC Manager holds a table illustrated in FIG. 25. This table includes a Manager AFC Table and ae Manager AF List in addition to the table illustrated in FIG. 20. A value of each field of the Manager AFC Table is as follows. [null] is set to the ptr to next AFC Table field. AFCID-1 is set to the AFC ID field. IP-ingress is set to the Ingress IP Address field. AFCSKey-afc1 is set to the AFC Session Key field. A pointer to the Manager AF List is set to the ptr to AF List field. A value of each field of the Manager AF List is as follows. Two that is the value of the No of AFs field of the AFC Setup Request packet is set as a value of the No of AFs fiel. Subsequently, AFID-1 and AFID-3 that are values of two AF ID fields of the AFC Setup Request packet are set to two subsequent fields.

Next, the AFC Manager establishes TLS connection with the AFC Ingress (step S193).

Figure 26:
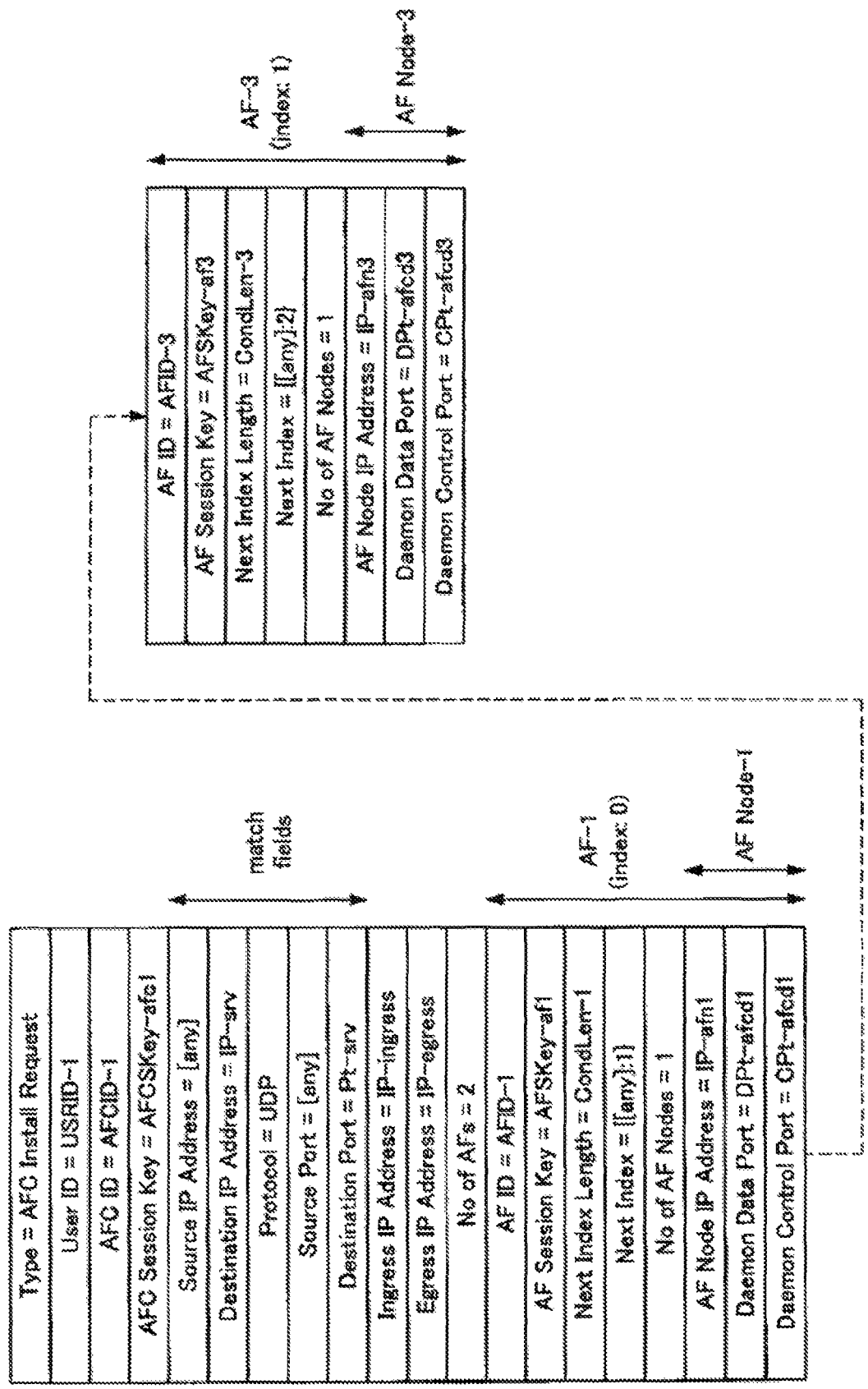
FIG. 26 is an explanatory diagram illustrating a structure example of an AFC Install Request packet.

Next, the AFC Manager transmits an AFC Install Request packet illustrated in FIG. 26 to the AFC Ingress (step S194). A value of each field of the AFC Install Request packet is as follows. "AFC Install Request" is set to the Type field. USRID-1 that is the value of the User ID field of the AFC Setup Request packet is set to the User ID field. AFCID-1 is set to the AFC ID field. AFCSKey-afc1 is set to the AFC Session Key field. Five fields subsequent to this are match fields for identifying a data packet to which the AFC is to be applied. Values of corresponding fields of the AFC Setup Request packet are set to these fields. IP-ingress is set to the Ingress IP Address field. IP-egress is set to the Egress IP Address field. Two that is the value of the No of AFs field of the AFC Setup Request packet is set to the No of AFs field. Eight fields subsequent to this are information about the AF-1. AFID-1 is set to the AF ID field. AFSKey-af1 that is the value of the AF Session Key field of the Manager AF Table related to AF-1 out of the tables illustrated in FIG. 20 is set to the AF Session Key field. Values of corresponding fields of the received AFC Setup Request packet are set as a value of the Next Index Length field and a value of the Next Index field. The No of AF Nodes field represents the number of AF Nodes on which the AF-1 is set up. In this example, one is set. IP-afn1 that is the value of the AF Node IP Address field of the Manager AF Node Table related to the AF-1 out of the tables illustrated in FIG. 20 is set to the AF Node IP Address field. DPt-afcd1 that is the value of the Daemon Data Port field of the Manager AF Node Table related to the AF-1 out of the tables illustrated in FIG. 20 is set to the AFC Daemon Data Port field. CPt-afcd1 that is the value of the Daemon Control Port field of the Manager AF Node Table related to the AF-1 out of the tables illustrated in FIG. 20 is set to the AFC Daemon Control Port field. Eight fields subsequent to this are information about the AF-3. Information similar to the information about the AF-1 are set to these fields.

Figures 27, 28:
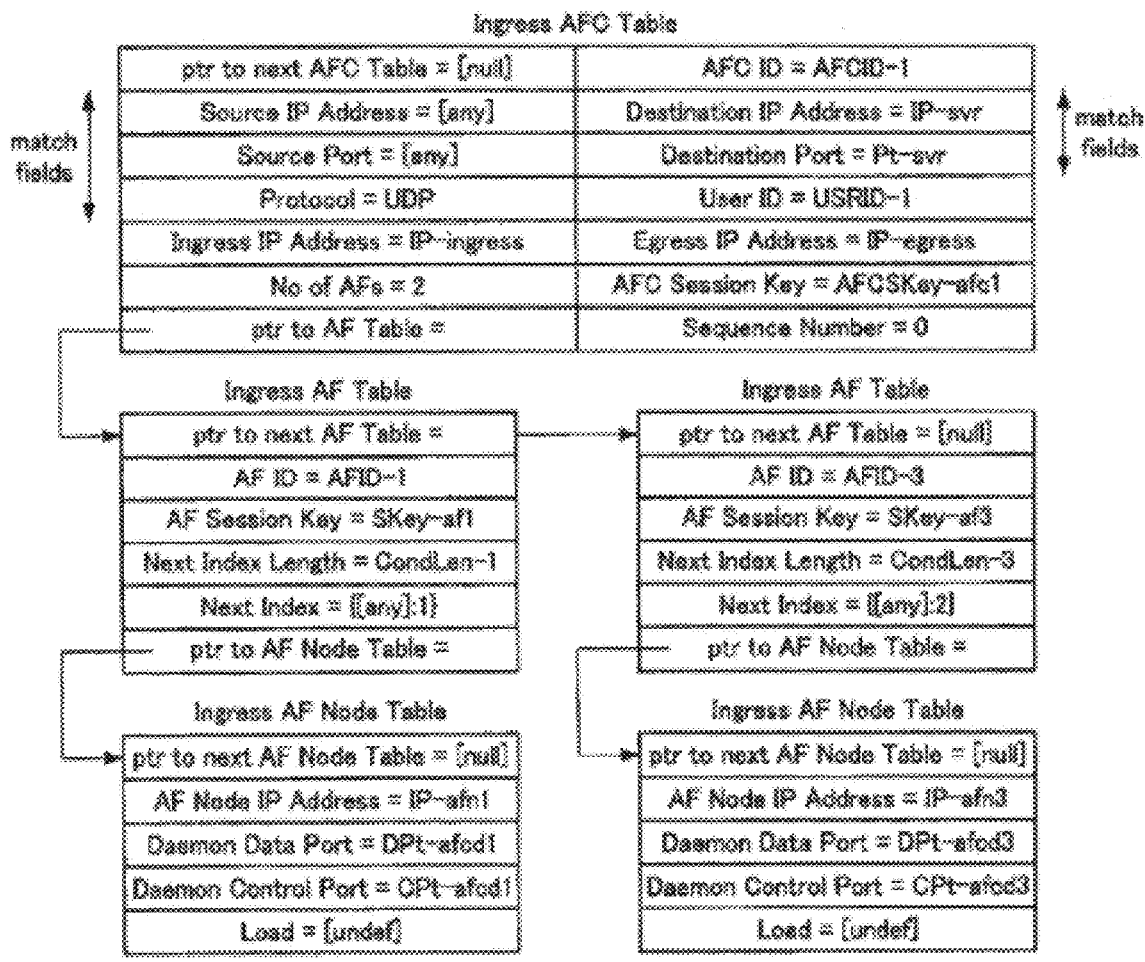
FIG. 27 is an explanatory diagram illustrating a structure example of an AFC Install Response packet.
FIG. 28 is an explanatory diagram illustrating a structure example of a table held by an AFC Ingress.

In a case where the AFC Ingress receives the AFC Install Request packet, the AFC Ingress holds an Ingress AFC Table, an Ingress AF Table, and an Ingress AF Node Table illustrated in FIG. 28. The Ingress AFC Table is assigned to each AFC. [null] is set to the ptr to next AFC Table field. Values of corresponding fields of the AFC Install Request packet are set to fields from the AFC ID field to the AFC Session Key field. Zero is set as an initial value to the Sequence Number field. A pointer to the Ingress AF Table related to the first AF included in the AFC is set to the ptr to AF Table field. The Ingress AF Table is assigned to each AF. In this example, the Ingress AF Table is assigned to each of the AF-1 and the AF-3. A value of each field of the Ingress AF Table is as follows. A pointer pointing the Ingress AF Table of the AF-3 is set to the ptr to next AF Table field of the Ingress AF Table of the AF-1. [null] is set to the ptr to next AF Table field of the Ingress AF Table of the AF-3. Values of corresponding fields of the AFC Install Request packet are set to fields from the AF ID field to the Next Index field. The Ingress AF Node Table is assigned to each AF Node. In this example, the Ingress AF Node Table is assigned to each of the AF Node-1 and the AF Node-3. A value of each field is as follows. [null] is set to the ptr to next AF Node Table field. Values of corresponding fields of the AFC Install Request packet are set to fields from the AF Node IP Address field to the Daemon Control Port field. A value of the Load field is undefined ([undef]) at this point of time.

Next, the AFC Ingress transmits an AFC Install Response packet illustrated in FIG. 27 to the AFC Manager (step S195). A value of each field of the AFC Install Response packet is as follows. "AFC Install Response" is set to the Type field. "OK" indicating success of processing is set to the Status field. USRID-1 that is the value of the User ID field of the AFC Install Request packet is set to the User ID field. AFCID-1 that is the value of the AFC ID field of the AFC Install Request packet is set to the AFC ID field.

In a case where the AFC Manager receives the AF Install Response packet, the AFC Manager disconnects the TLS connection with the AFC Ingress (step S196).

Next, the AFC Manager transmits an AFC Setup Response packet illustrated in FIG. 24 to the AFC User-1 (step S197). A value of each field of the AFC Setup Response packet is as follows. "AFC Setup Response" is set to the Type field. "OK" indicating success of processing is set to the Status field. USRID-1 that is the value of the User ID field of the AFC Setup Request packet is set to the User ID field. AFCID-1 that is the value of the AFC ID field of the AFC Setup Request packet is set to the AFC ID field. AFCSKey-afc1 is set to the AFC Session Key field.

In a case where the AFC User-1 receives the AFC Setup Response packet from the AFC Manager, the AFC User-1 disconnects the TLS connection with the AFC Manager (step S198).

(Application of AFC-1 to Data Packet)

Figure 29:
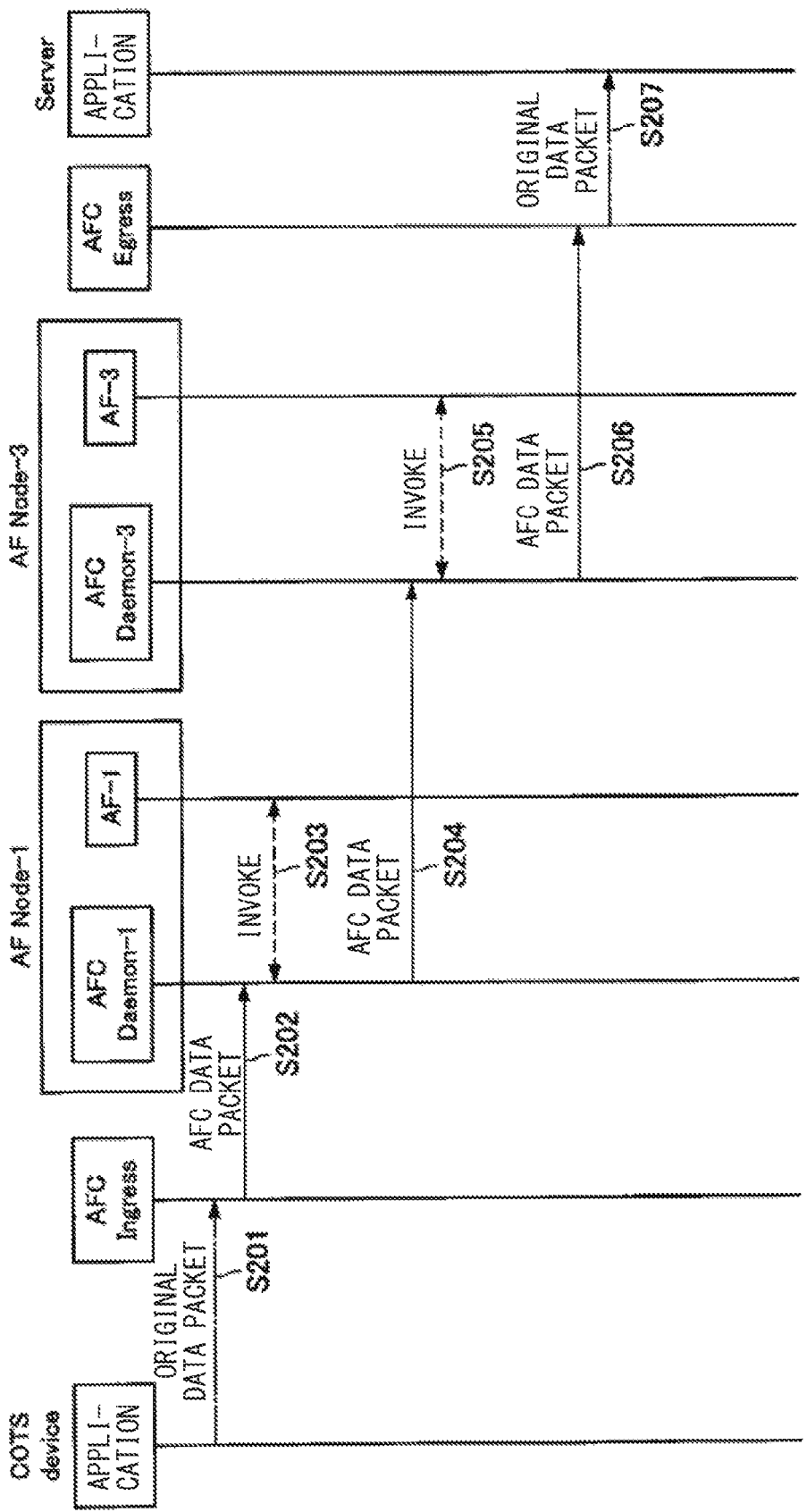
FIG. 29 is an explanatory diagram illustrating a flow of a packet.
Figure 30:
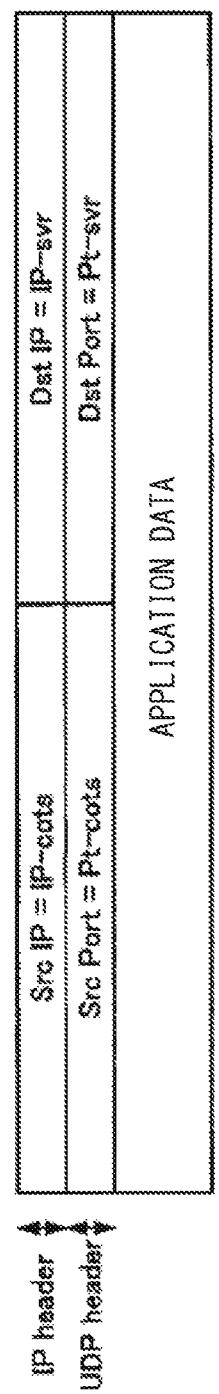
FIG. 30 is an explanatory diagram illustrating a structure example of a data packet.

Next, it is assumed that in FIG. 22, the application on the COTS device transmits an original data packet illustrated in FIG. 30 to the application on the Server. FIG. 29 is an explanatory diagram of a flow of a packet in a case where the application on the COTS device transmits the original data packet illustrated in FIG. 30 to the application on the Server. It is assumed that an IP address of the COTS device is IP-cots, and a port number used by the application on the COTS device is Pt-cots. It is assumed that the IP address of the Server is IP-svr, and a port number used by the application on the Server is Pt-svr. In FIG. 30, only a source IP address field and a destination IP address field are illustrated in the IP header, and only a source port field and a destination port field are illustrated in the UDP header.

First, the application on the COTS device transmits the original data packet (step S201).

Figure 31:
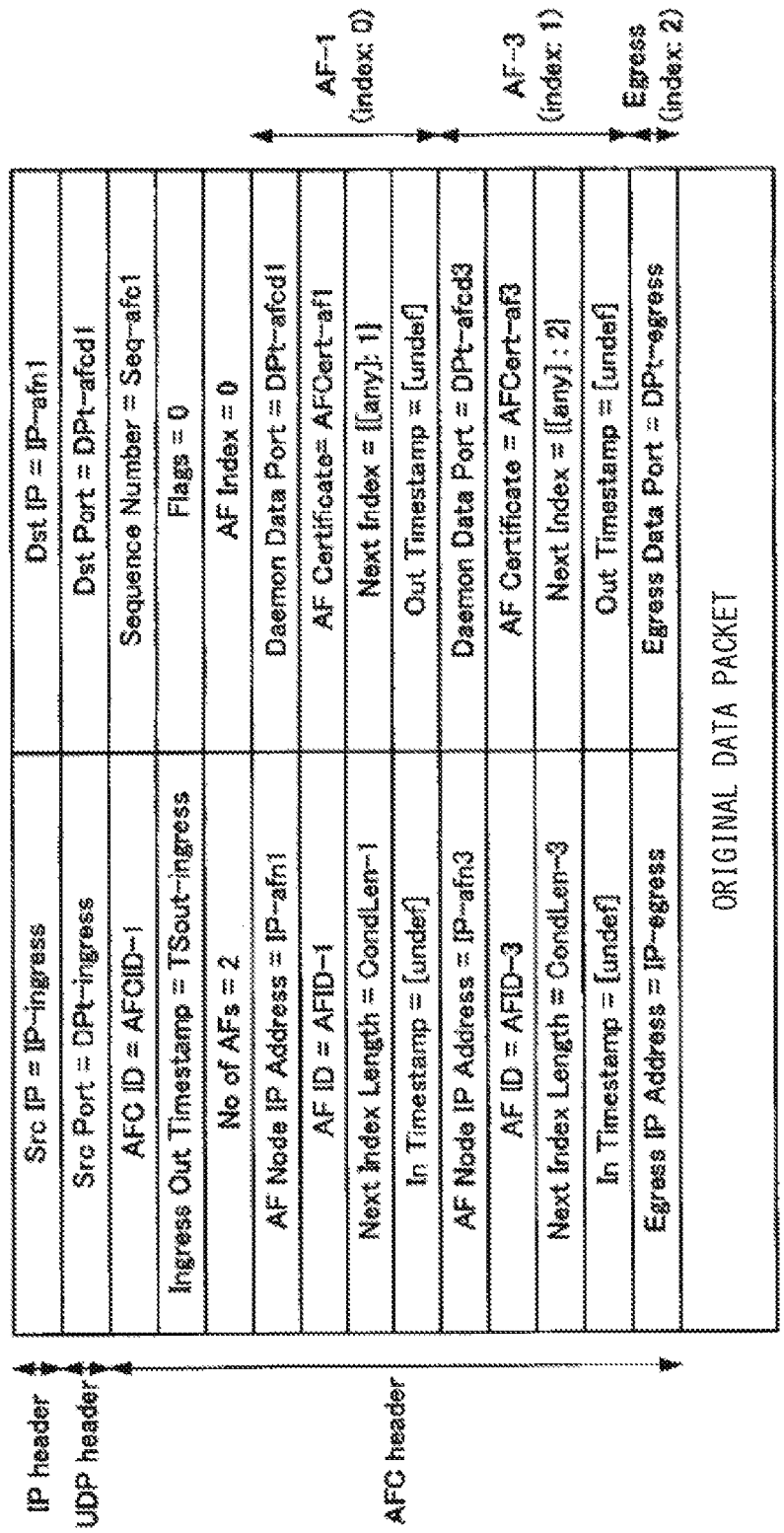
FIG. 31 is an explanatory diagram illustrating a structure example of an AFC data packet.

In a case where the AFC Ingress receives the original data packet transmitted from the application on the COTS device, the AFC Ingress compares values of match fields of the Ingress AFC Table illustrated in FIG. 28 with fields of the received data packet. As a result, it is found that this original data packet matches the Ingress AFC Table of which the value of the AFC ID field is AFCID-1; therefore, the AFC Ingress adds the IP header, the UDP header, and the AFC header to a head of the original data packet as illustrated in FIG. 31 to generate an AFC data packet. In the IP header, IP-ingress that is the IP address of the AFC Ingress is set to the Src IP field. IP-afn1 that is the value of the AF Node IP Address field of the Ingress AF Node Table illustrated on the lower left in FIG. 28 is set to the Dst IP field. In the UDP header, DPt-ingress that is a port number for a data packet of the AFC Ingress is set to the Src Port field. DPt-afcd1 that is the value of the Daemon Data of the Ingress AF Node Table illustrated on the lower left in FIG. 28 is set to the Port field Dst Port field. A value of each field of the AFC header is set as follows with reference to the tables illustrated in FIG. 28. AFCID-1 that is the value of the AFC ID field of the Ingress AFC Table is set to the AFC ID field. The value of the Sequence Number field of the Ingress AFC Table is set to the Sequence Number field, and the value of the Sequence Number field of the Ingress AFC Table is incremented. A time when the AFC Ingress transmits the AFC data packet is set to the Ingress Out Timestamp field. Two that is the value of the No of AFs field of the Ingress AFC Table is set to the No of AFs field. Zero is set to the AF Index field. Eight fields subsequent to this is related to the AF-1. Values of corresponding fields of the Ingress AF Node Table are set to the AF Node IP Address field and the AFC Daemon Data Port field. Values of corresponding fields of the Ingress AF Table are set to the AF ID field, the Next Index Length field, and the Next Index field. An AF Certificate generated with use of the AF Session Key field of the Ingress AF Table is set to the AF Certificate field. Values of the In Timestamp field and the Out Timestamp field are undefined ([undef]). Values of fields related to the AF-2 are set similarly. The above-described AFC data packet reaches the AFC Daemon-1 in accordance with the destination address of the IP header and the destination port number of the UDP header (step S202).

The value of the AF Index field of the AFC header is zero, which causes the AFC Daemon-1 to recognize that the AF (the AF-1) of which the identifier is AFID-1 is to be applied to the original data packet included in the received AFC data packet. The AFC Daemon-1 calculates the AF certificate with use of the value of the AF Session Key field of the AF Table illustrated in FIG. 16, and compares this value with the value of the AF Certificate field of the AFC header. In a case where these values coincide with each other, it is possible to confirm that this data packet is a normal packet to which the AFC is to be applied. In a case where the AFC Daemon-1 recognizes that the data packet is a normal packet to which the AFC is to be applied, the AFC Daemon-1 invokes the AF-1.

Next, the AFC Daemon-1 retrieves the Daemon AFC Table, but the AFC Daemon-1 does not hold the Daemon AFC Table at this point of time. Accordingly, the AFC Daemon-1 creates a Daemon AFC Table illustrated in FIG. 32. A value of each field is as follows. [null] is set to the ptr to next AFC Table field. AFCID-1 that is the value of the AFC ID field of the AFC header is set to the AFC ID field. Seq-afc1 that is the value of the Sequence Number field of the AFC header is set to the Sequence Number field. If the Daemon AFC Table related to AFC indicated by the value of the AFC ID field of the AFC header has already resided, and the value of the Sequence Number field of the AFC header is equal to or smaller than the value of the Sequence Number field of the Daemon AFC Table, it is determined that the received AFC data packet is a packet from a replay attack, and the AFC Daemon-1 discards the received AFC data packet.

Figure 33:
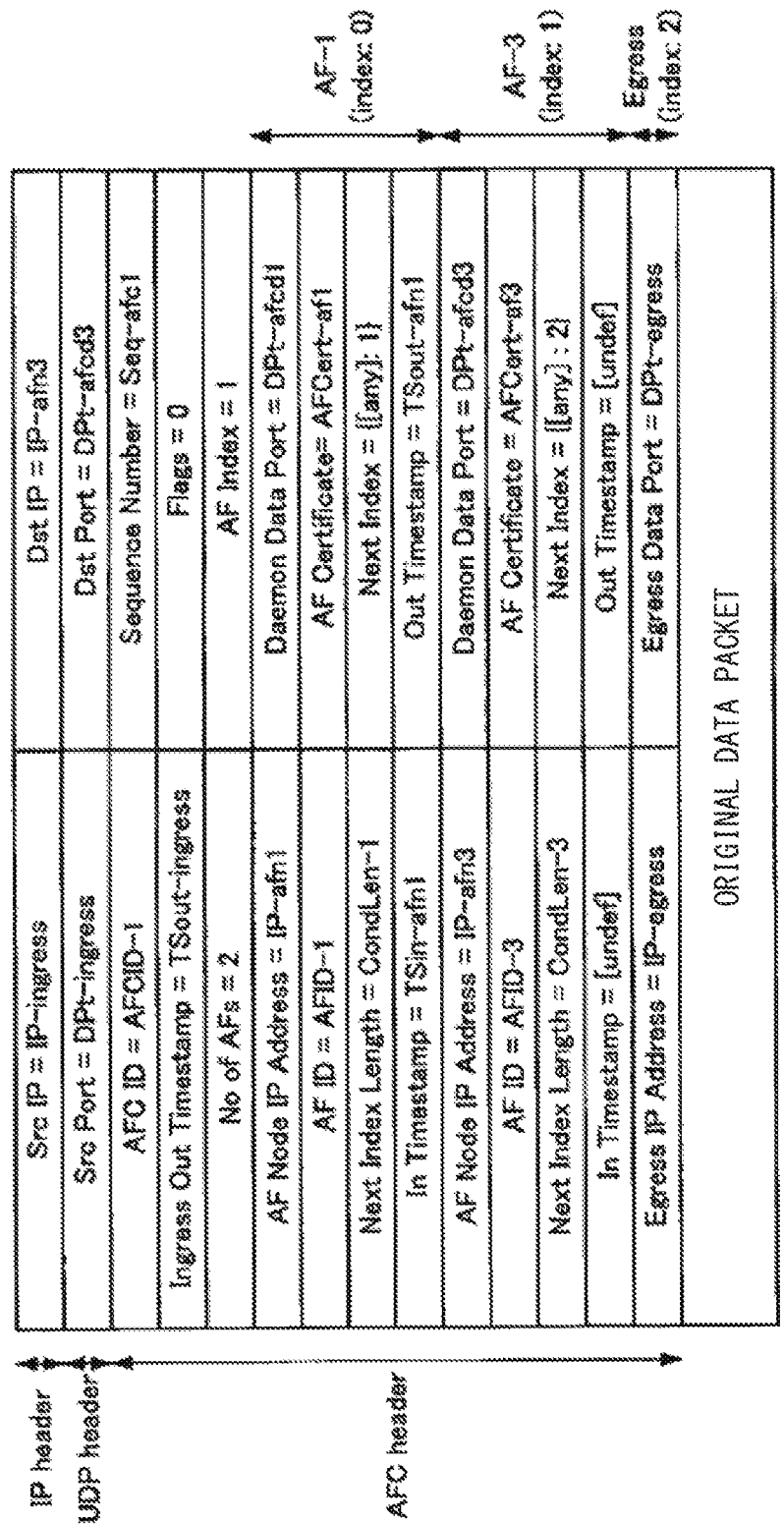
FIG. 33 is an explanatory diagram illustrating a structure example of a header of the AFC data packet.

Next, the AFC Daemon-1 inputs, form a port indicated by the AF In Port field of the Daemon AF Table illustrated in FIG. 16, the received original data packet into the invoked AF-1 (step S203). Next, the AFC Daemon-1 receives the original data packet processed by the AF-1 from a port indicated by the AF Out Port field of the Daemon AF Table. The value of the Next Index field of the AFC header specifies that the index of the next AF is 1 (the AF-3) regardless of a result of execution of the AF-1, which causes the AFC Daemon-1 to know that the next AF is the AF-3. The AFC Daemon-1 sets IP-afn3 that is the value of the AF Node IP Address field related to the AF-3 of the AFC header to the Dst IP field of the IP header with reference to fields related to the AF-3 of the AFC header. In addition, the AFC Daemon-1 sets DPt-afcd3 that is the value of the AFC Daemon Data Port field related to the AF-3 of the AFC header to the Dst Port field of the UDP header. Further, the AFC Daemon-1 increments the value of the AF Index field. As a result, the header of the AFC data packet becomes a header as illustrated in FIG. 33.

Next, the AFC Daemon-1 transmits this AFC data packet (step S204). At this time, the AFC Daemon-1 sets a time when the AFC data packet is received to the In Timestamp field related to the AF-1 of the AFC header, and sets a time when the AFC data packet is to be transmitted to the Out Timestamp field. This AFC data packet reaches the AFC Daemon-3 in accordance with the destination address of the IP header and the destination port number of the UDP header.

Figure 34:
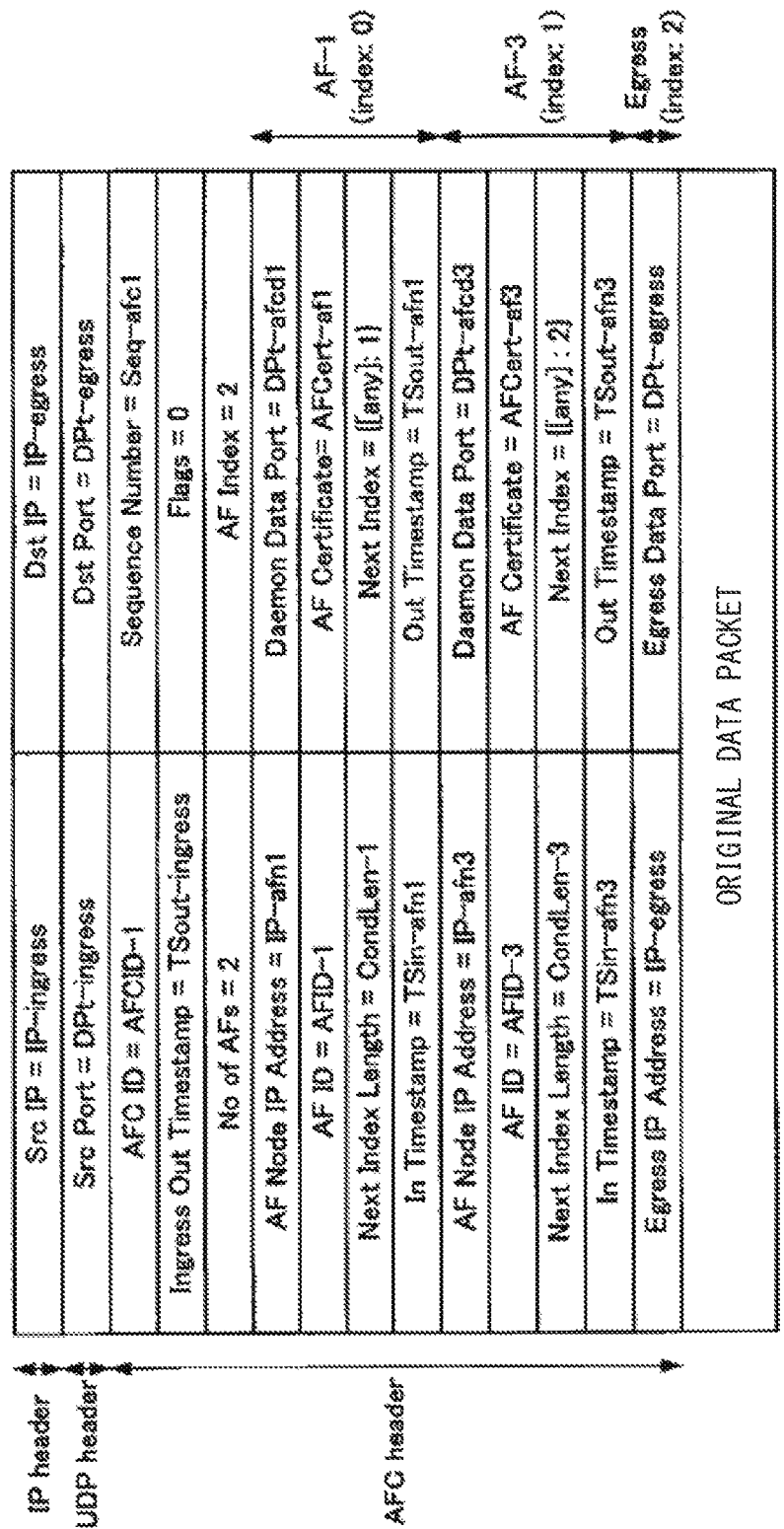
FIG. 34 is an explanatory diagram illustrating a structure example of the header of the AFC data packet.

The value of the AF Index field of the AFC header of the AFC data packet is 1, which causes the AFC Daemon-3 to recognize that an AF (the AF-3) of which the identifier is AFID-3 is to be applied to the original data packet included in the received AFC data packet. The AFC Daemon-3 confirms that the AFC data packet is normal and is not a packet from a replay attack as with the AFC Daemon-1, and thereafter invokes the AF-3 and applies the AF-3 to the original data packet (step S205). The value of the Next Index field related to the AF-3 of the AFC header specifies that the index of the next AF is 2 regardless of a result of execution of the AF-3. This value is equal to the value of the No of AFs field of the AFC header; therefore, it is found that the next node is the AFC Egress. Accordingly, the AFC Daemon-3 sets the value of the AFC Egress IP Address field of the AFC header to the Dst IP field of the IP header, and sets DPt-egress that is a well-known port for a data packet of the AFC Egress to the Dst Port field of the UDP header. Further, the AFC Daemon-3 increments the value of the AF Index field. As a result, the header of the AFC data packet becomes a header as illustrated in FIG. 34.

The AFC Daemon-3 transmits this AFC data packet (step S206). At this time, the AFC Daemon-3 sets a time when the AFC data packet is received to the In Timestamp field related to the AF-3 of the AFC header, and sets a time when the AFC data packet is to be transmitted to the Out Timestamp field. This AFC data packet reaches the AFC Egress in accordance with the destination address of the IP header and the destination port number of the UDP header.

The AFC Egress takes the original data packet illustrated in FIG. 30 out of the received AFC data packet and forwards the original data packet to the application (step S207). The original data packet reaches the application on the Server in accordance with the destination address of the IP header and the destination port number of the UDP header.

(Setting of AFC having Branch and Junction: AFC-2)

Next, a case is considered where AFC (referred to as AFC-2) branching into an AFC path from the AF-1 directly to the AF-3 and an AFC path from the AF-1 to the AF-3 via the AF-2 is set in accordance with a result of execution in the AF-1.

Figure 35:
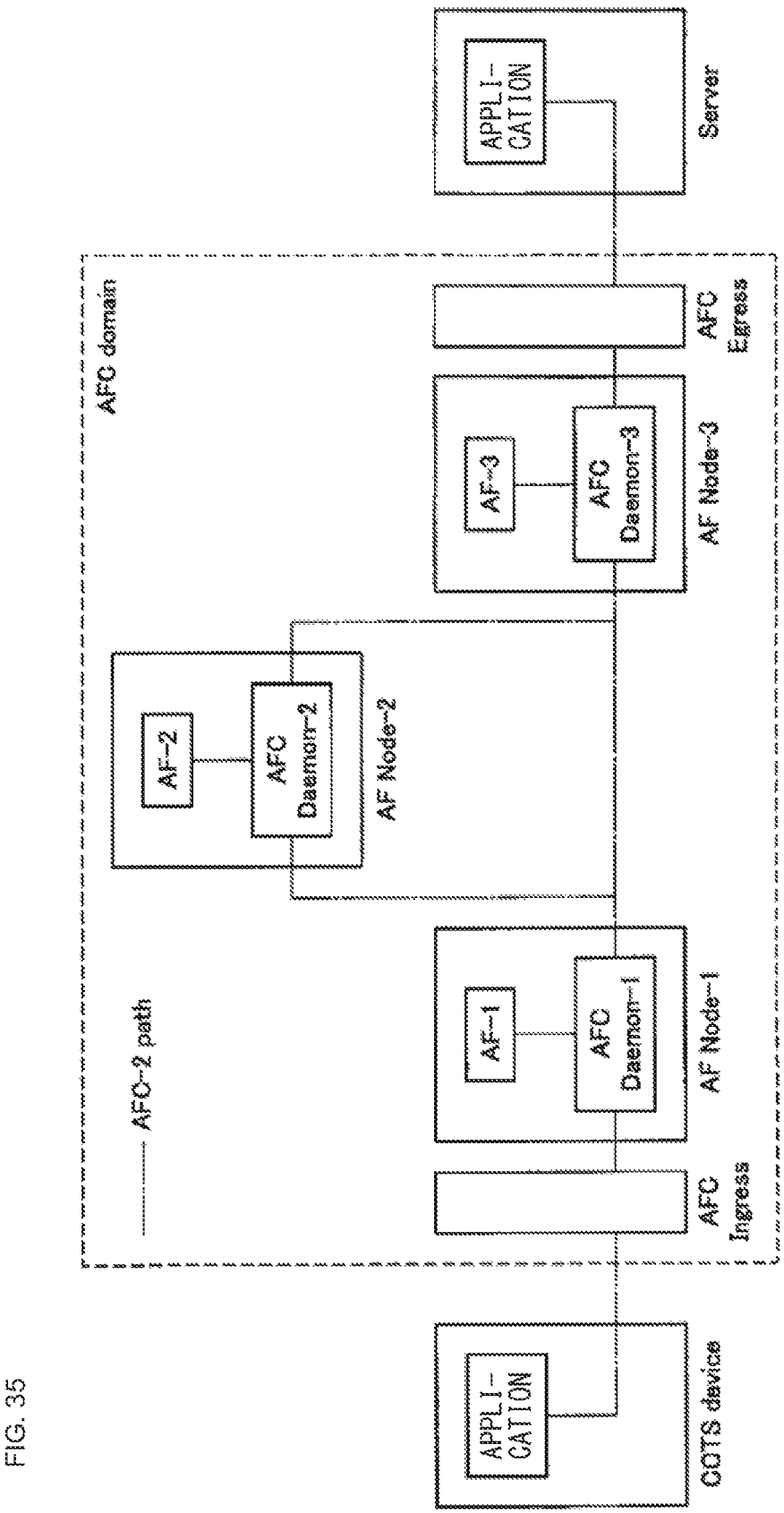
FIG. 35 is an explanatory diagram illustrating a path of AFC-2.
Figure 38:
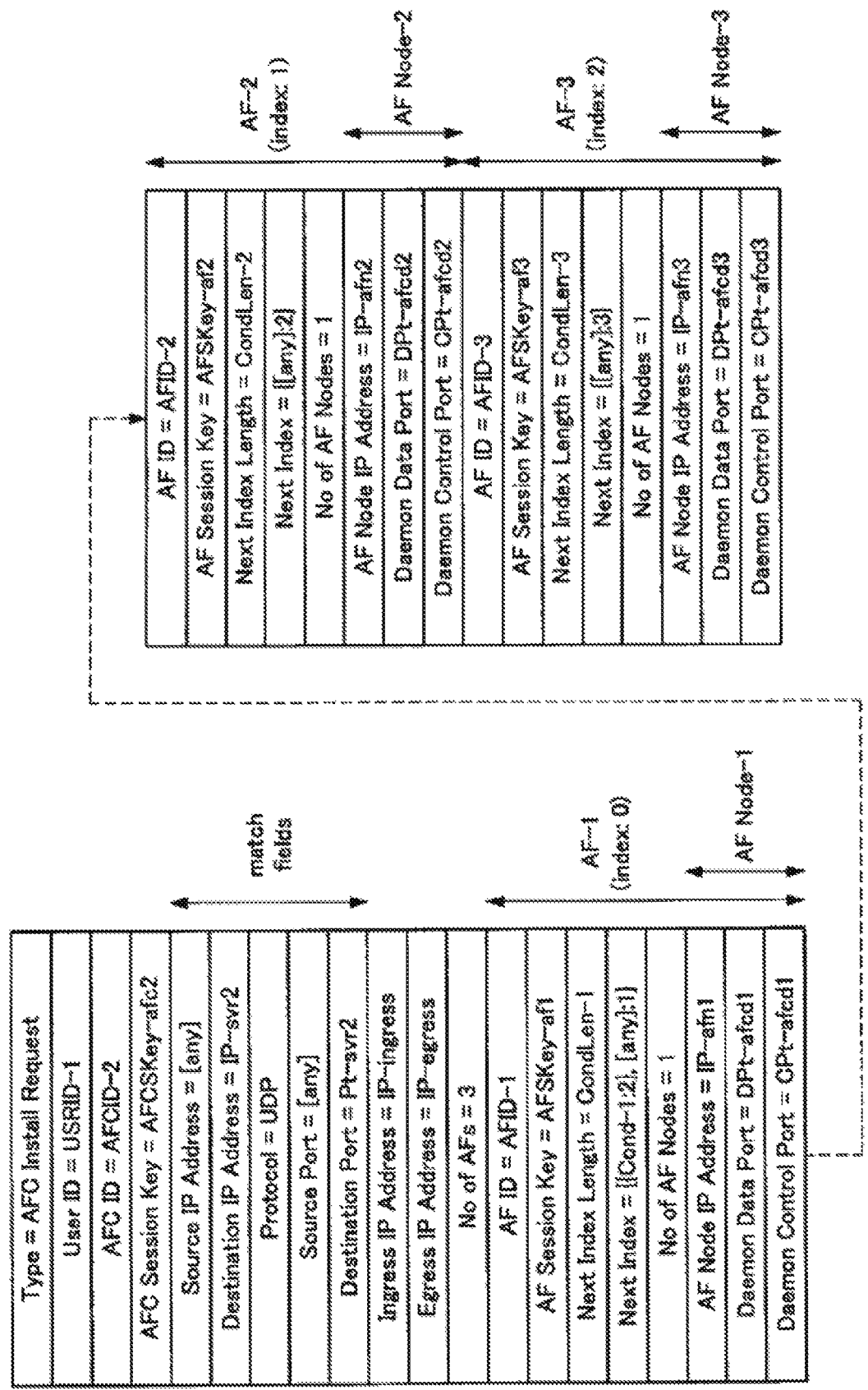
FIG. 38 is an explanatory diagram illustrating a structure example of an AFC Install Request packet.

FIG. 35 is an explanatory diagram illustrating a path of the AFC-2. The AFC User-1 transmits an AFC Setup Request packet illustrated in FIG. 36 to the AFC Manager similarly to the procedure illustrated in FIG. 21. In a case where the AFC Manager receives the AFC Setup Request packet, the AFC Manager transmits an AFC Install Request packet illustrated in FIG. 38 to the AFC Ingress. In a case where the AFC Ingress receives the AFC Install Request packet, the AFC Ingress transmits an AFC Install Response packet illustrated in FIG. 39 to the AFC Manager.

In a case where the AFC Manager receives the AFC Install Response packet, the AFC Manager transmits an AFC Setup Response packet illustrated in FIG. 37 to the AFC User-1.

Figure 40:
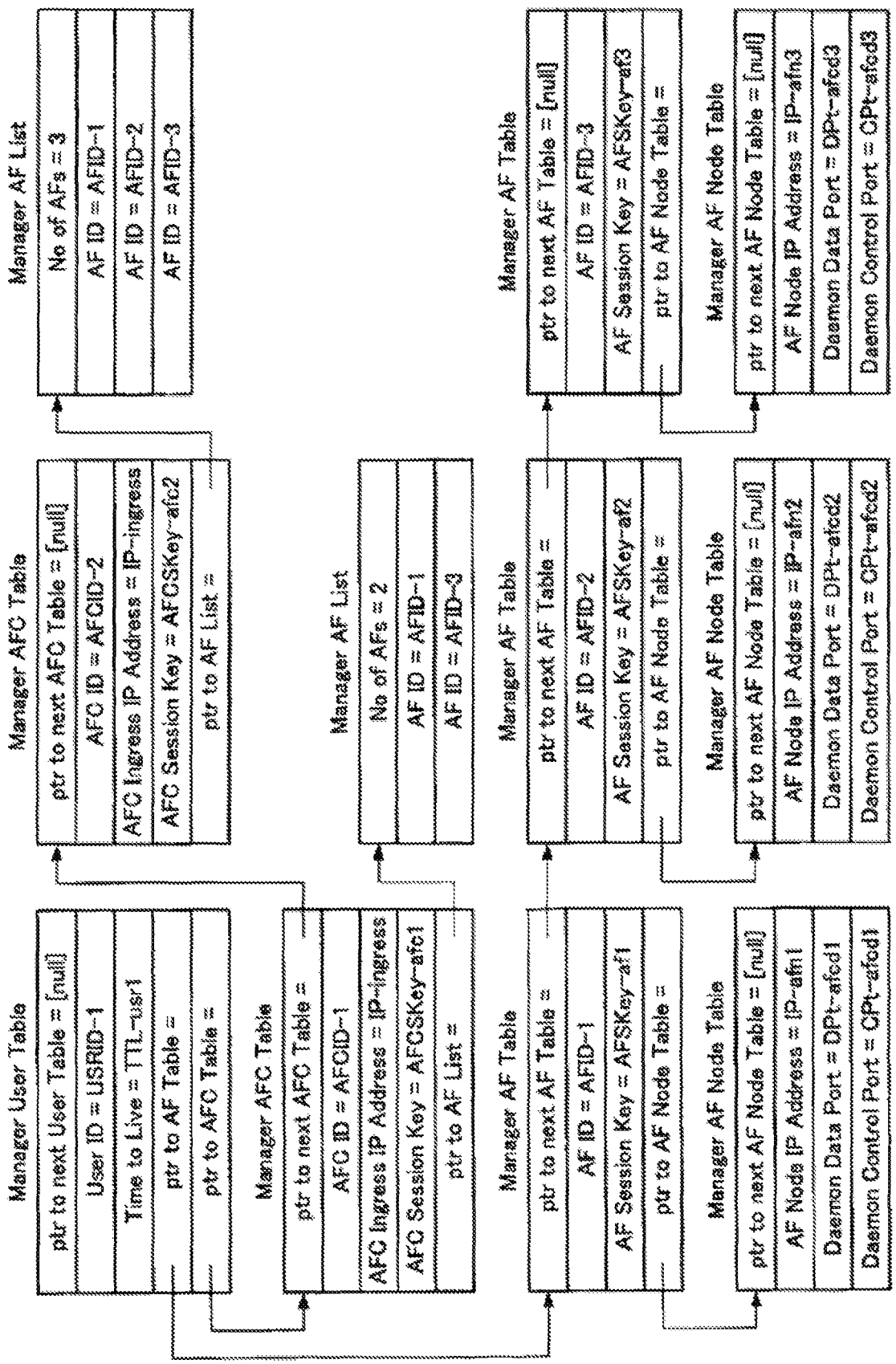
FIG. 40 is an explanatory diagram illustrating a structure example of a table held by the AFC Manager.

As a result of the above processing, the AFC Manager holds a table illustrated in FIG. 40. As compared with FIG. 5, a Manager AFC Table and an anager AF List related to the AFC-2 is added in FIG. 40. In addition, the AFC Ingress holds a table illustrated in FIG. 41. As compared with FIG. 28, an Ingress AF Table related to the AFC-2, and Ingress AF Node Tables and Ingress AF Node Tables related to AFs (the AF-1, the AF-2, and the AF-3) included in the AFC-2 are added in FIG. 41.

(Data Forwarding in AFC Having Branch and Junction)

Figure 42:
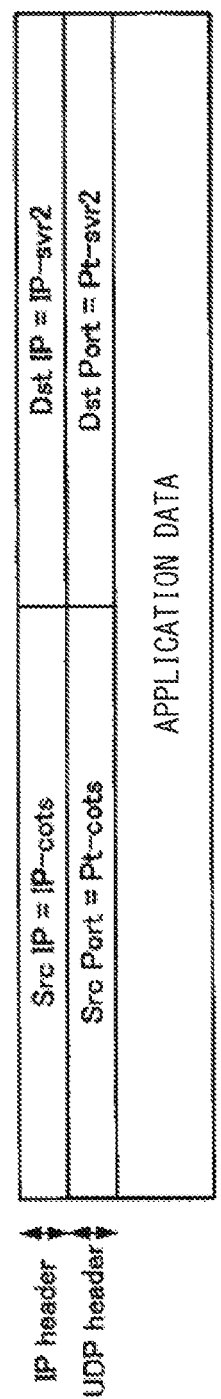
FIG. 42 is an explanatory diagram illustrating a structure example of a data packet.

Next, it is assumed that in AFC having a branch and a junction illustrated in FIG. 35, the application on the COTS device transmits an original data packet illustrated in FIG. 42 to the application on the Server.

It is assumed that the IP address of the COTS device is IP-cots, and a port number to be used by the application on the COTS device is Pt-cots. It is assumed that the IP address of the Server is IP-svr2, and a port number to be used by the application on the Server is Pt-svr2.

In FIG. 42, only a source IP address field and a destination IP address field are illustrated in the IP header, and only a source port field and a destination port field are illustrated in the UDP header.

Figure 41:
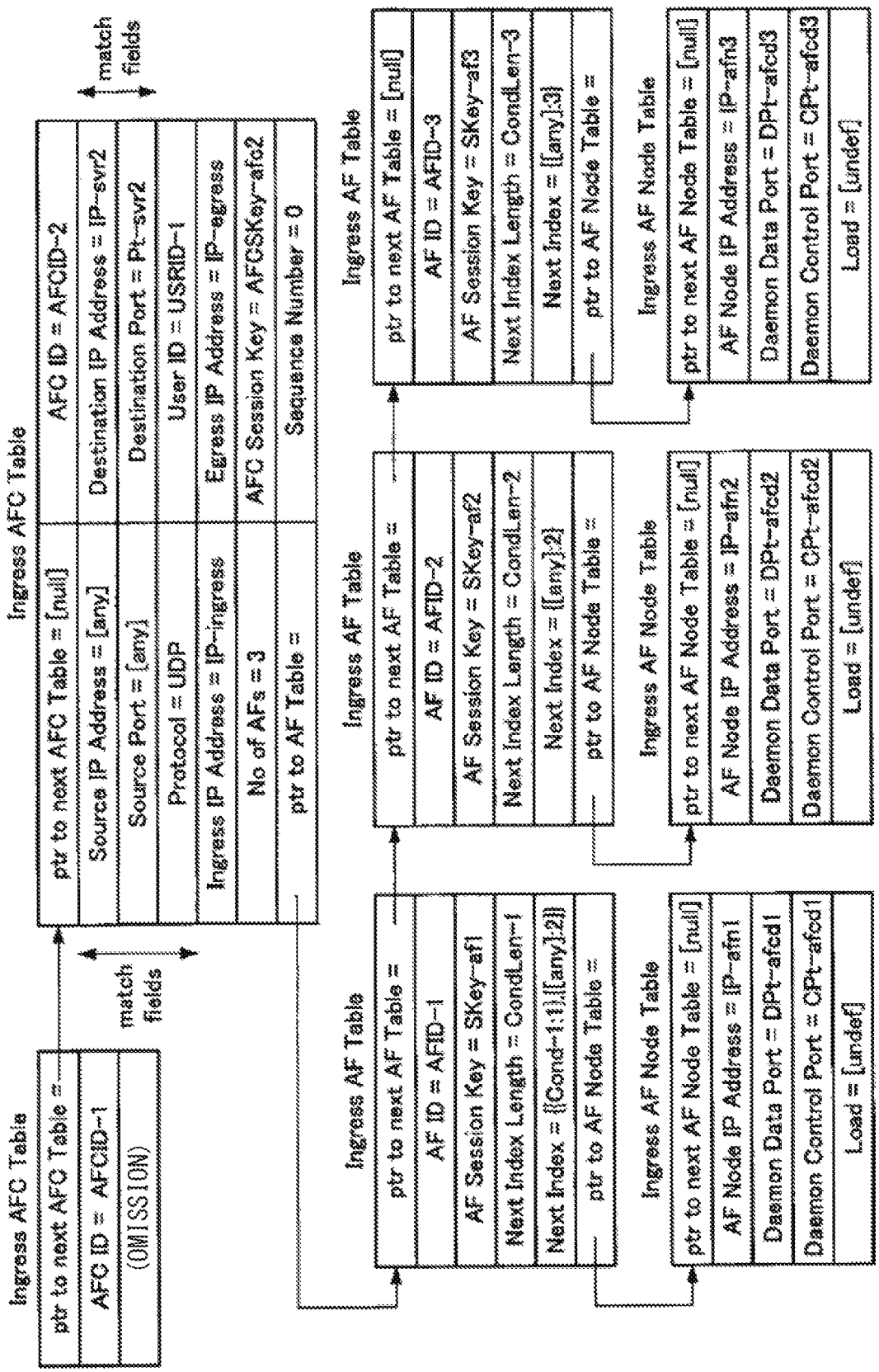
FIG. 41 is an explanatory diagram illustrating a structure example of a table held by the AFC Ingress.
Figure 43:
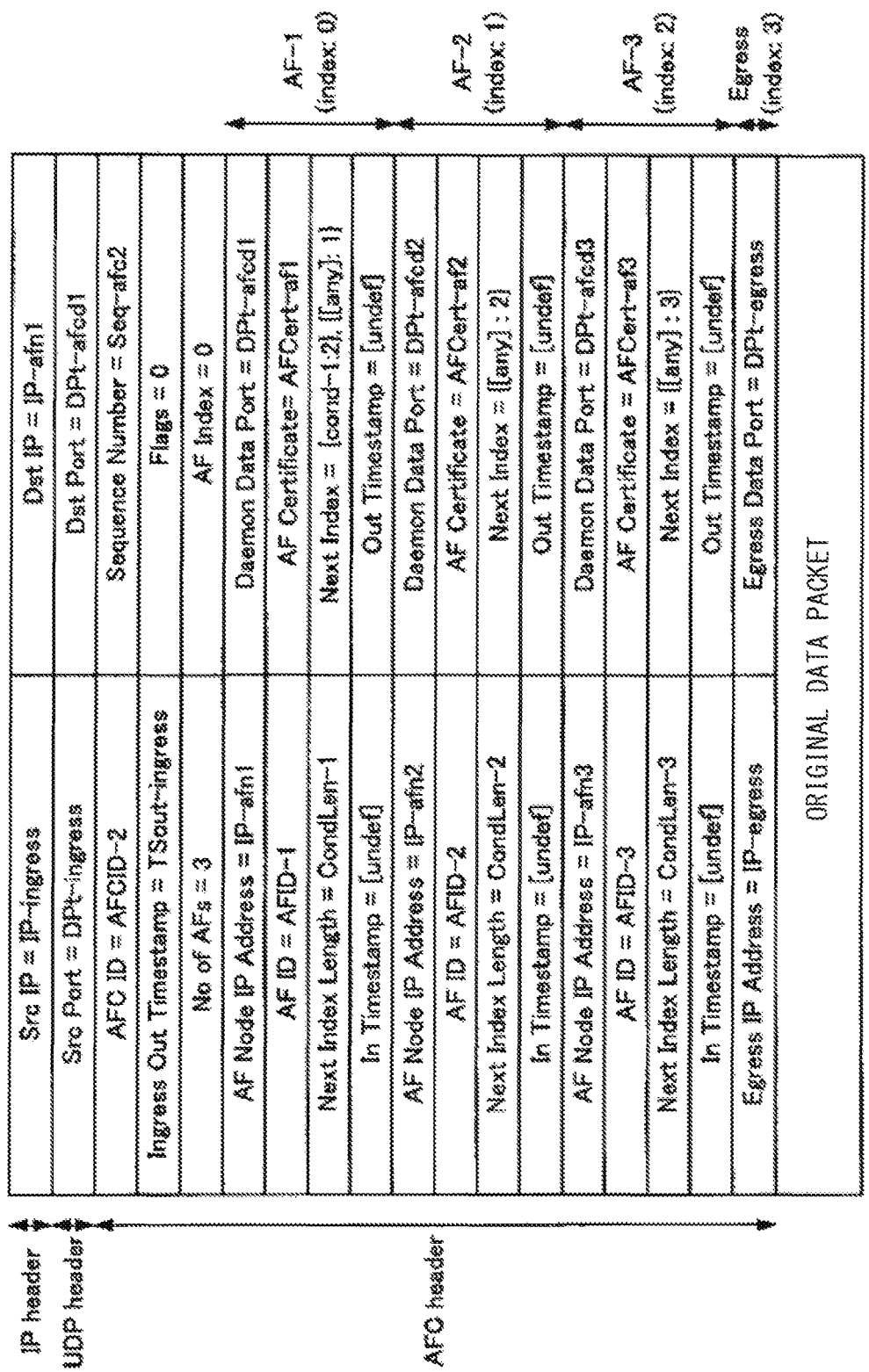
FIG. 43 is an explanatory diagram illustrating a structure example of a header of an AFC data packet.
Figure 44:
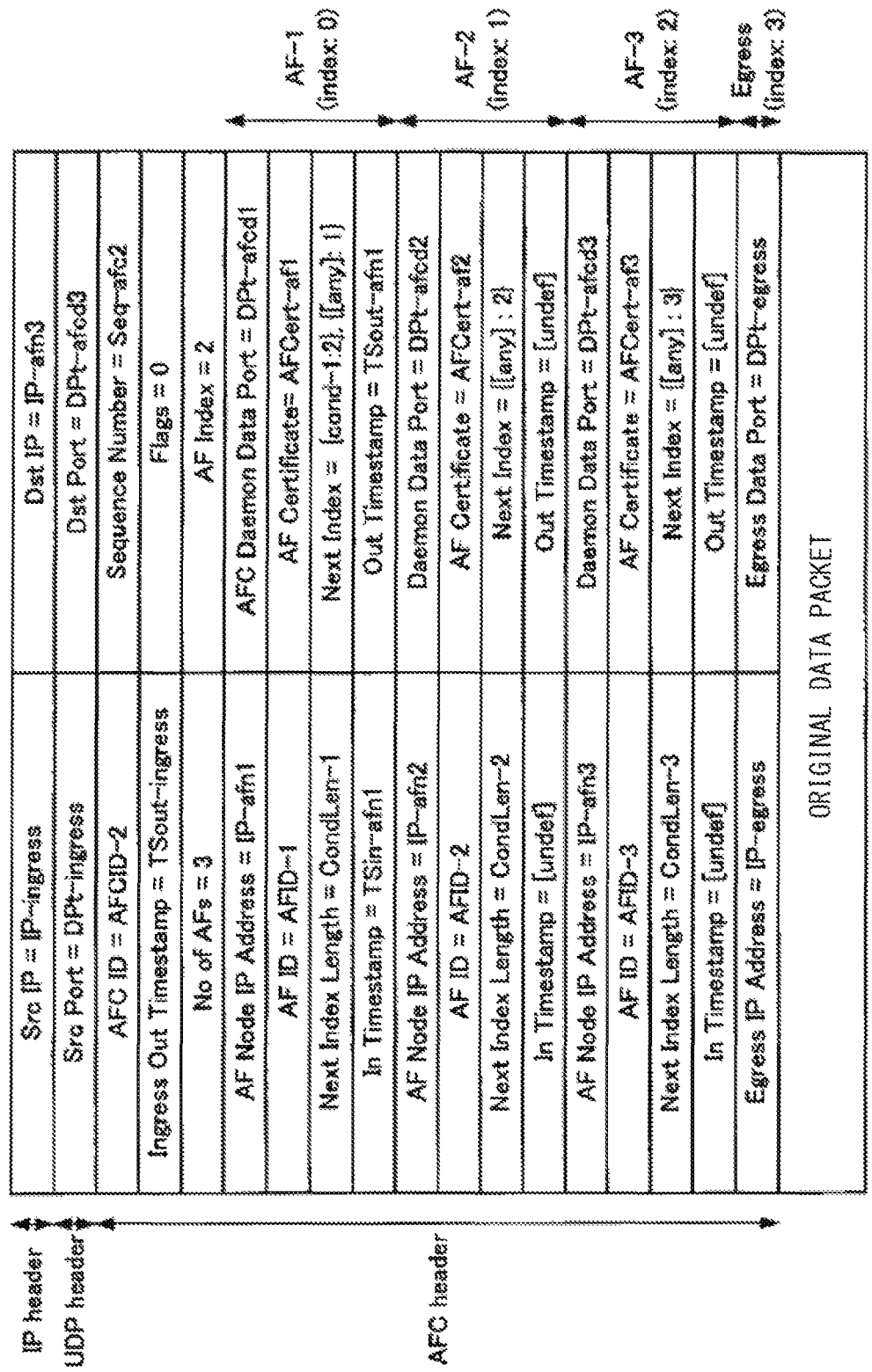
FIG. 44 is an explanatory diagram illustrating a structure example of the header of the AFC data packet.

In a case where the original data packet reaches the AFC Ingress, the AFC Ingress compares values of match fields of the Ingress AFC Table illustrated in FIG. 41 with fields of the received original data packet. As a result, it is found that this original data packet matches the Ingress AFC Table of which the value of the AFC ID field is AFCID-2; therefore, the AFC Ingress adds the IP header, the UDP header, and the AFC header to a head of the original data packet as illustrated in FIG. 43. A value of each of fields of these headers is set similarly to the procedure described above (Application of AFC-1 to Data Packet). The above-described data packet reaches the AFC Daemon-1 in accordance with the destination address of the IP header and the destination port number of the UDP header. The AFC Daemon-1 inputs the original data packet into the AF-1 and obtains output data, similarly to the procedure described above (Application of AFC-1 to Data Packet). In a case where an output result satisfies a conditional expression Cond-1, the Index of the next AF is 2 (the AF-3). As a result, a header illustrated in FIG. 44 is generated similarly to the procedure described above (Application of AFC-1 to Data Packet).

Next, the AFC Daemon-1 transmits this packet. This packet reaches the AFC Daemon-3 in accordance with the destination address of the IP header and the destination port number of the UDP header. The AFC Daemon-3 applies the AF-3 to the original data packet. Meanwhile, in a case where the output result of the AF-1 does not satisfy the conditional expression Cond-1, the Index of the next AF is 1 (the AF-2). Thereafter, the AFC Daemon-2 applies the AF-2 to the original data packet, and the AFC Daemon-3 then applies the AF-3 to the original data packet.

In any of the cases, the AFC data packet reaches the AFC Egress, and the original data packet eventually reaches the application on the Server.

(Deletion of AFC)

Figures 45, 46, 47:
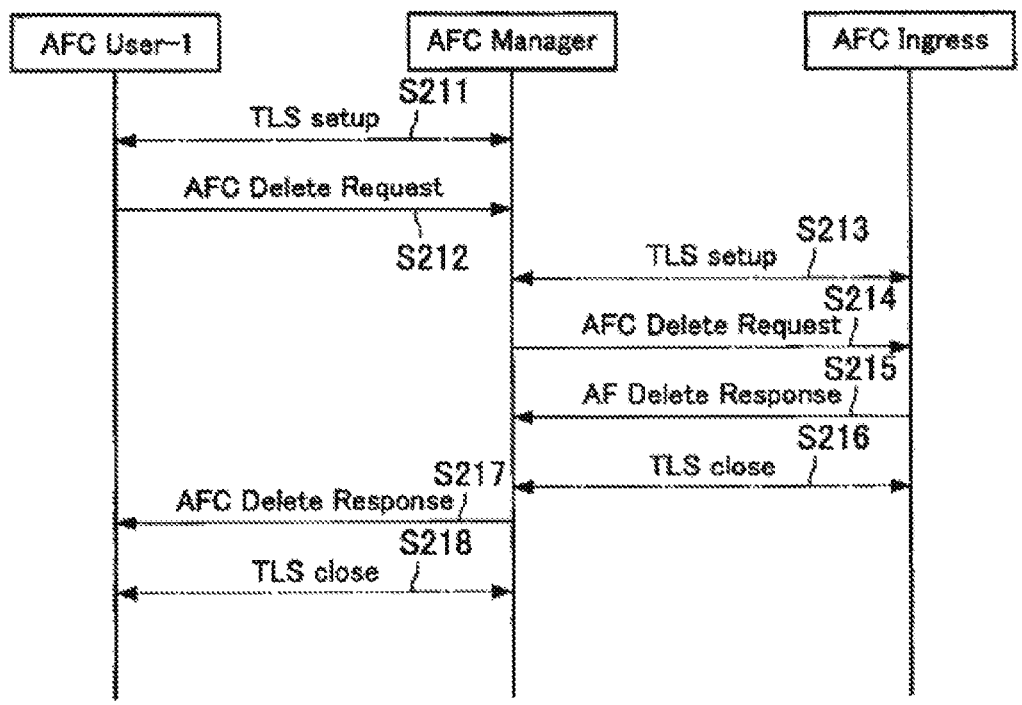
FIG. 45 is an explanatory diagram illustrating deletion of AFC.
FIG. 46 is an explanatory diagram illustrating a structure example of an AFC Delete Request packet.
FIG. 47 is an explanatory diagram illustrating a structure example of an AFC Delete Response packet.

Description is given of a procedure for deleting the AFC-2 after the AFC User-1 sets the AFC-1 and the AFC-2 as described above. FIG. 45 is an explanatory diagram illustrating deletion of the AFC.

First, the AFC User-1 establishes TLS session with the AFC Manager (step S211).

Next, the AFC User-1 transmits an AFC Delete Request packet illustrated in FIG. 46 to the AFC Manager (step S212). A value of each field of an AFC Delete Request message is as follows. "AFC Delete Request" is set to the Type field. USRID-1 is set to the User ID field. AFCID-2 is set to the AFC ID field. AFCCert-afc2 that is certificate information generated with use of AFCSKey-afc2 obtained by reception of the AFC Setup Response packet illustrated in FIG. 37 is set to the AFC Certificate field.

In a case where the AFC Manager receives the AFC Delete Request packet, the AFC Manager knows the IP address of the AFC Ingress from the Manager AFC Table illustrated in FIG. 40, and establishes TLS connection with the AFC Ingress (step S213).

Next, the AFC Manager forwards the received AFC Delete Request packet to the AFC Ingress (step S214).

In a case where the AFC Ingress receives the AFC Delete Request packet, the AFC Ingress deletes a table related to the AFC-2 from the table illustrated in FIG. 41. As a result, the AFC Ingress holds the tables illustrated in FIG. 28.

Next, the AFC Ingress transmits an AFC Delete Response packet illustrated in FIG. 47 to the AFC Manager (step S215). A value of each field of the AFC Delete Response packet is as follows. "AFC Delete Response" is set to the Type field. "OK" indicating success of processing is set to the Status field. USRID-1 that is the value of the User ID field of the AFC Delete Request packet is set to the User ID field. AFCID-2 that is the value of the AFC ID field of the AFC Delete Request packet is set to the AFC ID field.

In a case where the AFC Manager receives the AFC Delete Response packet, the AFC Manager deletes a table related to the AFC-2 from the table illustrated in FIG. 40. As a result, the AFC Manager holds the tables illustrated in FIG. 25.

Next, the AFC Manager disconnects the TLS connection with the AFC Ingress (step S216).

Next, the AFC Manager forwards the received AFC Delete Response packet to the AFC User-1 (step S217).

In a case where the AFC User-1 receives the AFC Delete Response packet, the AFC User-1 disconnects the TLS connection with the AFC Manager (step S218).

(Deletion of AF)

Figure 48:
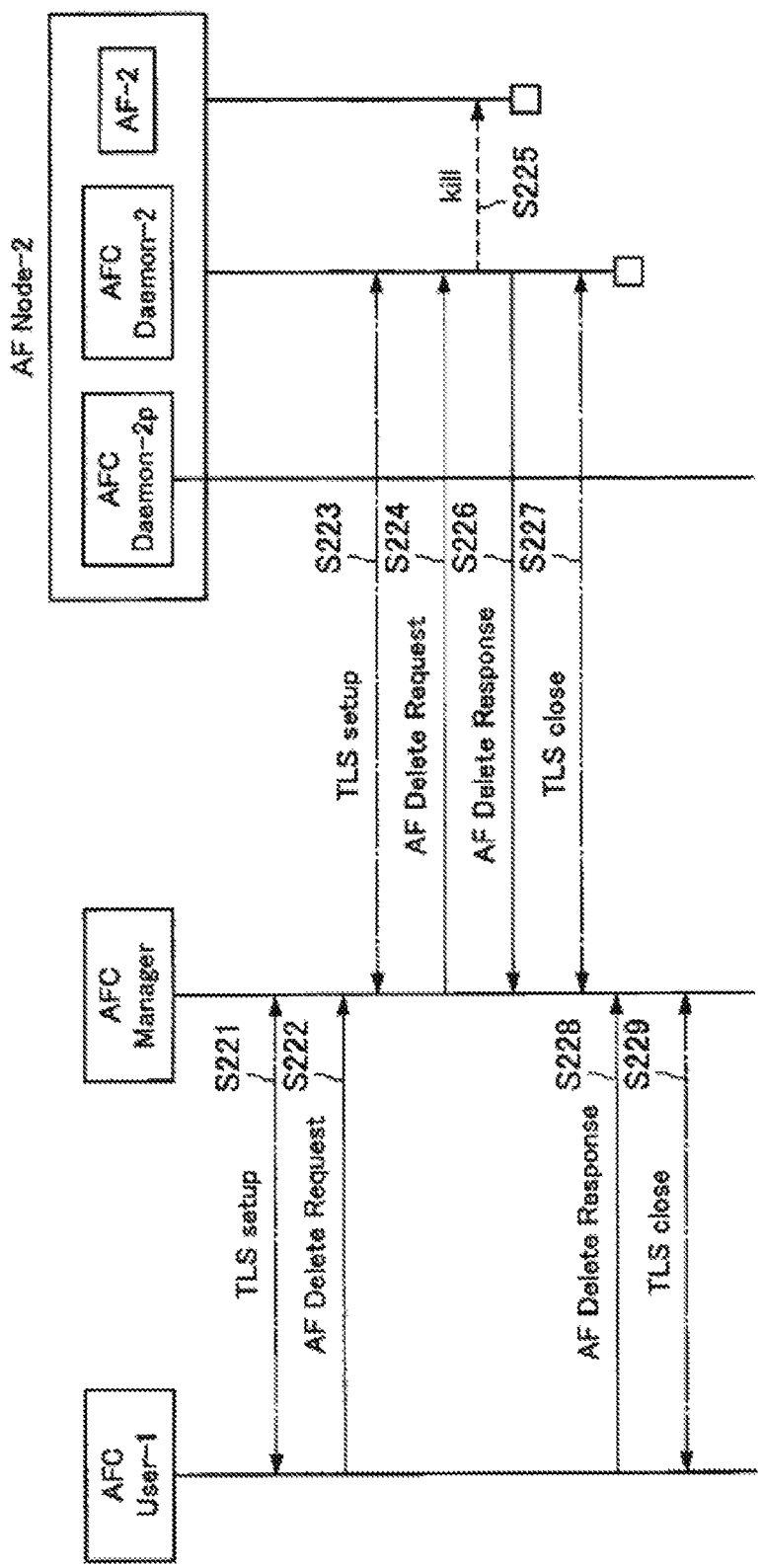
FIG. 48 is an explanatory diagram illustrating deletion of an AF.

Next, description is given of a procedure for deleting the AF-2 by the AFC User-1 after the AFC User-1 deletes the AFC-2 as described above. FIG. 48 is an explanatory diagram illustrating deletion of the AF.

First, the AFC User-1 establishes TLS connection with the AFC Manager (step S221).

Next, the AFC User-1 transmits an AF Delete Request packet illustrated in FIG. 49 to the AFC Manager (step S222). A value of each field of the AF Delete Request packet is as follows. "AF Delete Request" is set to the Type field. USRID-1 is set to the User ID field. AFID-2 is set to the AF ID field. AFCert-af2 that is certificate information generated with use of AFSKey-af2 obtained by the AF Setup Response packet received in setting of the AF-2 is set to the AF Certificate field.

In a case where the AFC Manager receives the AF Delete Request packet, the AFC Manger confirms that AFID-2 is not included in the Manager AF List illustrated in FIG. 25. Next, the AFC Manager knows the IP address of the AFC Daemon-2 from the Manager AF Node Table, and establishes TLS connection with the AFC Daemon-2 (step S223).

Next, the AFC Manager forwards the received AF Delete Request packet to the AFC Daemon-2 (step S224).

In a case where the AFC Daemon-2 receives the AF Delete packet, the AFC Daemon-2 stops execution of the AF-2 (step S225).

Next, the FC Daemon-2 transmits an AF Delete Response packet illustrated in FIG. 50 to the AFC Manager (step S226). A value of each field of the AF Delete Response packet is as follows. "AF Delete Response" is set to the Type field. "OK" indicating success of processing is set to the Status field. USRID-1 that is the value of the User ID field of the AF Delete Request is set to the User ID field. AFID-2 that is the value of the AF ID field of the AF Delete Request is set to the AF ID field.

Figure 51:
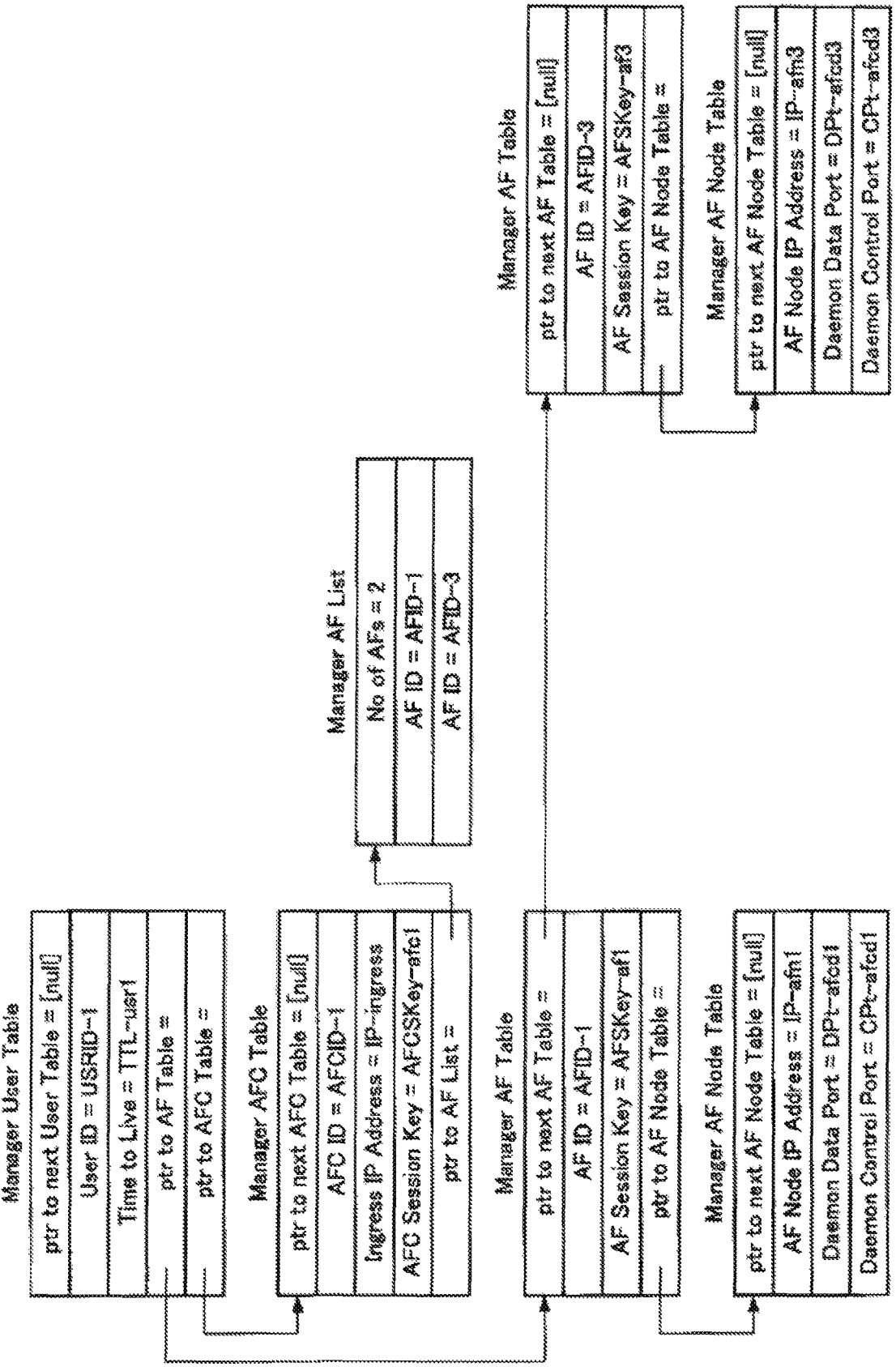
FIG. 51 is an explanatory diagram illustrating a structure example of a table held by the AFC Manager.

In a case where the AFC Manager receives the AF Delete Response packet, the AFC Manager disconnects the TLS connection with the AFC Daemon-2 (step S227). As a result, the AF running on the AFC Daemon-2 does not reside; therefore, the AFC Daemon-2 also ends execution. Meanwhile, the AFC Manager deletes tables related to the AF-2 from the table illustrated in FIG. 25. As a result, the AFC Manager holds a table illustrated in FIG. 51.

Next, the AFC Manager forwards the received AF Delete Response packet to the AFC User-1 (step S228).

In a case where the AFC User-1 receives the AFC Delete Response packet, the AFC User-1 disconnects the TLS connection with the AFC Manager (step S229).

(Invoking Same AF on Plurality of AF Nodes)

It is assumed that after that, the AFC User-1 deletes the AFC-1, the AF-2, and the AF-1. It is assumed that the AFC User-1 next sets up an AF-4 on an AF Node-4-1 and an AF Node-4-2 by a procedure similar to that in FIG. 9. As a result, the AFC User-1 knows that AFID-4 is assigned as an identifier of the AF-4, and obtains AFSKey-af4 as the AF Session Key.

It is assumed that the AFC User-1 further sets up an AF-5 on an AF Node-5-1 and an AF Node-5-2. As a result, the AFC User-1 knows that AFID-5 is assigned as an identifier of the AF-5, and obtains AFSKey-af5 as the AF Session Key. In addition, the AF Node-4-1, the AF Node-4-2, the AF Node-5-1, and the AF Node-5-2 respectively hold tables illustrated in FIGS. 53 to 56, and the AFC Manager holds a table illustrated in FIG. 57. As can be seen from FIG. 57, two Manager AF Tables each have a list including two Manager AF Node Tables. The respective four Manager AF Node Tables correspond to the AF Node-4-1, the AF Node-4-2, the AF Node-5-1, and the AF Node-5-2.

(Setting of AFC-3)

Figure 52:
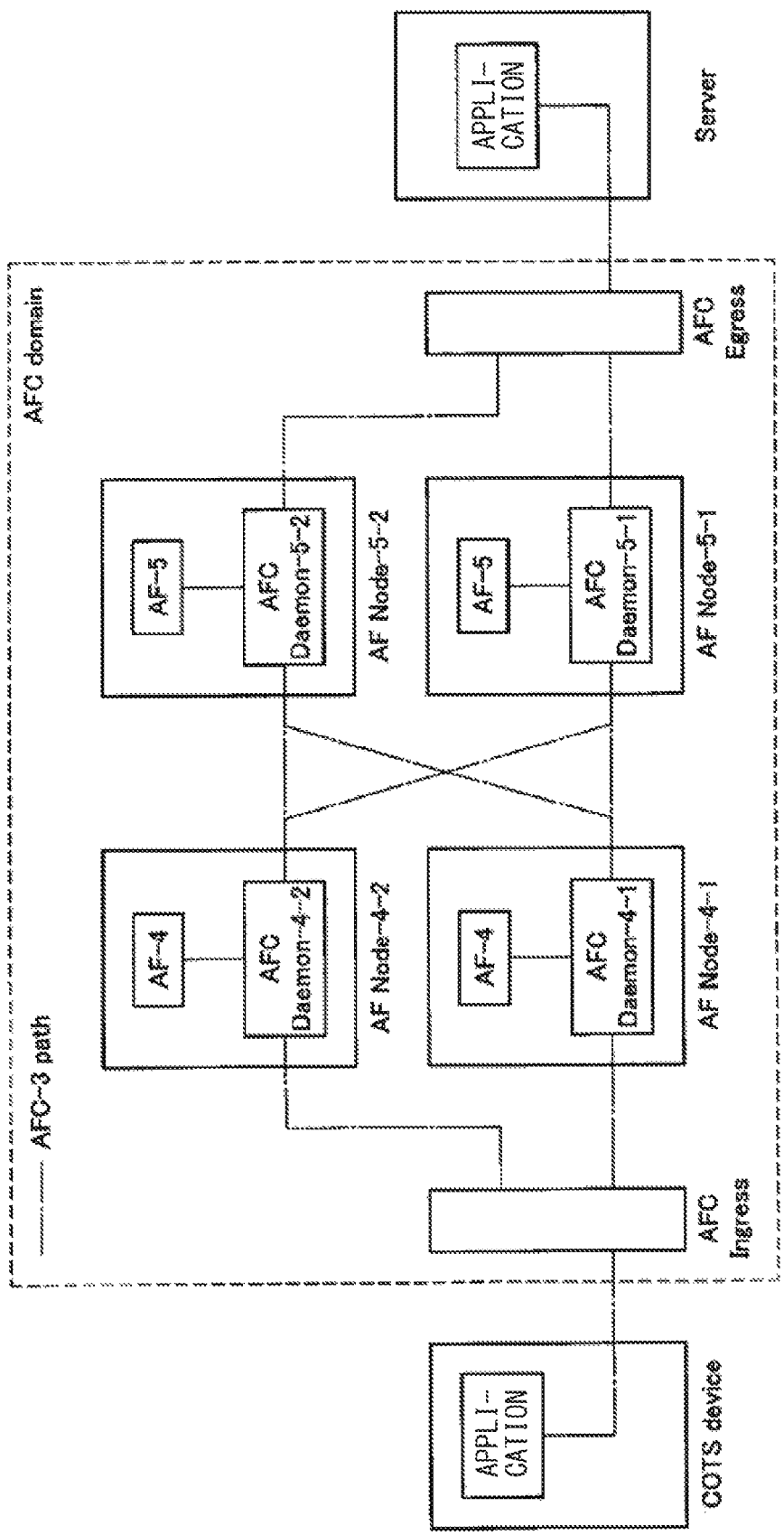
FIG. 52 is an explanatory diagram illustrating a path of AFC-3.

Next, it is assumed that the AFC User-1 sets AFC (referred to as AFC-3) including the AF-4 and the AF-5 by a procedure similar to that in FIG. 21. FIG. 52 is an explanatory diagram illustrating a path of the AFC-3. In addition, FIG. 58 is an explanatory diagram illustrating an AFC Setup Request packet. A value of each field of the AFC Setup Request packet is as follows. "AFC Setup Request" is set to the Type field. USRID-1 is set to the User ID field. Five fields subsequent to this are match fields for identifying a data packet to which the AFC is to be applied. The value of the Source IP Address field is [any]. The value of the Destination IP Address field is IP-svr3. The value of the Source Port field is [any]. The value of the Destination Port field is Pt-svr3. The value of the Protocol field is UDP. IP-ingress that is the IP address of the AFC Ingress is set to the Ingress IP Address field. IP-egress that is the IP address of the AFC Egress is set to the Egress IP Address field. Next, two that is the number of AFs included in the AFC is set to the No of AFs field. Four fields subsequent to this include information about the AF-4. AFID-4 is set to the AF ID field. AFCert-af4 that is certificate information generated with use of AFSKey-af4 is set to the AF Certificate field. CondLen-4 indicating the length of the Next Index field is set to the Next Index Length field. In the Next Index field, it is indicated that the next is an AF (an AF-6) of which the Index is 1 regardless of a result of execution of the AF-4. Four fields subsequent to this include information about the AF-5. AFID-5 is set to the AF ID field. AFCert-af5 that is certificate information generated with use of AFSKey-af5 is set to the AF Certificate field. CondLen-5 indicating the length of the Next Index field is set to the Next Index Length field. In the Next Index field, it is indicated that the next is an AF (the AF Egress) of which the Index is 2 regardless of a result of execution of the AF-5. The AFC Manager assigns AFCID-3 as an identifier to the AFC-3.

Figure 57:
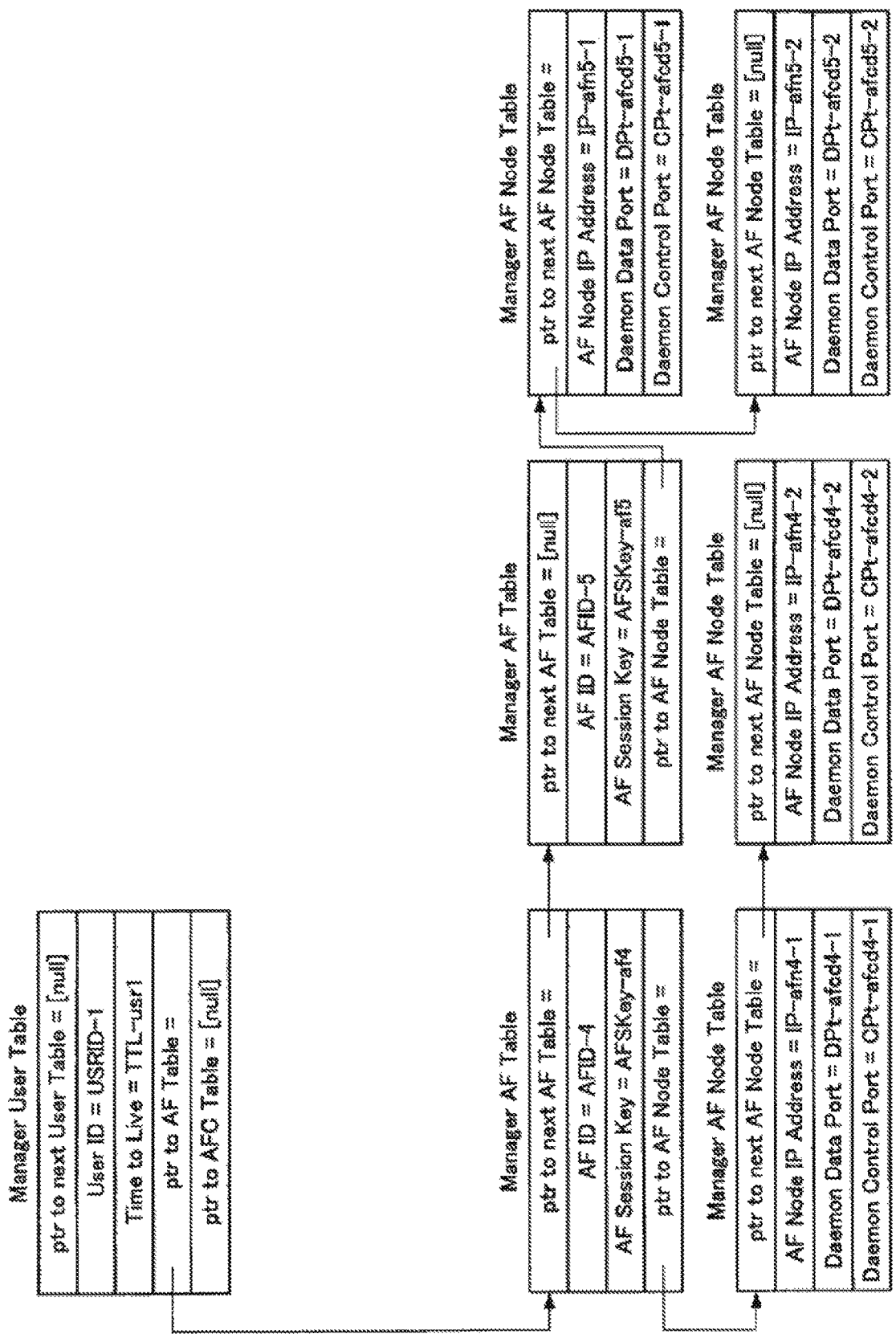
FIG. 57 is an explanatory diagram illustrating a structure example of a table held by the AFC Manager.
Figure 60:
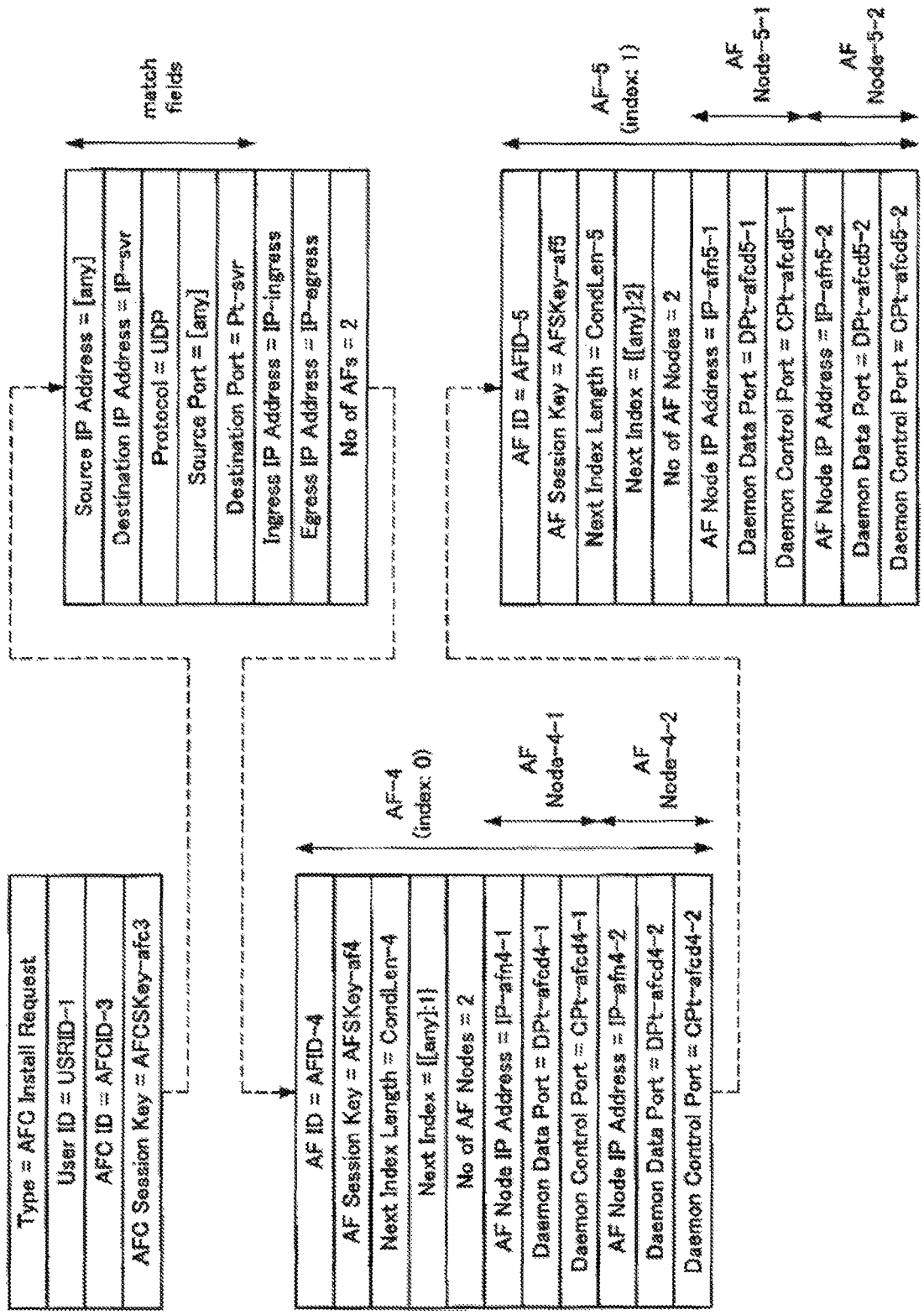
FIG. 60 is an explanatory diagram illustrating a structure example of an AFC Install Request packet.

FIG. 60 is an explanatory diagram illustrating the AFC Install Request packet. A value of each field of the AFC Install Request packet is as follows. "AFC Install Request" is set to the Type field. Values of corresponding fields of the AFC Setup Request packet are set to fields from the User ID field to the No of AFs field. Eleven fields subsequent to this are related to the AF-4. AFID-4 that is the value of the AF ID field of the AFC Setup Request packet is set to the AF ID field. AFSKey-af4 that is the value of the AF Session Key field of the Manager AF Table illustrated in FIG. 57 is set to the AF Session Key field. Values of corresponding fields of the AFC Setup Request packet are set to the Next Index Length field and the Next Index field. The Manager AF Table illustrated in FIG. 57 has two Manager AF Node Tables; therefore, two is set to the No of AF Nodes field. Three fields subsequent to this are fields for the AF Node-4-1. Values of corresponding fields of the Manager AF Node Table illustrated in FIG. 57 are set to the AF Node IP Address field, the AFC Daemon Data Port field, and the AFC Daemon Control Port field. Three fields subsequent to this are fields for the AF Node-4-2. Respective fields are set similarly to the fields for the AF Node-4-1. Eleven fields subsequent to this are related to the AF-5. These fields are set similarly to the fields for the AF-4. FIG. 61 is an explanatory diagram illustrating an AFC Install Response packet corresponding to the above-described AFC Install Request packet. In addition, FIG. 59 is an explanatory diagram illustrating an AFC Setup Response packet corresponding to the above-described AFC Setup Request packet.

Figure 62:
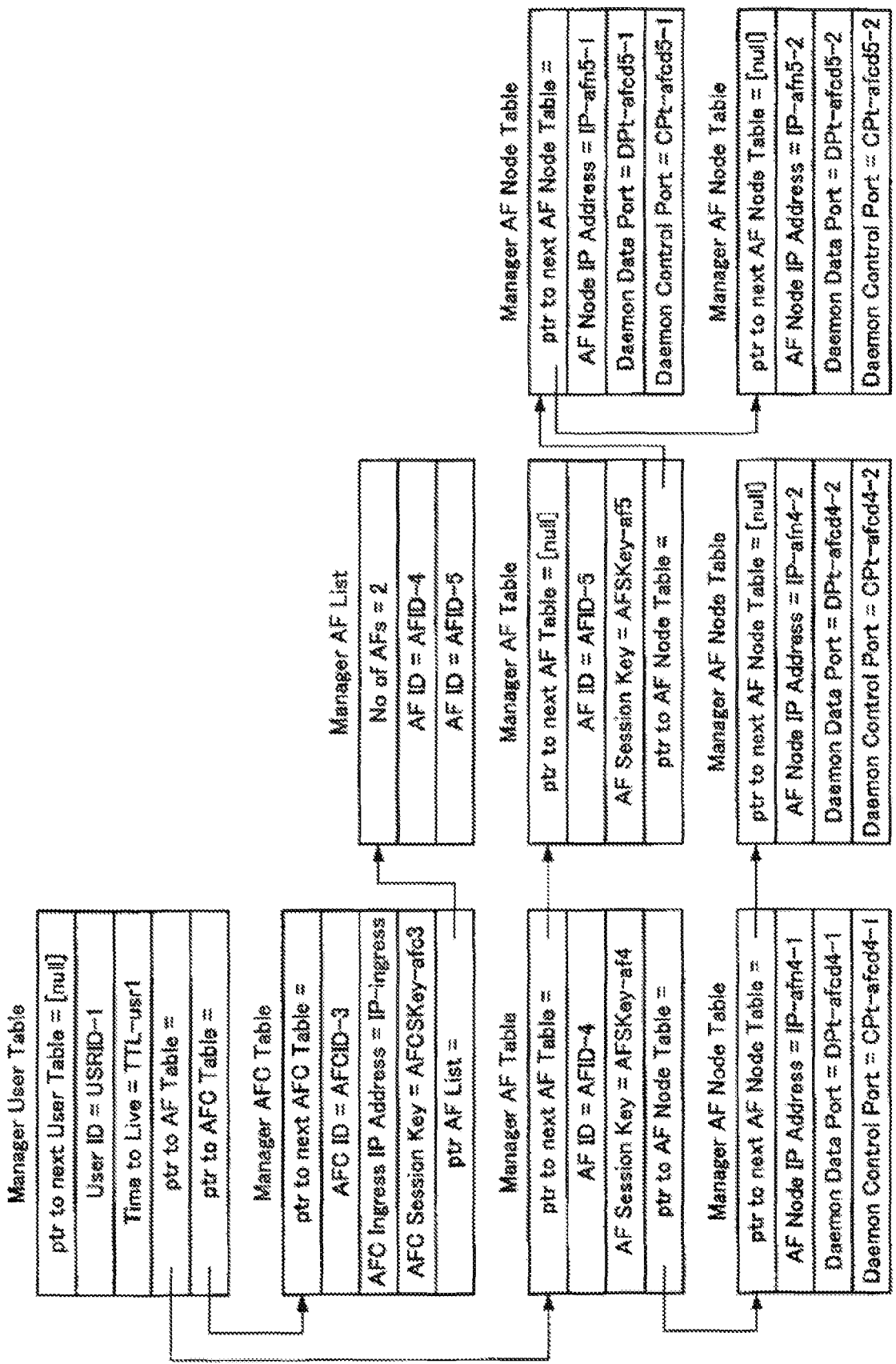
FIG. 62 is an explanatory diagram illustrating a structure example of a table held by the AFC Manager.
Figure 63:
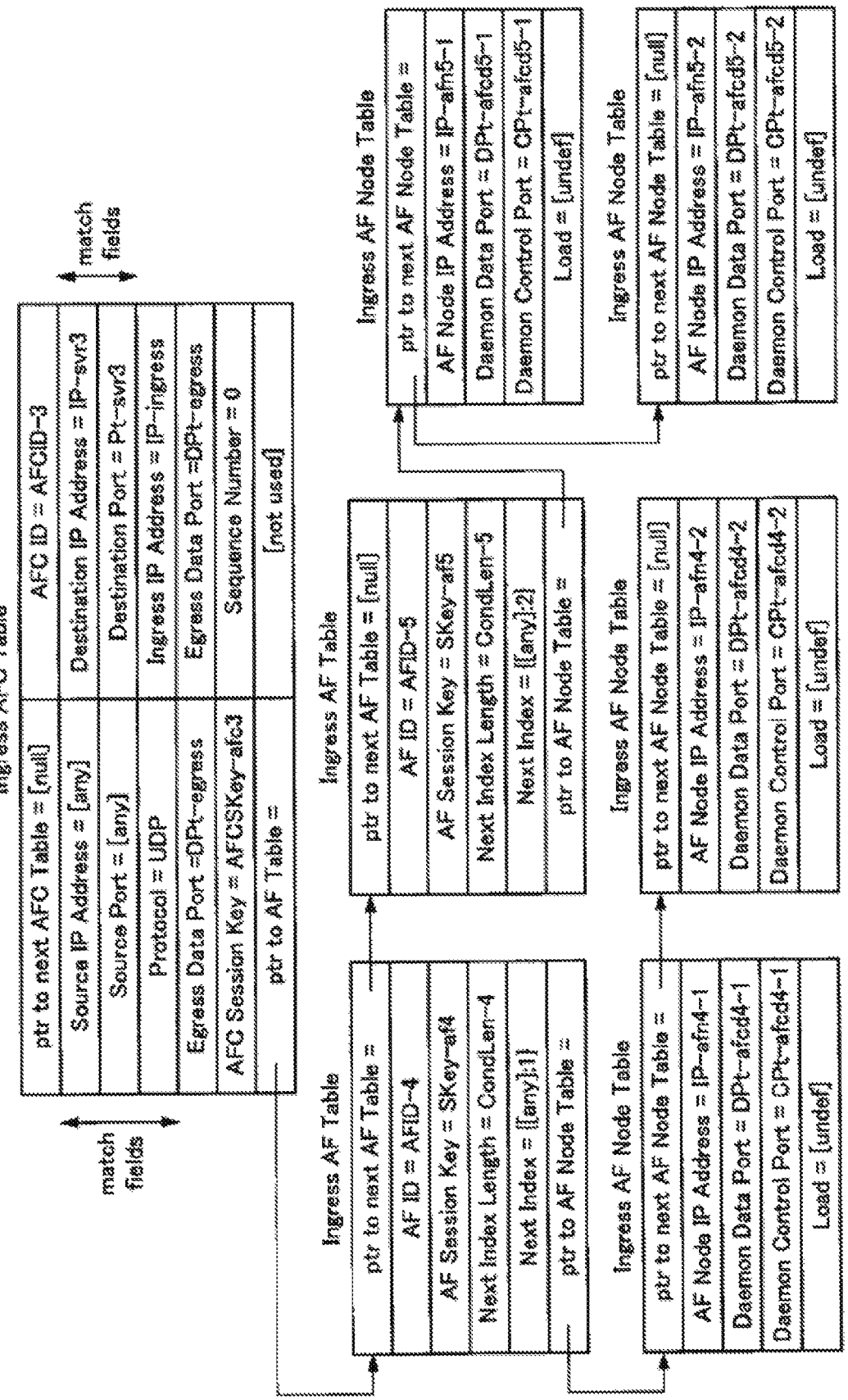
FIG. 63 is an explanatory diagram illustrating a structure example of a table held by the AFC Ingress.

As a result of the above processing, the AFC Manager holds a table illustrated in FIG. 62. As illustrated in FIG. 62, two Manager AF Tables each have a list including two Manager AF Node Tables. Meanwhile, the AFC Ingress holds a table illustrated in FIG. 63. As illustrated in FIG. 63, two Ingress AF Tables each have a list including two Ingress AF Node Tables.

(Monitoring of Loads of AF Nodes)

Figure 64:
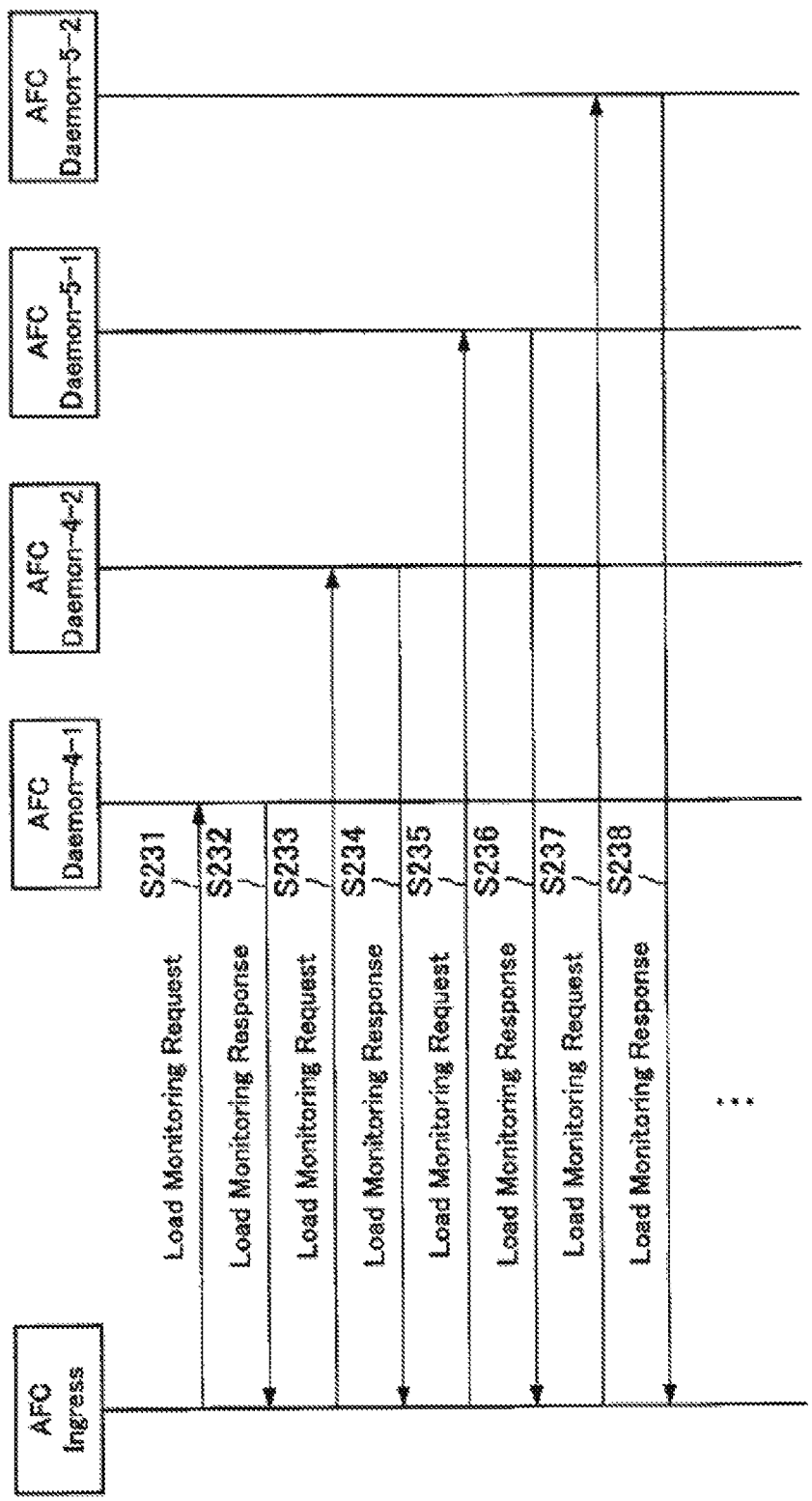
FIG. 64 is an explanatory diagram illustrating monitoring of loads of AF nodes by the AFC Ingress.

The AFC Ingress recognizes, by setting the AF Nodes as described above, that there are two AF Nodes on which the AF-4 operates and two AF nodes on which the AF-5 operates, and therefore monitors loads of the respective AF Nodes. FIG. 64 is an explanatory diagram illustrating monitoring of loads of the AF Nodes by the AFC Ingress.

The AFC Ingress transmits a Load Monitoring Request packet illustrated in FIG. 65 to the AF Node-4-1 (step S231). "Load Monitoring Request" is set to the Type field of the Load Monitoring Request packet.

In a case where the AFC Daemon-4-1 receives the Load Monitoring Request packet, the AFC Daemon-4-1 transmits a Load Monitoring Response packet illustrated in FIG. 66 to the AFC Ingress (step S232). A value of each field of the Load Monitoring Response packet is as follows. "Load Monitoring Response" is set to the Type field. "OK" indicating success of processing is set to the Status field. LD-4-1 that is a numeric value indicating the degree of the load of the AF Node-4-1 is set to the Load field.

Figure 67:
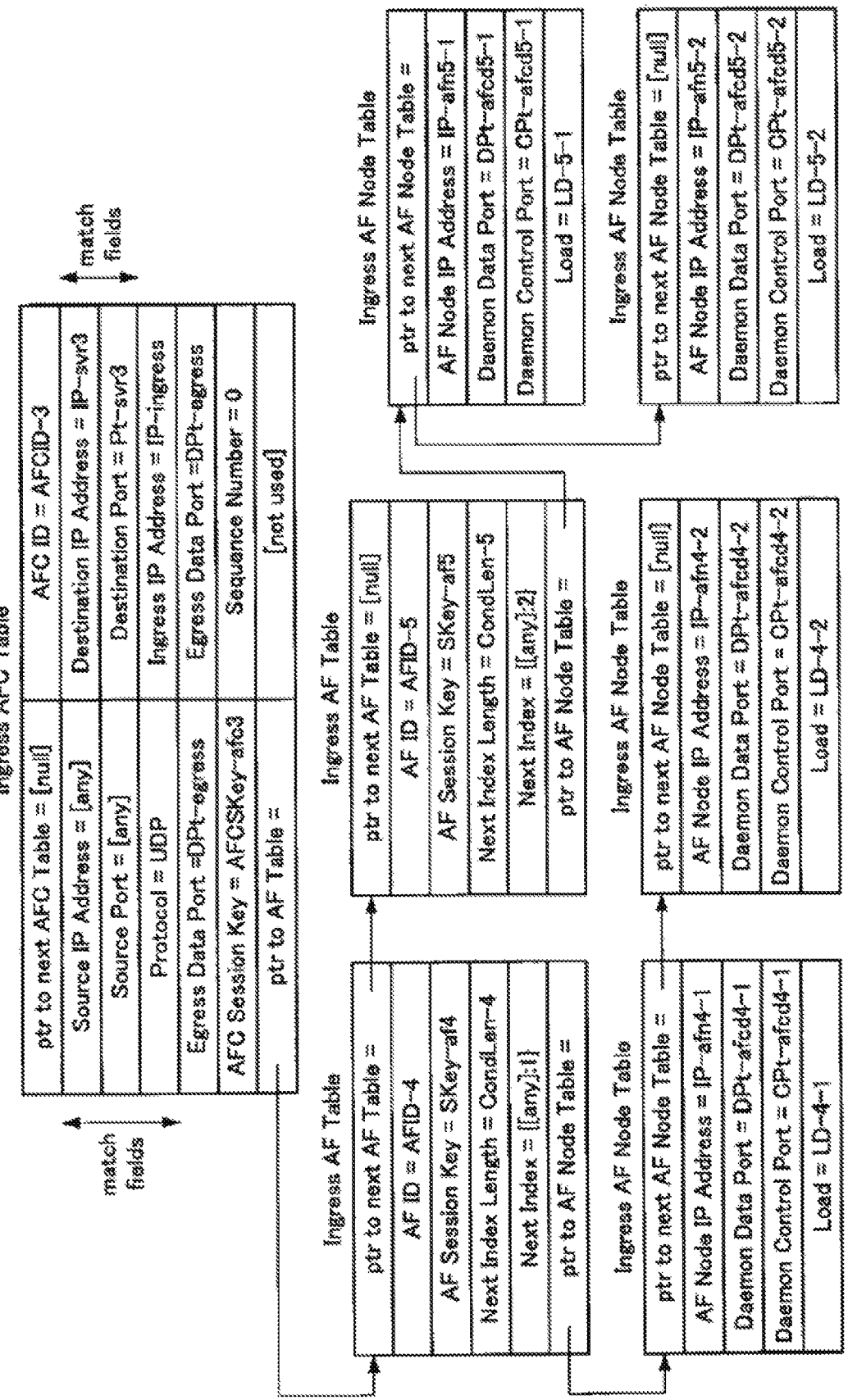
FIG. 67 is an explanatory diagram illustrating a structure example of an Ingress AF Node Table.

Next, the AFC Ingress performs processing similar to that described above on the AF Node-4-2, the AF Node-5-1, and the AF Node-5-2 (steps S233, S235, and S237). The AF Node-4-2, the AF Node-5-1, and the AF Node-5-2 perform processing similar to that in the AF Node-4-1 (steps S234, S236, and S238). In a case where the AFC Ingress receives Load Monitoring Response, the AFC Ingress sets the value of the Load field to the Load field of the Ingress AF Node Table as illustrated in FIG. 67.

The AFC Ingress repeats the above-described processing on a regular basis. This makes it possible for the AFC Ingress to obtain loads of the respective AF Nods on a regular basis and update information of the loads. Here, examples of loads to be monitored include CPU utilization of each AF Node, memory usage, storage medium usage, temperature, the number of running AFs, network interface usage, a data throughput of a network interface, a discarded packet amount of the network interface, a traffic amount of the network interface, and the like. A load related to the network interface may be monitored separately for each of transmission and reception, and in a case where the AF Node has a plurality of network interfaces, a load may be monitored separately for each of the network interfaces. In addition, items of a plurality of loads may be set to a field of the Load Monitoring Request packet or the Load Monitoring Response packet.

(Packet Forwarding in AFC-3 (Selection of AF Node by Load))

Figure 68:
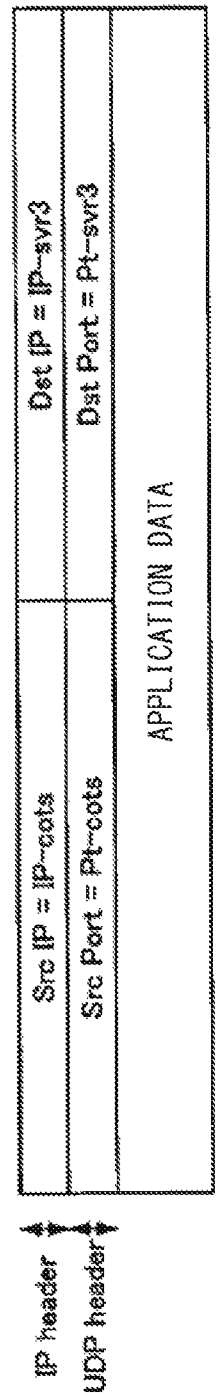
FIG. 68 is an explanatory diagram illustrating a structure example of a data packet.

Next, it is assumed that in FIG. 52, the application on the COTS device transmits an original data packet illustrated in FIG. 68 to the application on the Server. It is assumed that the IP address of the COTS device is IP-cots, and a port number to be used by the application on the COTS device is Pt-cots. It is assumed that the IP address of the Server is IP-svr3, and a port number to be used by the application on the Server is Pt-svr3. In the original data packet illustrated in FIG. 68, only a source IP address field and a destination IP address are illustrated in the IP header, and only a source port field and a destination port field are illustrated in the UDP header.

Figure 69:
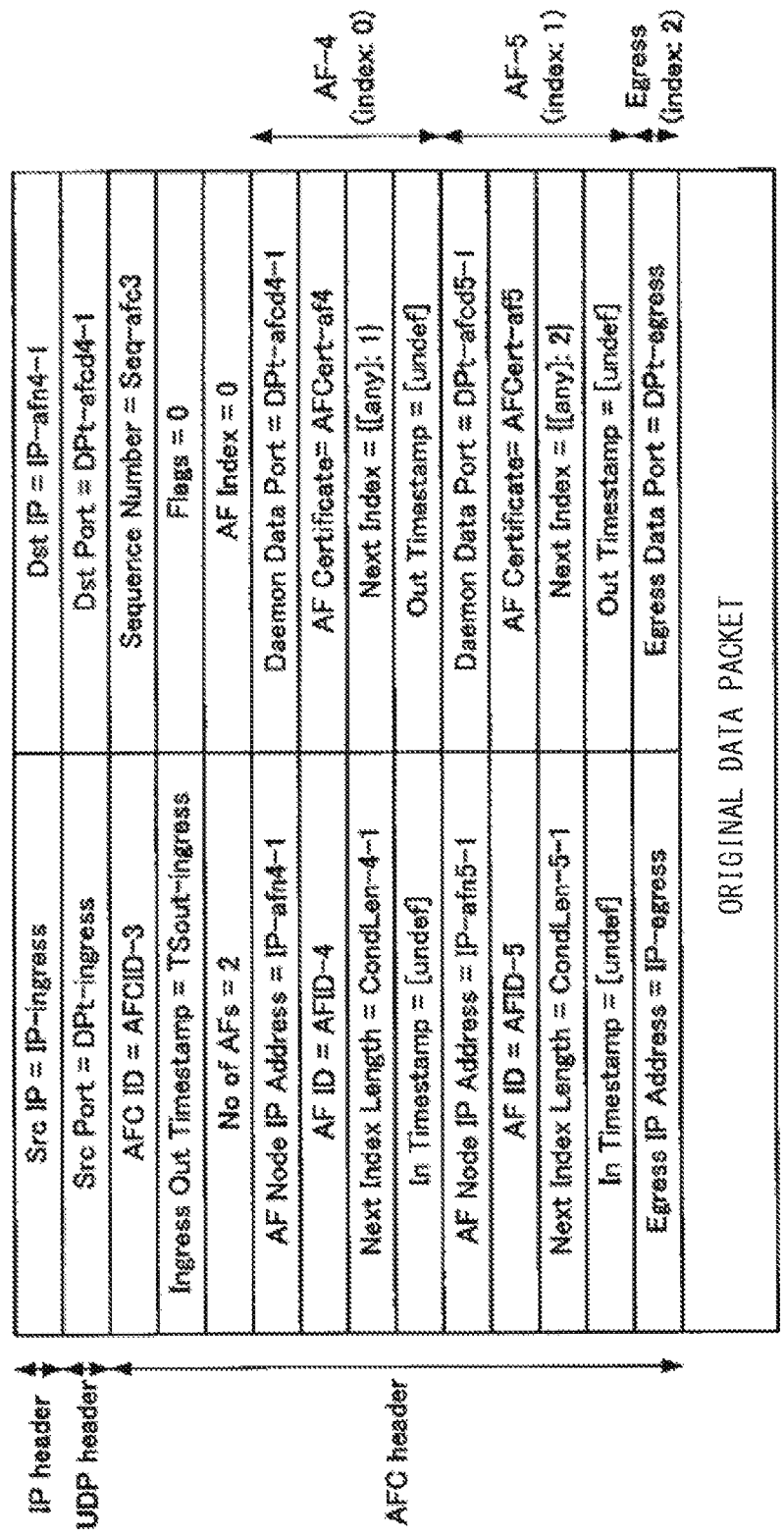
FIG. 69 is an explanatory diagram illustrating a structure example of an AFC data packet.

In a case where this original data packet reaches the AFC Ingress, the AFC Ingress compares values of match fields of the Ingress AFC Table illustrated in FIG. 67 with fields of the received data packet. As a result, it is found that this original data packet matches the Ingress AFC Table of which the value of the AFC ID field is AFCID-3; therefore, the AFC Ingress adds the IP header, the UDP header, and the AFC header to a head of the original data packet as illustrated in FIG. 69 to generate an AFC data packet. In the IP header, IP-ingress that is the IP address of the AFC Ingress is set to the Src IP field. It is assumed that for values of Load fields of two Ingress AF Node tables related to the AF-4 illustrated in FIG. 67, LD-4-1 has a numeric value smaller than LD-4-2. That is, it is assumed that the load of the AF Node-4-1 is lower than the load of the AF Node-4-2. Similarly, it is assumed that the load of the AF Node-5-1 is lower than the load of the AF Node-5-2. Accordingly, the AFC Ingress selects the AF Node-4-1 as the AF Node of the AF-4, and selects the AF Node-5-1 as the AF Node of the AF-5. IP-afn4-1 that is the IP address of the AF Node-4-1 is set to the Dst IP field of the IP header. In the UDP header, DPt-ingress that is a port number for a data packet of the AFC Ingress is set to the Src Port field. DPt-afcd4-1 that is a port number for AFC data packet transmission and reception of the AFC Daemon-4-1 is set to the Dst Port field. A value of each field of the AFC header is set similarly to the procedure described in (Application of AFC-1 to Data Packet).

Figure 70:
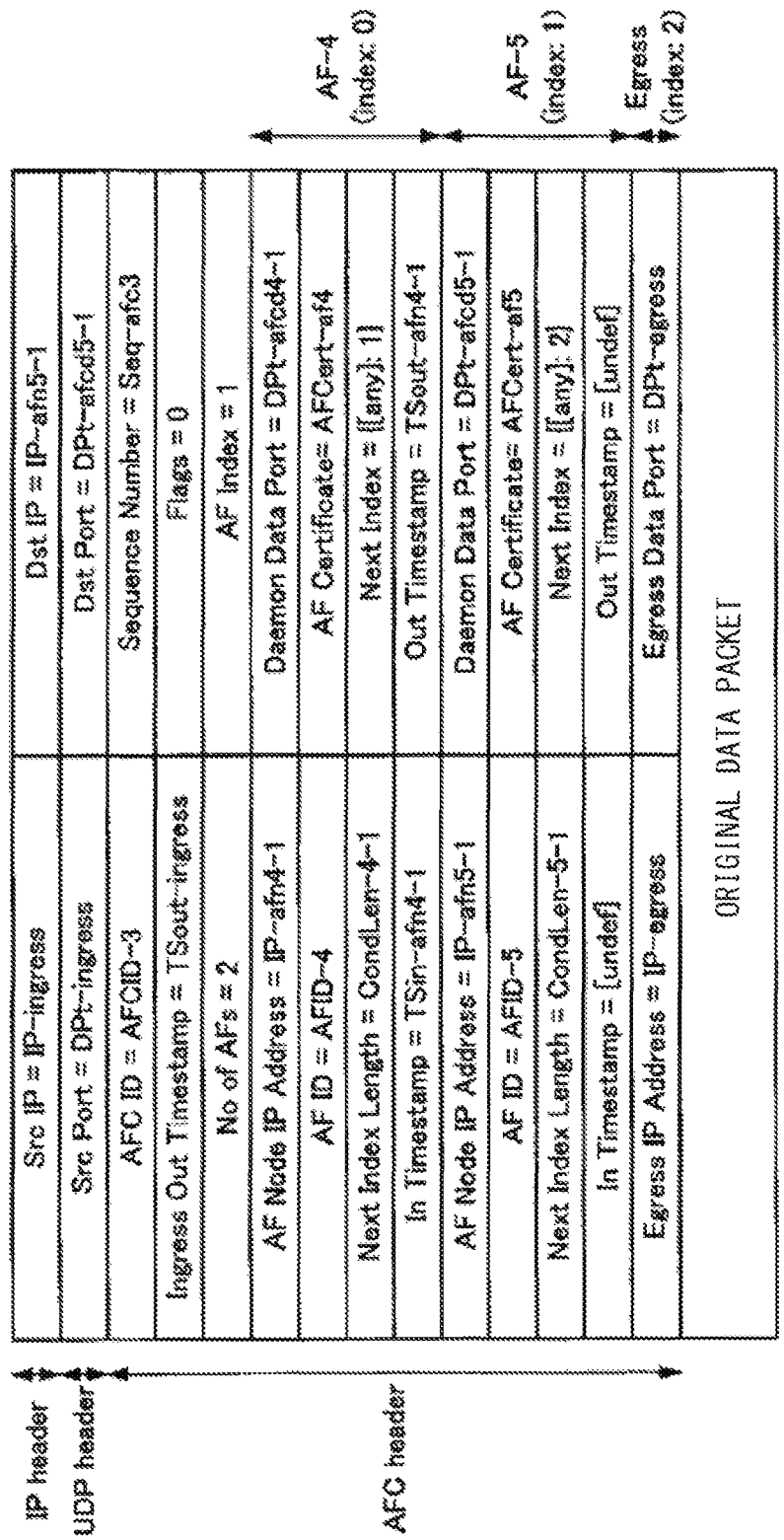
FIG. 70 is an explanatory diagram illustrating a structure example of an AFC data packet.
Figure 71:
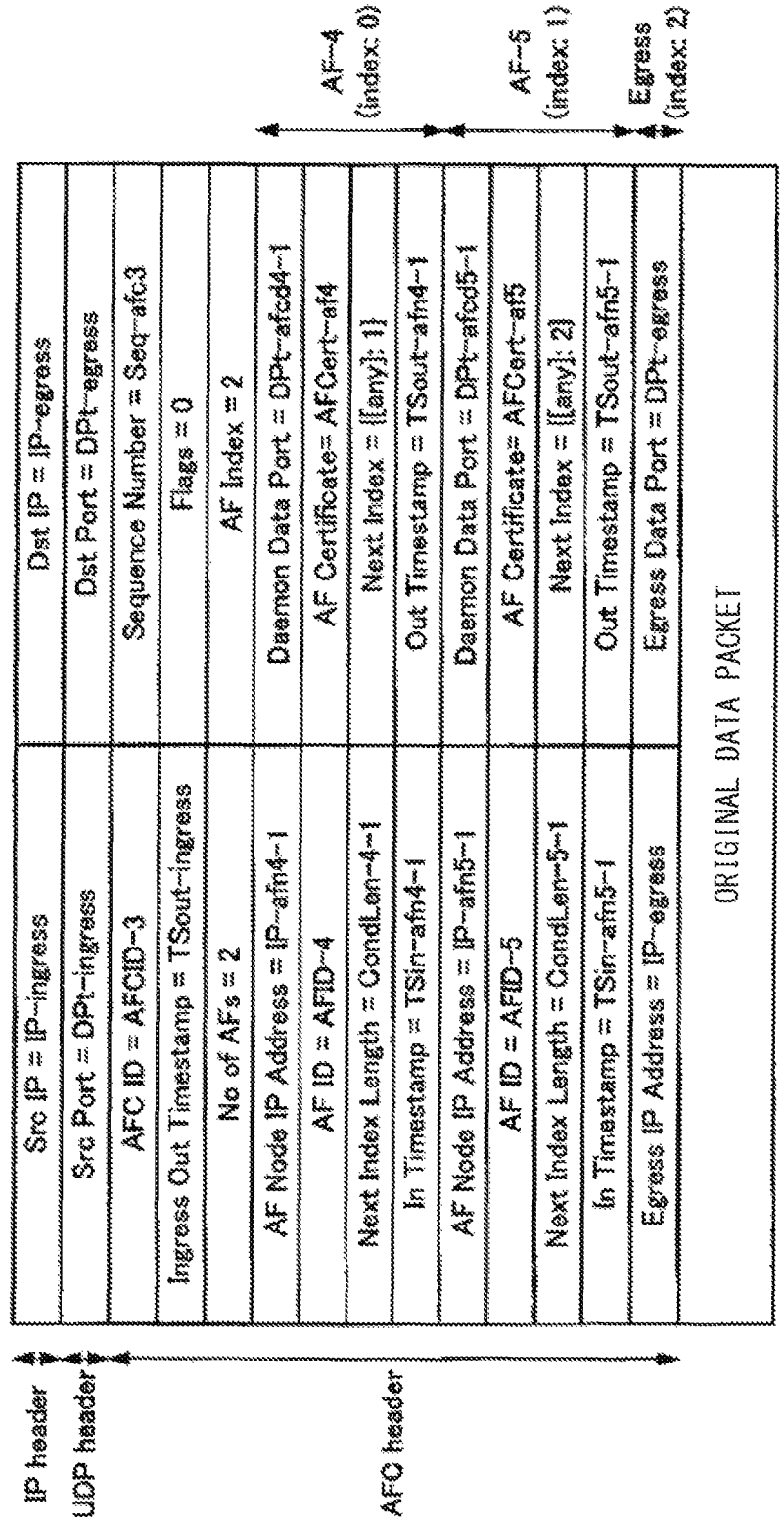
FIG. 71 is an explanatory diagram illustrating a structure example of an AFC data packet.

The above-described AFC data packet reaches the AFC Daemon-4-1 in accordance with the destination address of the IP header and the destination port number of the UDP header. The AFC Daemon-4-1 applies the AF-4 to the original data packet, and obtains output data, similarly to the procedure described in (Application of AFC-1 to Data Packet). The AFC Daemon-4-1 generates a header illustrated in FIG. 70, and transmits this packet. The above-described AFC data packet reaches the AFC Daemon-5-1 in accordance with the destination address of the IP header and the destination port number of the UDP header. The AFC Daemon-5-1 applies the AF-5 to the original data packet, and obtains output data, similarly to the procedure described in (Application of AFC-1 to Data Packet). The AFC Daemon-5-1 generates a header illustrated in FIG. 71, and transmits this packet. The above-described AFC data packet reaches the AFC Egress in accordance with the destination address of the IP header and the destination port number of the UDP header. The AFC Egress takes the original data packet out of the received AFC data packet, and transmits this original data packet to the Sever.

(Packet Forwarding in AFC-3 (Round Robin, Random))

In the above-described example, in a case where the original data packet transmitted by the application on the COTS device reaches the AFC Ingress, the AFC Ingress selects an AF Node included in the AFC on the basis of the load of each of the AF Nodes. Another conceivable method is a method of selecting an AF Node in a round robin manner. In this example, there are four combinations of (the AF Node-4-1 and the AF Node-5-1), (the AF Node-4-1 and the AF Node-5-2), (the AF Node-4-2 and the AF Node-5-1), and (the AF Node-4-2 and AF Node-5-2). The round robin manner is a method in which these four combinations are sequentially used. In addition, a method of randomly selecting the four combinations may be used.

(Packet Forwarding in AFC-3 (Feedback from AFC Egress to AFC Ingress))

Figure 72:
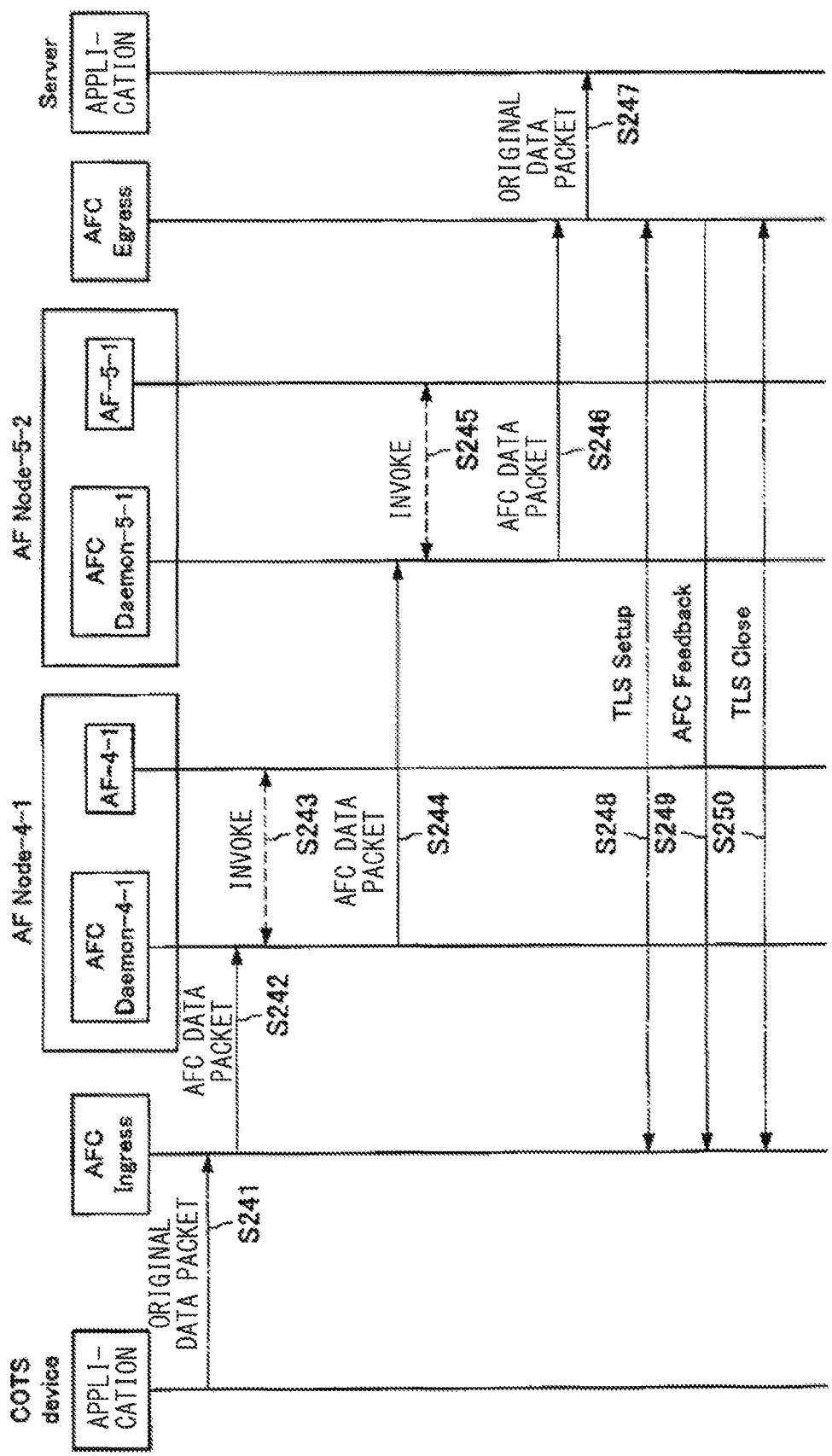
FIG. 72 is an explanatory diagram illustrating a packet transmission example in AFC.

It is assumed that in a case where the original data packet transmitted by the application on the COTS device reaches the AFC Ingress, the AFC Ingress selects the AF-4 on the AF Node-4-1 and the AF-5 on the AF Node-5-1 as AFC-3, and a Feedback flag is set to the Flags field of the AFC header. Then, the packet is forwarded from the application on the COTS device to the application on the Server as in steps S241 to S247 in FIG. 72.

The feedback flag is set to the Flags Field of the AFC header; therefore, the AFC Egress establishes TLS connection with the AFC Ingress (step S248), transmits an AFC Feedback packet illustrated in FIG. 73 to the AFC Ingress (step S249), and lastly disconnects the TLS connection with the AFC Ingress (step S250). A value of each field of the AFC Feedback packet is as follows. The value of the Type field is "AFC Feedback". The value of the AFC ID field is AFCID-3. The value of the No of AFs field is 2. Four fields subsequent to this are related to the AF Node-4-1. The value of the AF ID field is AFID-4. The value of the AF Node IP Address is IP-afn4-1. Values of the In Timestamp field and the Out Timestamp field of the corresponding AF of the AFC header of the received AFC data packet are respectively set to the In Timestamp field and the Out Timestamp field. Four subsequent fields are related to the AF Node-5-1, and are set as described above. A value of a corresponding field of the received AFC data packet is set to the Ingress Out Timestamp field. A time when the AFC Egress receives the AFC data packet is set to the Egress In Timestamp field.

Figure 74:
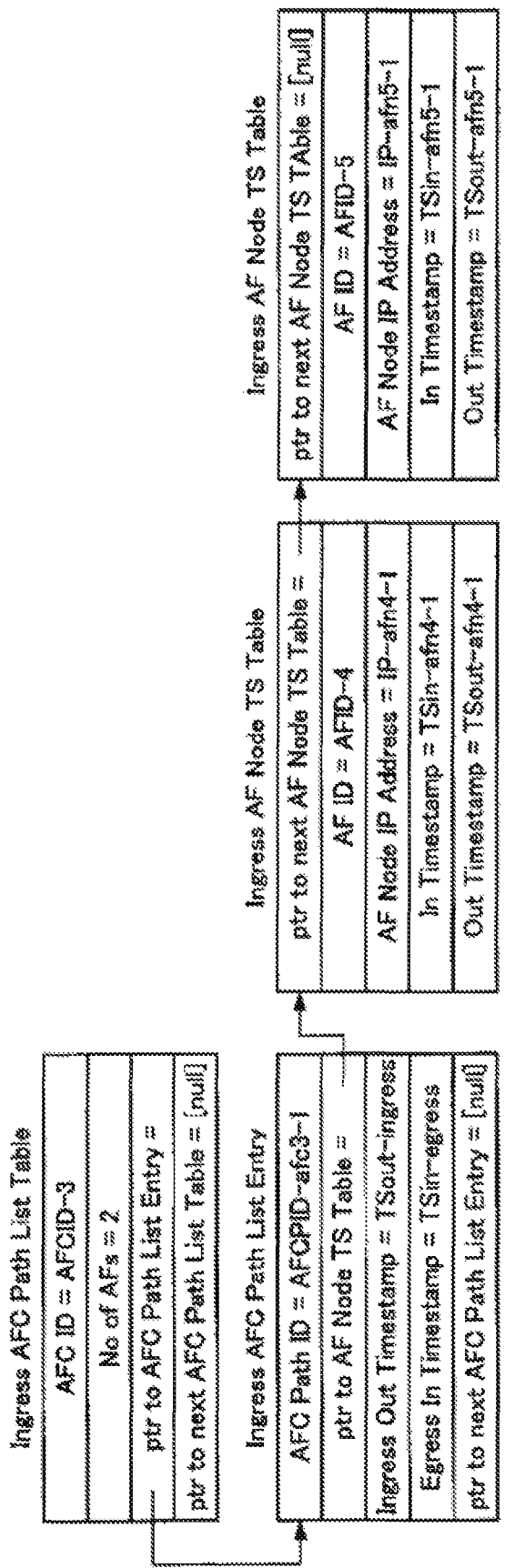
FIG. 74 is an explanatory diagram illustrating a structure example of a table held by the AFC Ingress.

In a case where the AFC Ingress receives the AFC Feedback packet, the AFC Ingress holds a table illustrated in FIG. 74.

A value of each field of the Ingress AFC Path List Table is as follows. The value of the AFC ID field is AFCID-3. The value of the No of AFs field is 2. The value of the ptr to AFC Path List Entry field is a pointer to the Ingress AFC Path list Entry. The value of the Ingress Out Timestamp field is TSout-ingress that is a value of a corresponding field of the AFC Feedback packet. The value of the Egress In Timestamp field is TSin-egress that is a value of a corresponding field of the AFC Feedback packet. The value of the ptr to Next AFC Path List Table is [null].

A value of each field of the Ingress AFC Path List Entry is as follows. The AFC Ingress assigns AFCPID-afc3-1 as an identifier of an AFC path that becomes a target of the AFC Feedback packet, and stores this in the AFC Path ID field. The value of the ptr to AF Node TS Table is a pointer to the Ingress AF Node TS Table. The value of the ptr to Next AFC Path List Entry is [null]. In a case where the AFC Ingress receives an AFC Feedback packet related to another AFC path related to the AFC-3, the AFC Ingress creates a new Ingress AFC Path List Entry, and stores a pointer to this Ingress AFC Path List Entry in the above-described ptr to Next AFC Path List Entry.

Of two Ingress AFC Node TS Tables, one on the left is related to the AF Node-4-1, and one on the right is related to the AF Node-5-1.

A value of each field of the Ingress AF Node TS Table related to the AF Node-4-1 is as follows. The value of the ptr to Next AF Node TS Table field is a pointer to an AF Node TS Table related to the AF Node-5-1. The value of the AF ID field is AFID-4. The value of the AF Node IP Address field is IP-afn4-1 that is the IP address of the AF Node-4-1. The value of the In Timestamp field is TSin-afn4-1 that is a value of a corresponding In Timestamp field of the AFC Feedback packet. The value of the Out Timestamp field is TSout-afn4-1 that is a value of a corresponding Out Timestamp field of the AFC Feedback packet.

A value of each field of the Ingress AF Node TS Table related to the AF Node-5-1 is as follows. The value of the ptr to Next AF Node TS Table field is [null]. The value of the AF ID field is AFID-5. The value of the AF Node IP Address field is IP-afn5-1 that is the IP address of the AF Node-5-1. The value of the In Timestamp field is TSin-afn5-1 that is a value of a corresponding In Timestamp field of the AFC Feedback packet. The value of the Out Timestamp field is TSout-afn5-1 that is a value of a corresponding Out Timestamp field of the AFC Feedback packet.

In this example, the AFC-3 has four AFC paths; therefore, in a case where the AFC Ingress receives the AFC Feedback packet related to each of the AFC paths, the AFC Ingress updates a corresponding Ingress AF Node TS Table. When the AFC Ingress receives the original data packet to which the AFC-3 is applied from the application on the COTS device, the AFC Ingress may select the AFC path with reference to the Ingress AFC Path List Table. For example, a communication time of all the AFC paths may be considered. Alternatively, only a processing time of the AF may be considered. In addition, only a communication time between respective nodes may be also considered. Further, a processing time of a specific AF and a communication time between specific nodes may be combined.

(Timeout and Timeout Extension Request)

The AFC Manager decrements the value of the Time to Live field of the Manager User Table at regular intervals (for example, at one-minute intervals). In a case where the value of the Time to Live field becomes 0 (timeout) as a result of such decrementing, all tables related to a corresponding AFC User are deleted. In the above-described state, in a case where a value of a TTL-usr1 field of the Manager User Table related to the AFC User-1 becomes 0, the AFC Manager deletes all tables related to the AFC User-1.

Figures 75, 76, 77:
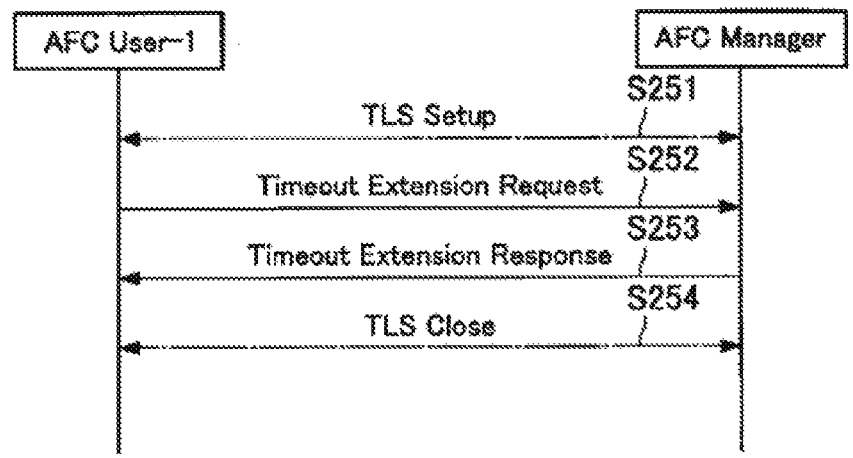
FIG. 75 is an explanatory diagram illustrating time extension processing until a timeout.
FIG. 76 is an explanatory diagram illustrating a structure example of a Timeout Extension Request packet.
FIG. 77 is an explanatory diagram illustrating a structure example of a Timeout Extension Response packet.

The AFC User-1 is able to extend a time until a timeout. FIG. 75 is an explanatory diagram illustrating time extension processing until a timeout by the AFC User-1.

First, the AFC User-1 establishes TLS connection with the AFC Manager (step S251).

Subsequently, the AFC User-1 transmits a Timeout Extension Request packet illustrated in FIG. 76 to the AFC Manager (step S252). A value of each field of the Timeout Extension Request packet is as follows. "Timeout Extension Request" is set to the Type field. USRID-1 is set to the User ID field. The AFC User-1 selects one of AFs that have been already set up at this time, and an identifier of the selected AF is set to the AF ID field. In this example, the identifier of the selected AF is AFID-4. AFCert-af4 that is certificate information generated with use of AFSKey-af4 is set to the AF Certificate field. TTL-usr1-2 that is a new desired timeout value is set to the Time to Live field.

In a case where the AFC Manager receives the Timeout Extension Request packet, the AFC Manger verifies the value of the AF Certificate field. In a case where the AFC Manager succeeds verification, the AFC Manger confirms the value of the Time to Live field, and determines TTL-usr1-3 that is a new allowable aimout value. Next, the AFC Manager transmits a Timeout Extension Response packet illustrated in FIG. 77 to the AFC User-1 (step S253). A value of each field of the Timeout Extension Response packet is as follows. "Timeout Extension Response" is set to the Type field. "OK" indicating success of processing is set to the Status field. USRID-1 that is the value of the User ID field of the Timeout Extension Request packet is set to the User ID field. TTL-usr1-3 that is a new allowable aimout value is set to the Time to Live field.

In a case where the AFC User-1 receives the Timeout Extension Response packet, the AFC User-1 disconnects the TLS connection with the AFC Manager (step S254).

[1.3. Functional Configuration Example of Communication Device]

Next, description is given of a functional configuration example of a communication device that may function as each application or each node according to an embodiment of the present disclosure.

Figure 78:
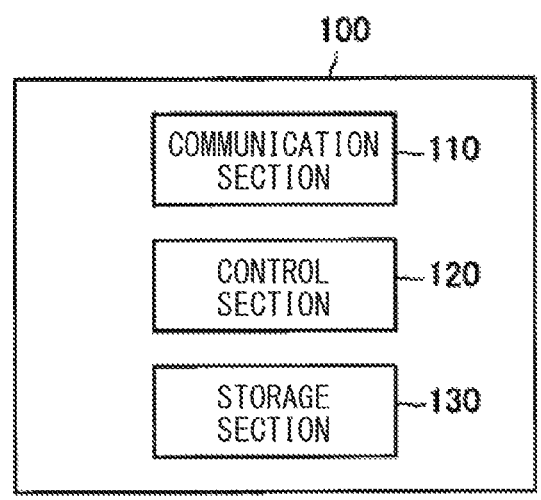
FIG. 78 is an explanatory diagram illustrating a functional configuration example of a communication device 100 that is allowed to function as each node according to an embodiment of the present disclosure.

FIG. 78 is an explanatory diagram illustrating a functional configuration example of a communication device 100 that may function as each node according to the embodiment of the present disclosure. The communication device 100 illustrated in FIG. 78 includes a communication section 110, a storage section 120, and a control section 130.

The communication section 110 executes communication between nodes. Communication between nodes may be wired or wireless. The communication section 110 performs, at a predetermined port, transmission and reception of the packet and the message described above to and from another node under control by the control section 130.

The storage section 120 stores various kinds of information and programs used in the architecture of the AFC described above. For example, the storage section 120 stores various kinds of tables described above. The storage section 120 may include various kinds of memories, HDDs, and the like.

The control section 130 includes, for example, a processor such as a CPU, and executes processing based on the architecture of the AFC described above. For example, the control section 130 executes setting of a path to a target node, communication processing with the target node, processing in a case where addition, change, and deletion, and the like of an AF node occurs, invoking of the AFC-daemon, execution of a function of the AF, and the like. That is, the control section 130 generates a message for newly setting an AF in a case where change in a path from the AFC Ingress to the AFC Egress occurs. Examples of this change may include change in a case where a path is branched between the AFC Ingress and the AFC Egress. In addition, the examples of this change may include change in a case where an AF node is delated between the AFC Ingress and the AFC Egress. In addition, the control section 130 provides an AFC header to a packet transmitted from the COTS device in a case where the communication device 100 is the AFC Ingress, and executes processing to delete an AFC header from a packet provided with the AFC header in a case where the communication device 100 is the AFC Egress.

3. Conclusion

As described above, according to the embodiment of the present disclosure, it is possible to provide a communication device that allows one or a plurality of functions desired by a service user to operate on a packet desired by the service user in a service of forwarding a packet in a network.

The respective steps in the processing executed by each device described herein do not necessarily have to be performed chronologically in the order described as a sequence diagram or a flowchart. For example, the respective steps in the processing executed by each device may be processed in order different from the order described as a flowchart, or may be processed in parallel.

In addition, it is possible to fabricate a computer program for causing hardware such as a CPU, a ROM, and a RAM built in each device to fulfill functions similar to those of the components of each device described above. In addition, it is possible to provide a storage medium having the computer program stored therein. In addition, configuring each of the functional blocks illustrated in the functional block diagrams by hardware makes it possible to allow the hardware to achieve a series of processes.

A preferred embodiment(s) of the present disclosure has/have been described above in detail with reference to the accompanying drawings, but the technical scope of the present disclosure is not limited to such an embodiment(s). It is apparent that a person having ordinary skill in the art of the present disclosure may arrive at various alterations and modifications within the scope of the technical idea described in the appended claims, and it is understood that such alterations and modifications naturally fall within the technical scope of the present disclosure.

Furthermore, the effects described herein are merely illustrative and exemplary, and not limitative. That is, the technology according to the present disclosure may exert other effects that are apparent to those skilled in the art from the description herein, in addition to the above-described effects or in place of the above-described effects.

For example, the AFC Ingress may also serve as a first AF Node of an AFC path. That is, the AFC Ingress and the first AF Node on a path of the AFC path may be configured as the physically or logically same communication device. In this case, for example, in a case where this communication device receives a packet, first, the communication device adds header information containing path information between the AFC Ingress and the AFC Egress to the packet as an operation of the AFC ingress, and then executes an operation as the AF Node. In a case where the AFC Ingress and the AFC Node are configured as the same communication device, a portion of the operation of the AFC Ingress may be omitted. For example, the communication device may omit an operation of sending a packet to another node as the AFC Ingress, and may shift to an operation as the AF Node. In addition, in a case where the AFC Ingress and the AFC Node are configured as the same communication device, a portion of an operation of the AF Node may be omitted.

In addition, for example, the AFC Egress and the last AF Node on the path may be configured as the physically or logically same communication device. In this case, for example, in a case where the communication device receives a packet, first, the communication device executes an operation as the AF Node, and thereafter deletes header information containing path information between the AFC Ingress and the AFC Egress from the packet as an operation of the AFC Egress. In a case where the AFC Egress and the AFC Node are configured as the same communication device, a portion of an operation of the AFC Egress may be omitted. For example, the communication device may omit an operation of sending a packet to another node as the AF Node, and may shift to an operation as the AFC Egress. In addition, in a case where the AFC Egress and the AFC Node are configured as the same communication device, a portion of the operation of the AF Node may be omitted.

It is to be noted that the following configurations also fall within the technical scope of the present disclosure.

(1)
A communication device including:
a communication section that executes communication with another node; and
a control section that controls the communication by the communication section,
the control section adding, to a packet directed toward a transmission destination node by a transmission source node, header information containing at least path information between the communication device located in a stage subsequent to the transmission source node and a target node located in a stage preceding the transmission destination node, and causing the communication section to send the packet toward another node residing in a path.

(2)
The communication device according to (1), in which the path information between the communication device and the target node contains at least information about communication with at least one relay node residing between the communication device and the target node, information of a function to be executed by the relay node, and contents of processing corresponding to a result of execution of the function on the relay node.

(3)
The communication device according to (2), in which the contents of the processing include selection of a node next to the relay node.

(4)
The communication device according to (2) or (3), in which the path information between the communication device and the target node further contains certificate information on the relay node.

(5)
The communication device according to any one of (2) to (4), in which the control section selects one of a plurality of the relay nodes on the basis of information of loads of the plurality of the relay nodes.

(6)
A communication device including:
a communication section that executes communication with another node; and
a control section that control communication by the communication section,
the control section deleting header information added to a packet directed toward a transmission destination node by a transmission source node, and causing the communication section to send the packet, the header information containing at least path information from a start node located in a stage subsequent to the transmission source node to the communication device located in a stage preceding the transmission destination node.

(7)
The communication device according to (6), in which the path information from the start node to the communication device contains at least information about communication with at least one relay node residing up to the communication device, information of a function to be executed by the relay node, and contents of processing corresponding to a result of execution of the function on the relay node.

(8)
A communication device including:
a communication section that executes communication with another node; and
a control section that controls the communication by the communication section,
the control section determining a next node with reference to data in which header information is added to a packet directed toward a transmission destination node by a transmission source node, and causing the communication section to send the data toward the determined next node, the header information containing at least path information between a start node located in a stage subsequent to the transmission source node and a target node located in a stage preceding the transmission destination node.

(9)
The communication device according to (8), in which the path information between the start node and the target node contains at least information about communication with at least one relay node residing between the start node and the target node, information of a function to be executed by the relay node, and contents of processing corresponding to a result of execution of the function on the relay node.

(10)
The communication device according to (9), in which the contents of the processing includes selection of a node next to the relay node.

(11)
The communication device according to (9) or (10), in which the path information between the start node and the target node further contains certificate information on the relay node.

(12)
The communication device according to any one of (9) to (11), in which the control section selects one of a plurality of the relay nodes on the basis of information of loads of the plurality of the relay nodes.

(13)
A communication device including:
a communication section that executes communication with another node; and
a control section that controls the communication by the communication section,
the control section generating path information between a start node and a target node,
the start node including a node that adds header information containing at least path information between the start node and the target node,
the target node including a node that deletes the header information, and
the path information between the start node and the target node containing at least information about communication with at least one relay node residing between the start node and the target node, information of a function to be executed by the relay node, and contents of processing corresponding to a result of execution of the function oat the relay node.

(14)
The communication device according to (13), in which the contents of the processing include selection of a node next to the relay node.

(15)
The communication device according to (13) or (14), in which the path information between the start node and the target node further contains certification information on the relay node.

(16)

A communication method including:
executing communication with another node; and
controlling the communication with the other node,
the controlling including adding header information to a packet directed toward a transmission destination node by a transmission source node and sending the packet to another node residing in a path, the header information containing at least path information between a start node located in a stage subsequent to the transmission source node and a target node located in a stage preceding the transmission destination node.

(17)

A communication method including:
executing communication with another node; and
controlling the communication with the other node,
the controlling including deleting header information contained in a packet directed toward a transmission destination node by a transmission source node and sending the packet toward the other node, the header information containing at least path information between a start node located in a stage subsequent to the transmission source node and a target node located in a stage preceding the transmission destination node.

(18)

A communication method including:
executing communication with another node; and
controlling the communication with the other node,
the controlling including determining a next node with reference to data in which header information is added to a packet directed toward a transmission destination node by a transmission source node, and sending the data toward the determined next node, the header information containing path information between a start node located in a stage subsequent to the transmission source node and a target node located in a stage preceding the transmission destination node.

(19)

A data structure used in a communication device, the communication device including
a communication section that executes communication with another node, and
a control section that controls the communication by the communication section,
the control section adding header information to a packet directed toward a transmission destination node by a transmission source node and causing the communication section to send the packet, and
the header information containing at least path information a start node located in a stage subsequent to the transmission source node and a target node located in a stage preceding the transmission destination node, the transmission source node being between the start node and the target node.

REFERENCE SIGNS LIST

100: communication device
110: communication section
120: storage section
130: control section

The invention claimed is:

1. A communication device, comprising:
a communication section configured to execute communication between nodes; and
a control section configured to control the communication by the communication section, wherein
the control section is further configured to:
add, to a packet directed toward a transmission destination node by a transmission source node, header information containing at least path information between the communication device located in a stage subsequent to the transmission source node and a target node located in a stage preceding the transmission destination node; and
cause the communication section to send the packet toward the nodes that reside in a path, and
the path information between the communication device and the target node contains at least information about communication with at least one relay node that resides between the communication device and the target node, information of a function to be executed by the at least one relay node, and contents of processing corresponding to a result of execution of the function on the at least one relay node.

2. The communication device according to claim 1, wherein the contents of the processing include selection of a node next to the at least one relay node.

3. The communication device according to claim 1, wherein the path information between the communication device and the target node further contains certificate information on the at least one relay node.

4. The communication device according to claim 1, wherein the control section is further configured to select one of a plurality of relay nodes based on information of loads of the plurality of relay nodes.

5. A communication device, comprising:
a communication section configured to execute communication between nodes; and
a control section configured to control the communication by the communication section, wherein
the control section is further configured to:
delete header information added to a packet directed toward a transmission destination node by a transmission source node; and
cause the communication section to send the packet, and
the header information contains at least path information from a start node located in a stage subsequent to the transmission source node to the communication device located in a stage preceding the transmission destination node.

6. The communication device according to claim 5, wherein the path information from the start node to the communication device contains at least information about communication with at least one relay node residing up to the communication device, information of a function to be executed by the at least one relay node, and contents of processing corresponding to a result of execution of the function on the at least one relay node.

7. A communication device, comprising:
a communication section configured to execute communication between nodes; and
a control section configured to control the communication by the communication section, wherein
the control section is further configured to:
determine a next node with reference to header information added to a packet directed toward a transmission destination node by a transmission source node; and
cause the communication section to send the packet toward the determined next node,
the header information contains at least path information between a start node located in a stage subsequent to the transmission source node and a target node located in a stage preceding the transmission destination node, and the path information between the start node and the target node contains at least information about communication with at least one relay node that resides between the start node and the target node, information of a function to be executed by the at least one relay node, and contents of processing corresponding to a result of execution of the function on the at least one relay node.

8. The communication device according to claim 7, wherein the contents of the processing include selection of a node next to the at least one relay node.

9. The communication device according to claim 7, wherein the path information between the start node and the target node further contains certificate information on the at least one relay node.

10. The communication device according to claim 7, wherein the control section is further configured to select one of a plurality of relay nodes based on information of loads of the plurality of relay nodes.

11. A communication device, comprising:
a communication section configured to execute communication between nodes; and
a control section configured to control the communication by the communication section, wherein
the control section is further configured to generate path information between a start node and a target node,
the start node adds header information containing at least the path information between the start node and the target node,
the target node deletes the header information, and
the path information between the start node and the target node contains at least information about communication with at least one relay node that resides between the start node and the target node, information of a function to be executed by the at least one relay node, and contents of processing corresponding to a result of execution of the function on the at least one relay node.

12. The communication device according to claim 11, wherein the contents of the processing include selection of a node next to the at least one relay node.

13. The communication device according to claim 11, wherein the path information between the start node and the target node further contains certification information on the at least one relay node.

14. A communication method, comprising:
executing communication between nodes; and
controlling the communication with the nodes, wherein
the controlling includes:
adding header information to a packet directed toward a transmission destination node by a transmission source node; and
sending the packet to the nodes that reside in a path,
the header information contains at least path information between a start node located in a stage subsequent to the transmission source node and a target node located in a stage preceding the transmission destination node, and
the path information between the start node and the target node contains at least information about communication with at least one relay node that resides between the start node and the target node, information of a function to be executed by the at least one relay node, and contents of processing corresponding to a result of execution of the function on the at least one relay node.

15. A communication method, comprising:
executing communication between nodes; and
controlling the communication with the nodes, wherein
the controlling includes:
deleting header information contained in a packet directed toward a transmission destination node by a transmission source node; and
sending the packet toward the nodes, and
the header information contains at least path information between a start node located in a stage subsequent to the transmission source node and a target node located in a stage preceding the transmission destination node.

16. A communication method, comprising:
executing communication between nodes; and
controlling the communication with the nodes, wherein
the controlling includes:
determining a next node with reference to header information added to a packet directed toward a transmission destination node by a transmission source node; and
sending the packet toward the determined next node,
the header information contains path information between a start node located in a stage subsequent to the transmission source node and a target node located in a stage preceding the transmission destination node, and
the path information between the start node and the target node contains at least information about communication with at least one relay node that resides between the start node and the target node, information of a function to be executed by the at least one relay node, and contents of processing corresponding to a result of execution of the function on the at least one relay node.

17. A data structure used in a communication device, the communication device including:
a communication section configured to execute communication between nodes; and
a control section configured to control the communication by the communication section, wherein
the control section is further configured to:
add header information to a packet directed toward a transmission destination node by a transmission source node; and
cause the communication section to send the packet,
the header information contains at least path information between a start node located in a stage subsequent to the transmission source node and a target node located in a stage preceding the transmission destination node,
the transmission source node is between the start node and the target node, and
the path information between the start node and the target node contains at least information about communication with at least one relay node that resides between the start node and the target node, information of a function to be executed by the at least one relay node, and contents of processing corresponding to a result of execution of the function on the at least one relay node.

* * * * *